US012311539B2

(12) United States Patent
Horiguchi et al.

(10) Patent No.: US 12,311,539 B2
(45) Date of Patent: May 27, 2025

(54) INFORMATION PROCESSING APPARATUS AND CONTROL METHOD

(71) Applicant: SONY GROUP CORPORATION, Tokyo (JP)

(72) Inventors: Muneyuki Horiguchi, Tokyo (JP); Takeo Sakurada, Tokyo (JP); Ippei Yamakoshi, Tokyo (JP); Shravan Tangudu, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 417 days.

(21) Appl. No.: 17/636,183

(22) PCT Filed: Jul. 17, 2020

(86) PCT No.: PCT/JP2020/027950
§ 371 (c)(1),
(2) Date: Feb. 17, 2022

(87) PCT Pub. No.: WO2021/039194
PCT Pub. Date: Mar. 4, 2021

(65) Prior Publication Data
US 2022/0288770 A1 Sep. 15, 2022

(30) Foreign Application Priority Data

Aug. 27, 2019 (JP) .................................. 2019-155102

(51) Int. Cl.
*B25J 5/00* (2006.01)
*G05D 1/00* (2006.01)

(52) U.S. Cl.
CPC ............ *B25J 5/007* (2013.01); *G05D 1/0088* (2013.01); *G05D 1/0221* (2013.01)

(58) Field of Classification Search
CPC ...... B25J 5/007; B25J 11/0005; B25J 9/0003; B25J 11/001; G05D 1/0088;
(Continued)

(56) References Cited

U.S. PATENT DOCUMENTS 2,661,672 A * 12/1953 Fairbanks .............. F16M 11/42
280/47.11
2009/0194965 A1* 8/2009 Boston ..................... B60G 3/20
280/124.136
(Continued)

FOREIGN PATENT DOCUMENTS

CA        2851622 A1    4/2013
CN      202724680 U    2/2013
(Continued)

OTHER PUBLICATIONS

International Search Report and Written Opinion of PCT Application No. PCT/JP2020/027950, issued on Oct. 20, 2020, 12 pages of ISRWO.

*Primary Examiner* — Adam R Mott
*Assistant Examiner* — Joseph Anthony Trias
(74) *Attorney, Agent, or Firm* — CHIP LAW GROUP

(57) ABSTRACT

Communication with a user is more naturally and effectively realized. An information processing apparatus includes an autonomous mobile body that travels while maintaining an inverted state, and an operation control unit that controls an operation of the autonomous mobile body. The autonomous mobile body includes a main body, two wheels mounted on the main body, and a drive mechanism that drives the two wheels. The operation control unit controls the drive mechanism to maintain the inverted state of the autonomous mobile body by the two wheels. When the autonomous
(Continued)

mobile body is placed on a surface that is flat, a part of a columnar surface of each of the wheels comes into contact with the surface.

10 Claims, 61 Drawing Sheets

(58) Field of Classification Search
CPC ................ G05D 1/0221; G05D 1/0891; B60L 2200/20; B62K 11/007; B62D 11/04
USPC .......................................................... 700/245
See application file for complete search history.

(56) References Cited

U.S. PATENT DOCUMENTS

| | | | |
|---|---|---|---|
| 2013/0084774 A1* | 4/2013 | Mimlitch, III | A63H 18/16 |
| | | | 446/457 |
| 2013/0084775 A1 | 4/2013 | Mimlitch, III et al. | |
| 2014/0202606 A1* | 7/2014 | Kodama | B60C 11/0304 |
| | | | 152/209.8 |
| 2017/0361205 A1* | 12/2017 | Bigler | B60L 50/52 |

FOREIGN PATENT DOCUMENTS

| | | | | | |
|---|---|---|---|---|---|
| CN | 103028258 | A | | 4/2013 | |
| DE | 19822461 | A1 | | 11/1998 | |
| DE | 202012000949 | U1 | | 2/2012 | |
| EP | 2578282 | A2 | | 4/2013 | |
| EP | 2578284 | A2 | | 4/2013 | |
| JP | 7-299255 | A | | 11/1995 | |
| JP | H07299255 | A | * | 11/1995 | |
| JP | 10-315701 | A | | 12/1998 | |
| JP | 2008238938 | A | | 10/2008 | |
| JP | 2012056001 | A | * | 3/2012 | |
| JP | 3187093 | U | | 11/2013 | |
| JP | 2014-528803 | A | | 10/2014 | |
| JP | 2015-132878 | A | | 7/2015 | |
| JP | 2018-174759 | A | | 11/2018 | |
| WO | WO-2012160400 | A1 | * | 11/2012 | ............... B62K 1/00 |
| WO | 2013/052140 | A2 | | 4/2013 | |
| WO | WO-2014141356 | A1 | * | 9/2014 | ............... B25J 5/007 |
| WO | 2019/131696 | A1 | | 7/2019 | |

* cited by examiner

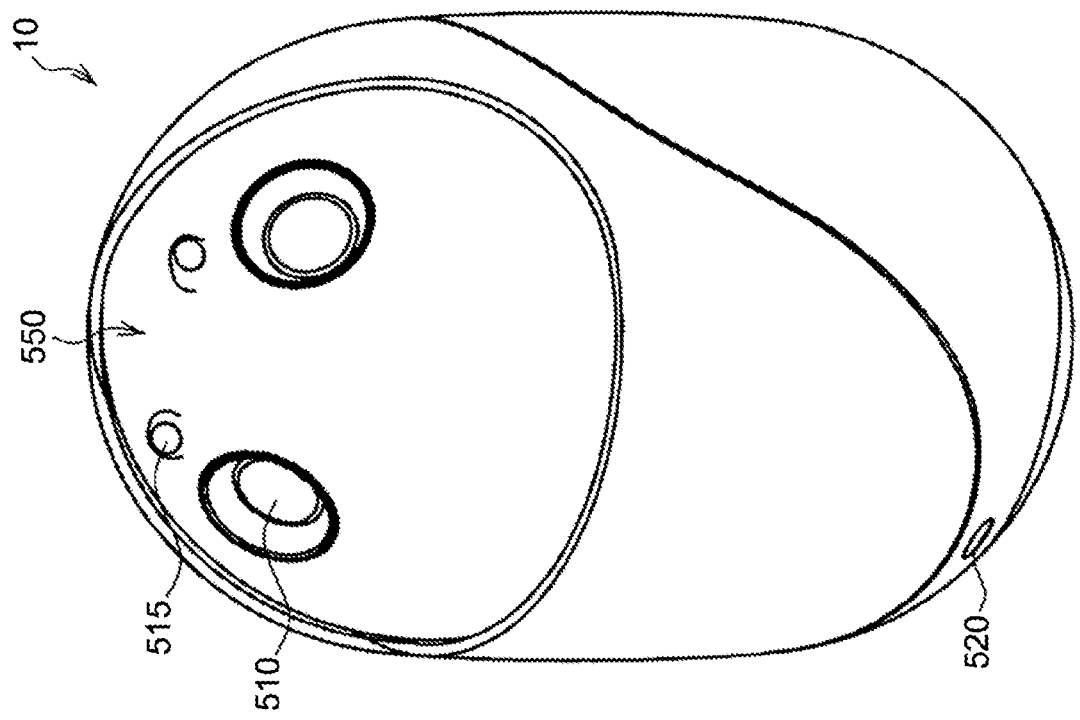
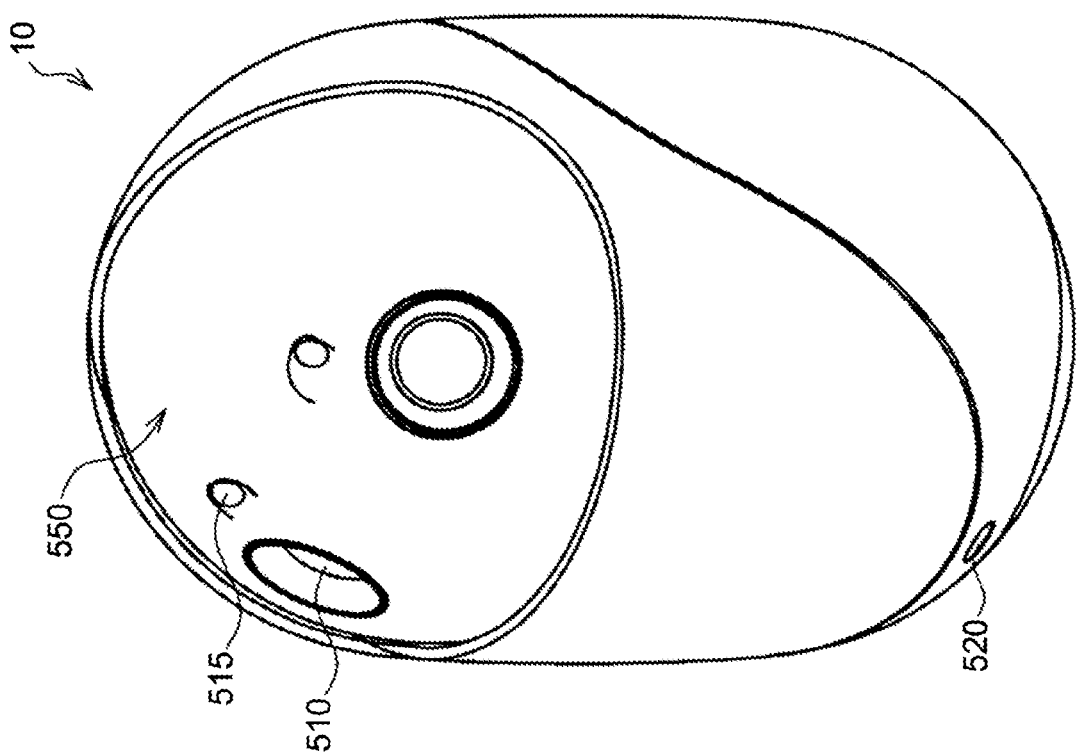
FIG.2

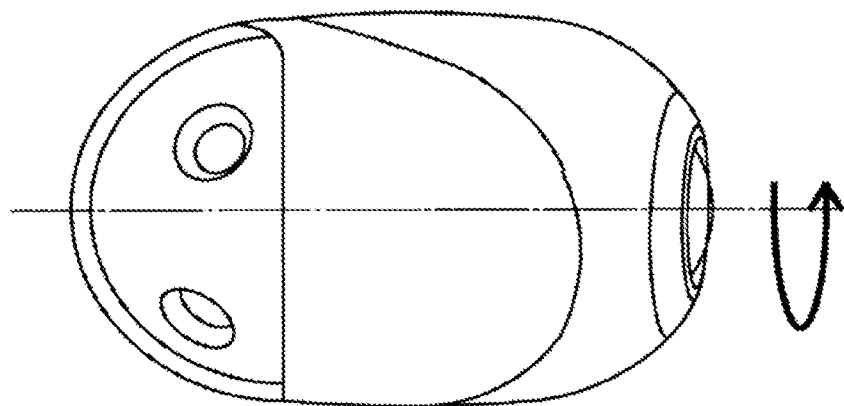
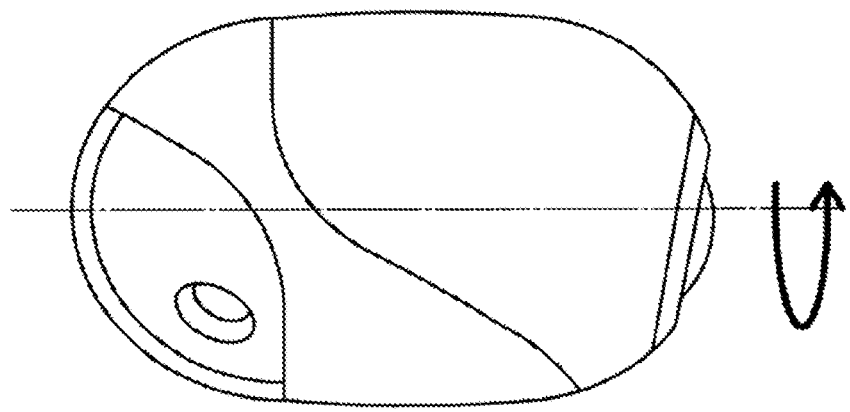
FIG.13A
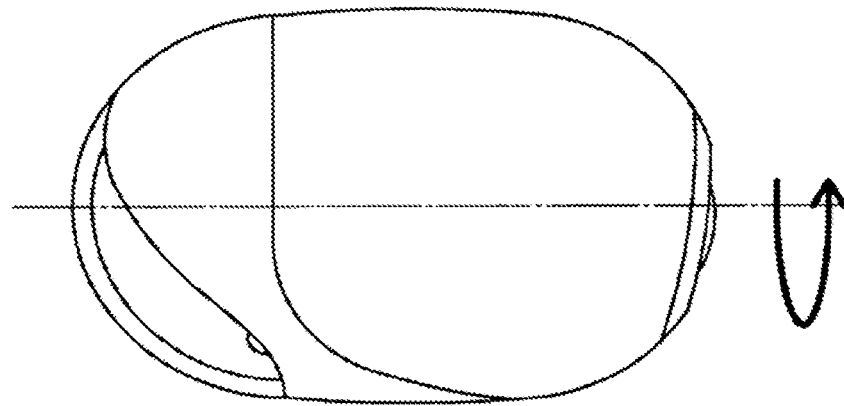

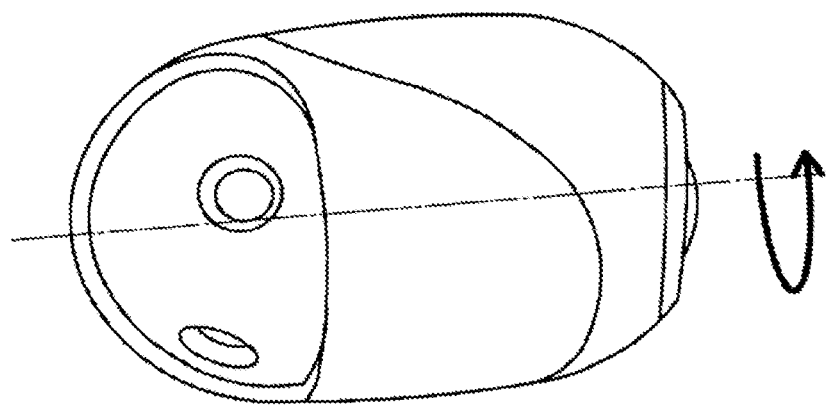
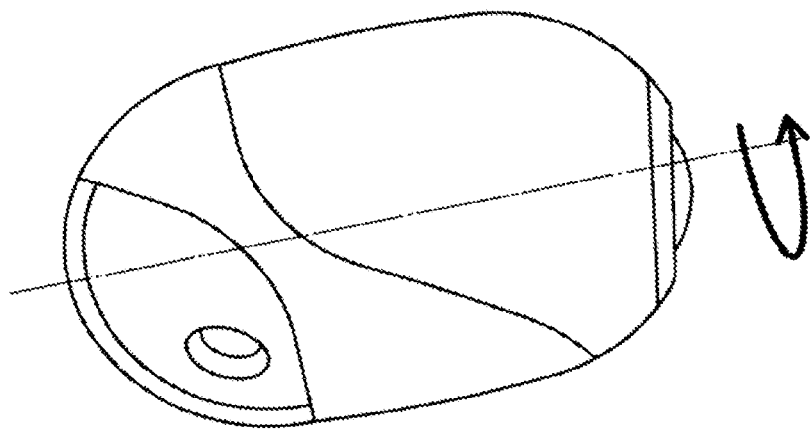
FIG.13B
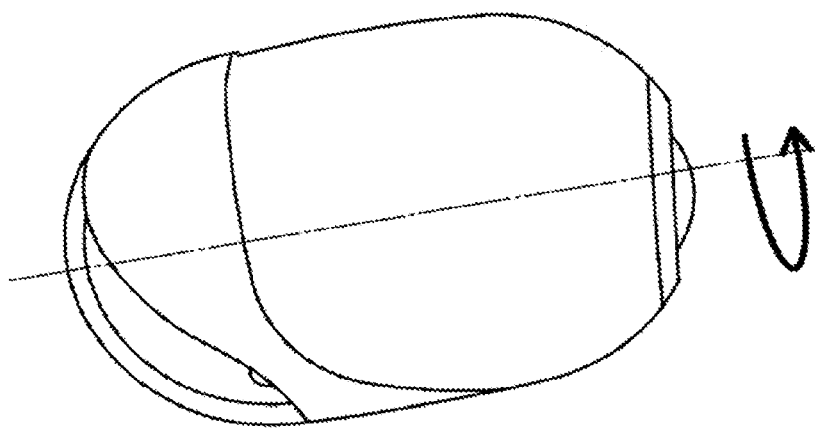

FIG.22
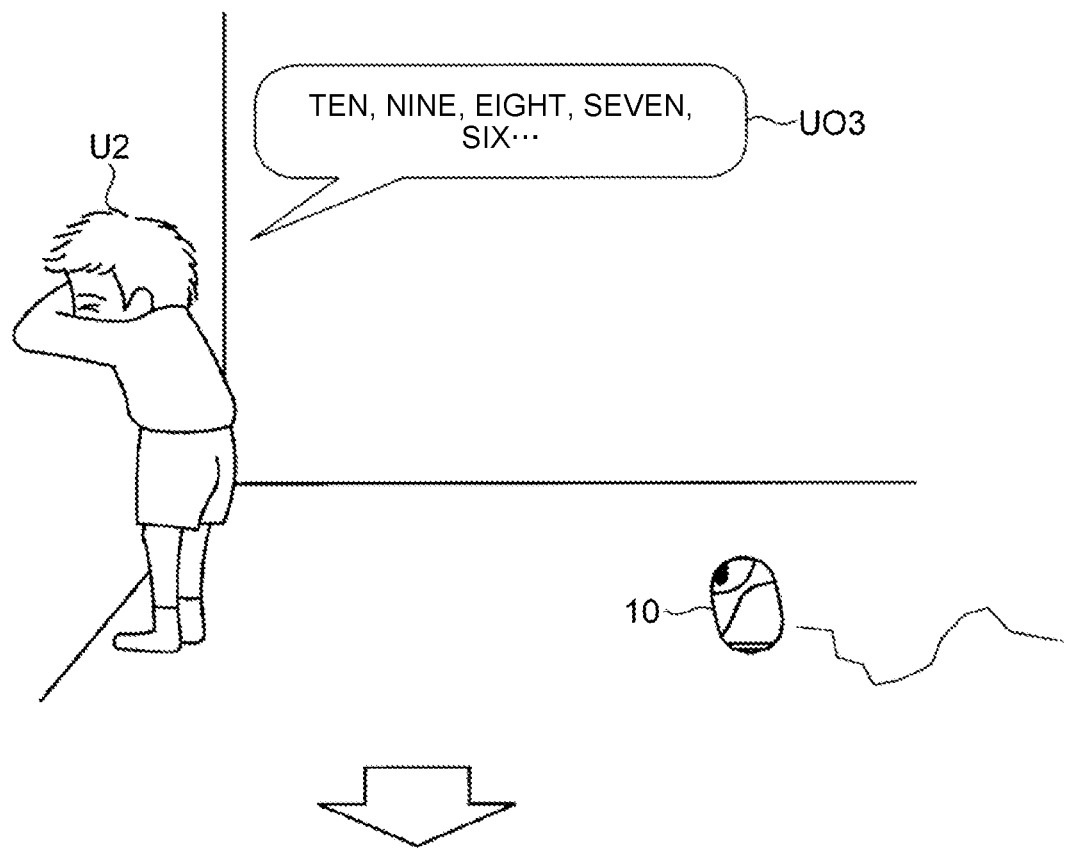
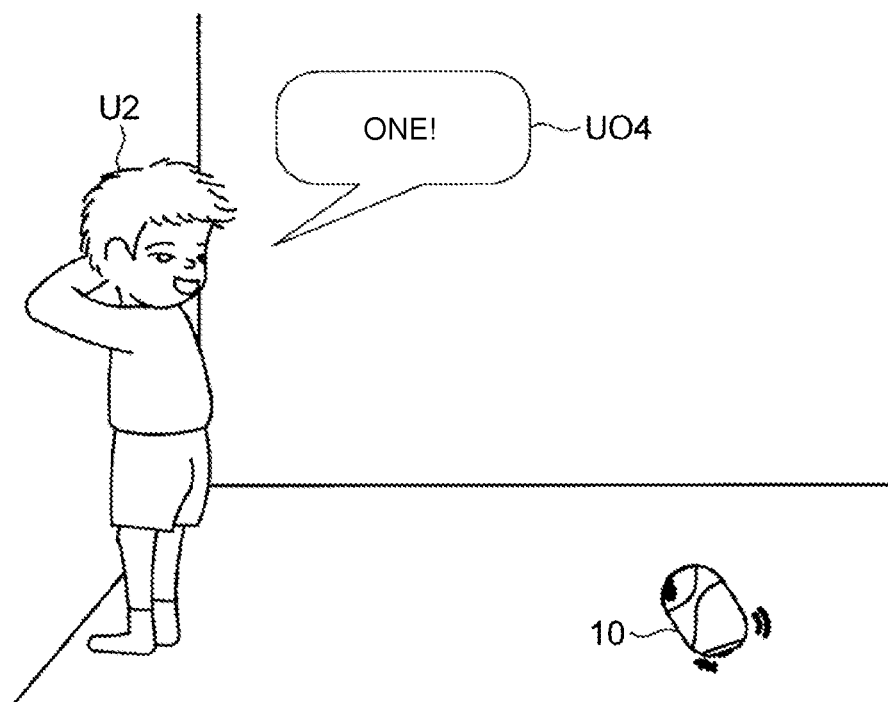

FIG.24
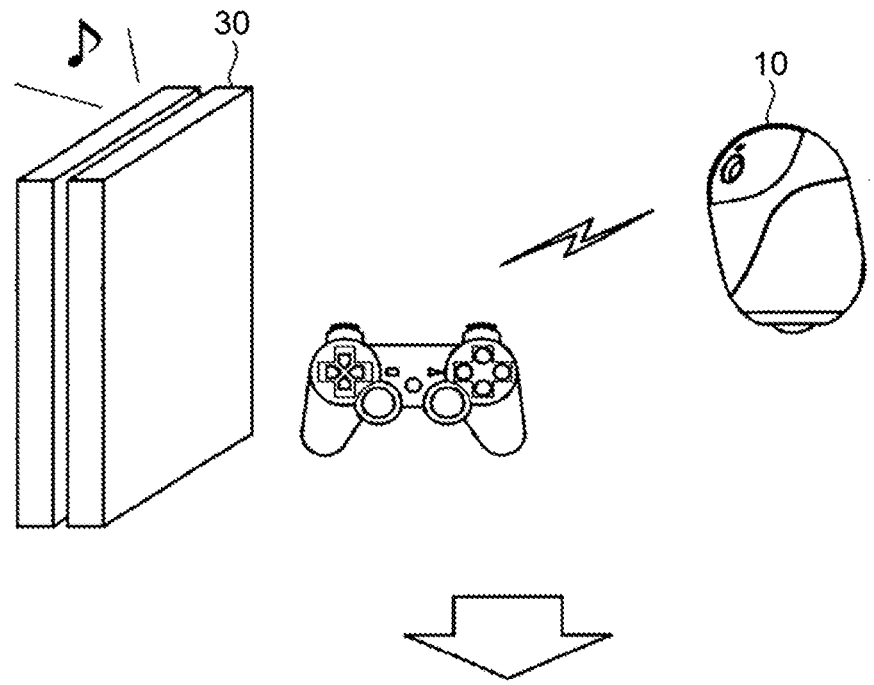
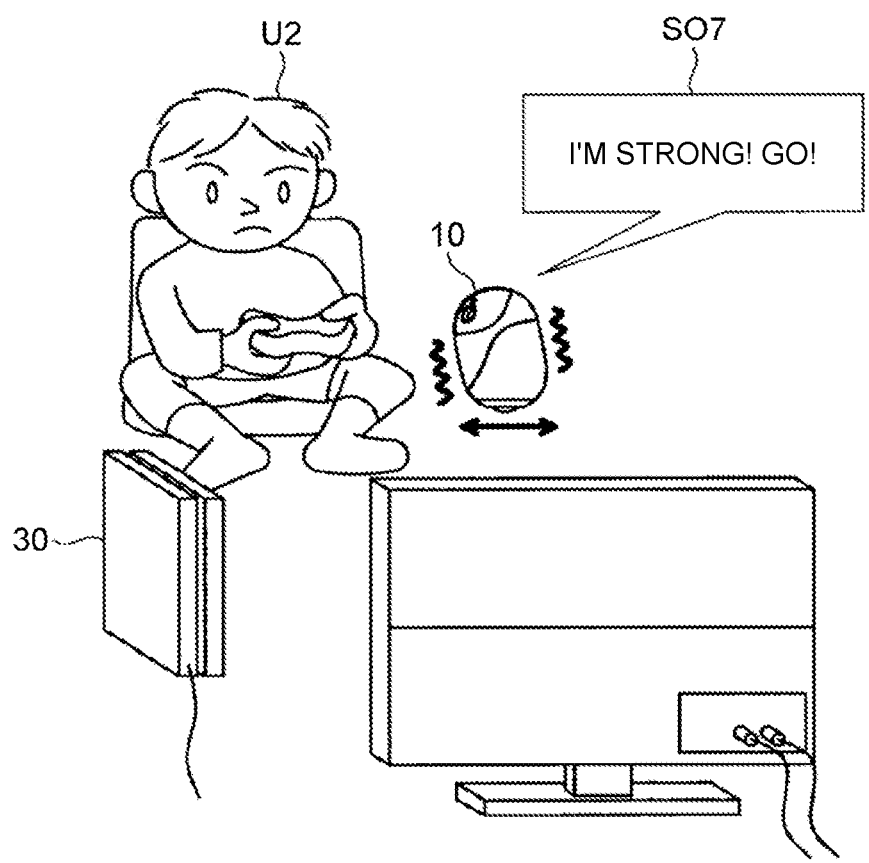

FIG.65
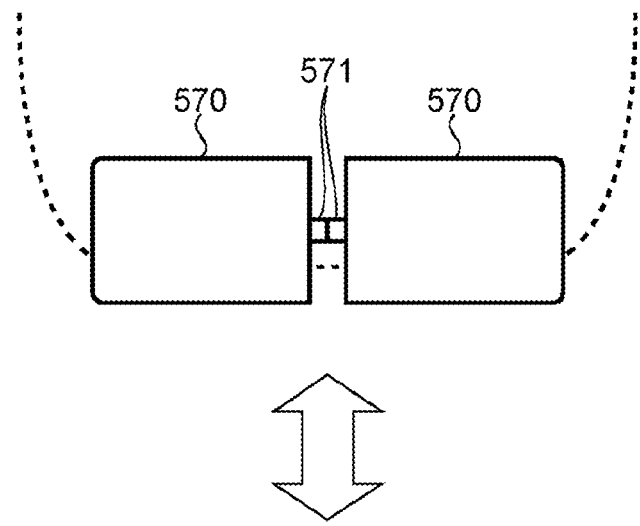
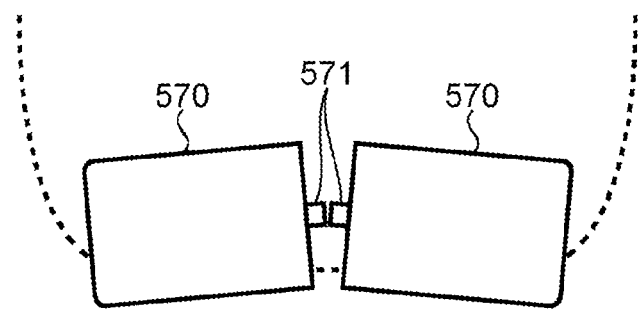
FIG.66
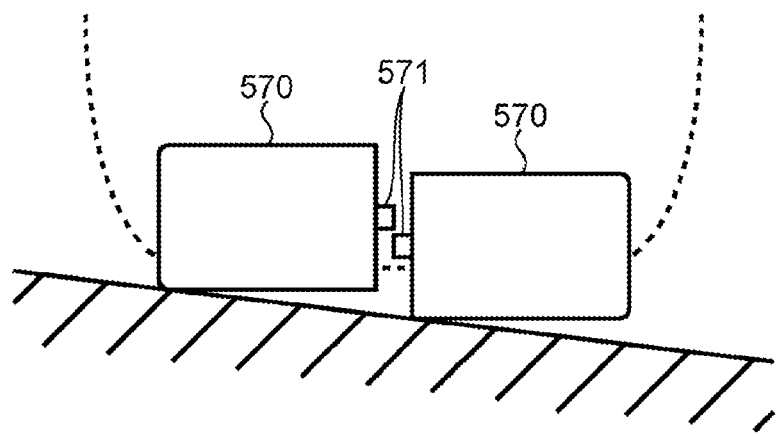

INFORMATION PROCESSING APPARATUS AND CONTROL METHOD

CROSS REFERENCE TO RELATED APPLICATIONS

This application is a U.S. National Phase of International Patent Application No PCT/JP2020/027950 filed on Jul. 17, 2020, which claims priority benefit of Japanese Patent Application No. JP 2019-155102 filed in the Japan Patent Office on Aug. 27, 2019. Each of the above-referenced applications is hereby incorporated herein by reference in its entirety.

FIELD

The present disclosure relates to an information processing apparatus, a control method, and a program.

BACKGROUND

In recent years, various devices that respond to a user's action are becoming popular. These devices as described above include an agent that presents a response to an inquiry from the user. For example, Patent Literature 1 discloses a technique of calculating an expected value of user's attention to output information and controlling information output on the basis of the expected value.

CITATION LIST

Patent Literature

Patent Literature 1: JP 2015-132878 A

SUMMARY

Technical Problem

On the other hand, a recent agent tends to place more importance on communication with a user in addition to simple presentation of information. However, it is difficult to say that sufficient communication is achieved in a device that responds to the user's action as described in Patent Literature 1.

Therefore, the present disclosure proposes an information processing apparatus, its control method, and a program capable of more naturally and effectively communicating with the user.

Solution to Problem

To solve the above-described problem, an information processing apparatus according to one aspect of the present disclosure comprises: an autonomous mobile body that travels while maintaining an inverted state; and an operation control unit that controls an operation of the autonomous mobile body, wherein the autonomous mobile body includes: a main body, two wheels mounted on the main body, and a drive mechanism that drives the two wheels, the operation control unit controls the drive mechanism to maintain the inverted state of the autonomous mobile body by the two wheels, and when the autonomous mobile body is placed on a surface that is flat, a part of a columnar surface of each of the two wheels comes into contact with the surface.

BRIEF DESCRIPTION OF DRAWINGS

FIG. 2 is a perspective view of the autonomous mobile body according to the first embodiment.

FIG. 13A is a diagram illustrating an effect obtained by a forward inclination of the autonomous mobile body according to the first embodiment.

FIG. 13B is a diagram illustrating an effect obtained by the forward inclination of the autonomous mobile body according to the first embodiment.

FIG. 22 is a diagram illustrating an example of the inducing action that induces the cooperative action between the user and the autonomous mobile body according to the first embodiment.

FIG. 24 is a diagram illustrating an example of the inducing action that induces the cooperative action between the user and the autonomous mobile body according to the first embodiment.

FIG. 65 is a schematic diagram illustrating a schematic configuration example of a wheel and an axle in an autonomous mobile body according to a sixth example in the fifth embodiment.

FIG. 66 is a schematic diagram illustrating another schematic configuration example of the wheel and the axle in the autonomous mobile body according to the sixth example in the fifth embodiment.

DESCRIPTION OF EMBODIMENTS

Figure 1:
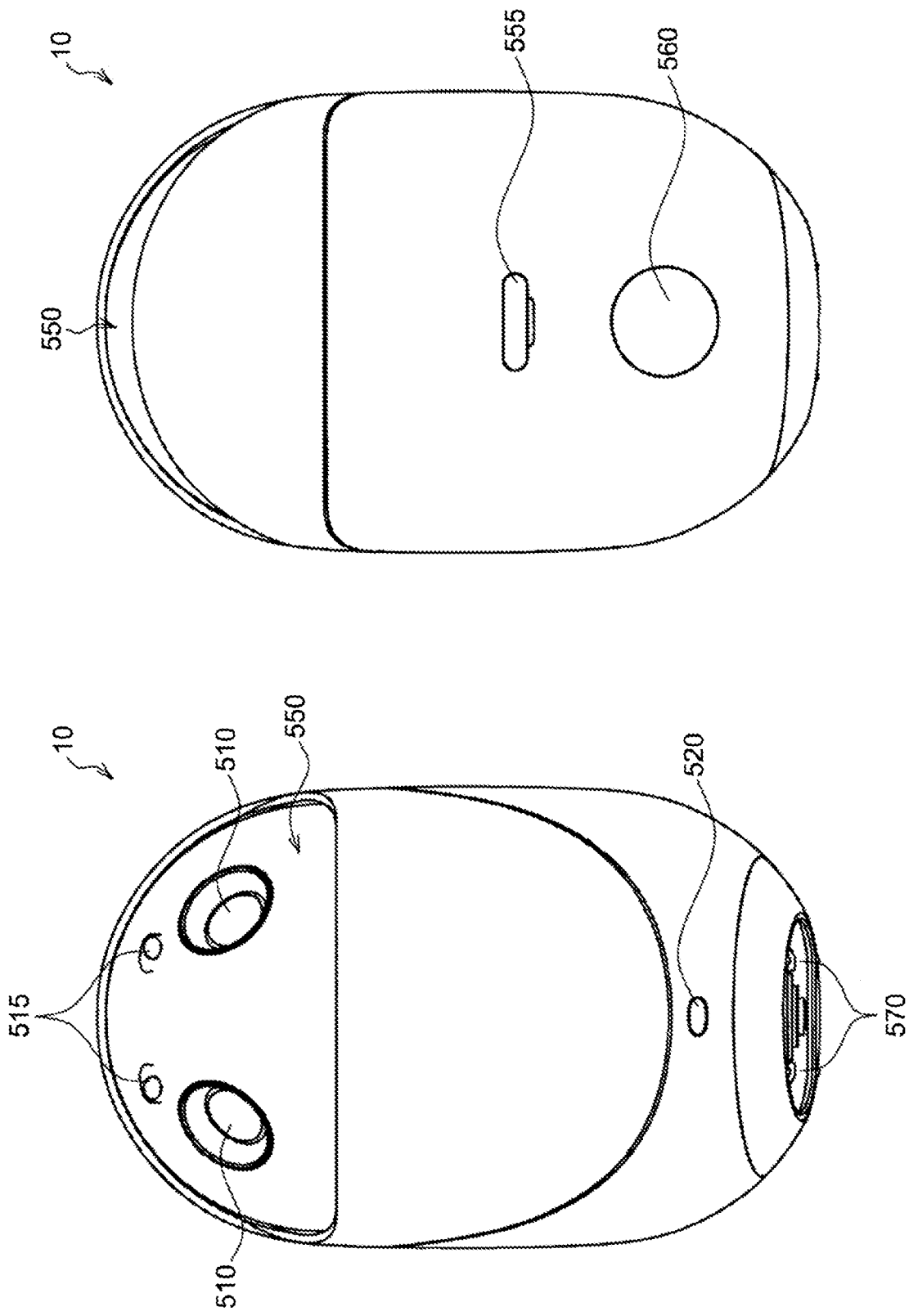
FIG. 1 is a front view and a rear view of an autonomous mobile body according to a first embodiment.

Hereinafter, embodiments of the present disclosure will be described with reference to the drawings. In each of the following embodiments, same parts are given the same reference signs to omit redundant description.

In addition, the present disclosure will be described according to the following item order.

1. First embodiment
    1.1 Overview
    1.2 Configuration example of autonomous mobile body
    1.3 System configuration example
    1.4 Functional configuration example of autonomous mobile body
    1.5 Functional configuration example of information processing server
    1.6 Details of inducing action
    1.7 Growth example of autonomous mobile body
    1.8 Flow of control
    1.9 Hardware configuration example
    1.10 Summary
2. Second embodiment
    2.1 Overview
    2.2 Functional configuration example of autonomous mobile body
    2.3 Details of posture control
    2.4 Summary
3. Third embodiment
    3.1 Configuration example of sensor unit
    3.2 Operation example based on detection result
        3.2.1 Collision prevention operation
        3.2.2 Fall and collision prevention operation
        3.2.3 Idling prevention operation
        3.2.4 Human, breath, and gesture detecting operation
    3.3 Flow of control based on sensor result
        3.3.1 Main operation (including obstacle and boundary avoidance operation)
        3.3.2 Idling prevention operation
        3.3.3 Mode switching operation
        3.3.4 Human detection rate switching operation
        3.3.5 Mapping operation
    3.4 Summary
4. Fourth embodiment
    4.1 Configuration example of autonomous mobile body
    4.2 Posture control example
    4.3 Example of posture control flow
    4.4 Summary
5. Fifth Embodiment
    5.1 Overview
    5.2 Configuration example of autonomous mobile body (underbody)
        5.2.1 First example
        5.2.2 Second example
        5.2.3 Third example
        5.2.4 Fourth example
        5.2.5 Fifth example
        5.2.6 Sixth example
    5.3 Summary
6. Sixth embodiment

1. First Embodiment

1.1 Overview

First, an overview of a first embodiment of the present disclosure will be described. As described above, in recent years, various agent devices that respond to a user's action are becoming popular. For example, the agent device can present various types of information in response to an inquiry from the user. The above information presentation includes, for example, presentation of recommended information, a schedule, news, and the like to the user.

However, in many cases, the agent device executes the above-described operation in response to an instruction command input by the user. Examples of the above instruction command include a keyword input by voice and button pressing to execute a function. Therefore, the information presented by the agent device as described above is a passive operation, and it is difficult to say that the information presentation activates communication with the user.

Some agent devices perform continuous interaction with the user using a voice or the like, but in many cases, only the passive operation is repeated in response to the user's instruction command. It is difficult to say that true communication is realized.

A technical idea according to the present disclosure has been conceived focusing on the above points, and enables more natural and effective communication with the user. To this end, one of features of an autonomous mobile body 10 according to the present embodiment is to actively execute various actions that induce communication with the user (hereinafter, also referred to as an inducing action).

For example, the autonomous mobile body according to the present embodiment can actively present information to the user on the basis of environment recognition. Furthermore, for example, the autonomous mobile body 10 actively executes various inducing actions that urge the user to perform a predetermined behavior. In this respect, the autonomous mobile body according to the present embodiment is clearly different from a device that performs a passive operation based on the instruction command.

In addition, it can be said that the inducing action by the autonomous mobile body according to the present embodiment is active and positive interference with respect to a physical space. The autonomous mobile body according to the present embodiment can move in the physical space and execute various physical actions with respect to the user, a living thing, an article, and the like. According to the above features of the autonomous mobile body according to the present embodiment, the user can comprehensively recognize the action of the autonomous mobile body through visual, auditory, and tactile sensation, and can realize advanced communication as compared with a case where interaction with the user is simply performed using voice.

Hereinafter, functions of the autonomous mobile body and an information processing server that controls the autonomous mobile body according to the present embodiment that realize the above features will be described in detail.

1.2 Configuration Example of Autonomous Mobile Body

Next, a configuration example of the autonomous mobile body 10 according to the first embodiment of the present disclosure will be described. The autonomous mobile body 10 according to the present embodiment can be various devices that perform an autonomous action based on environment recognition. Hereinafter, a case where the autonomous mobile body 10 according to the present embodiment will be described using an example of a long-elliptic agent-type robot device that autonomously travels by wheels. The autonomous mobile body 10 according to the present embodiment realizes various types of communication including information presentation, for example, by performing an autonomous action according to conditions of the user, surroundings, or itself. The autonomous mobile body 10 according to the present embodiment may be a small robot having a size and weight that the user can easily lift with one hand.

Figure 3:
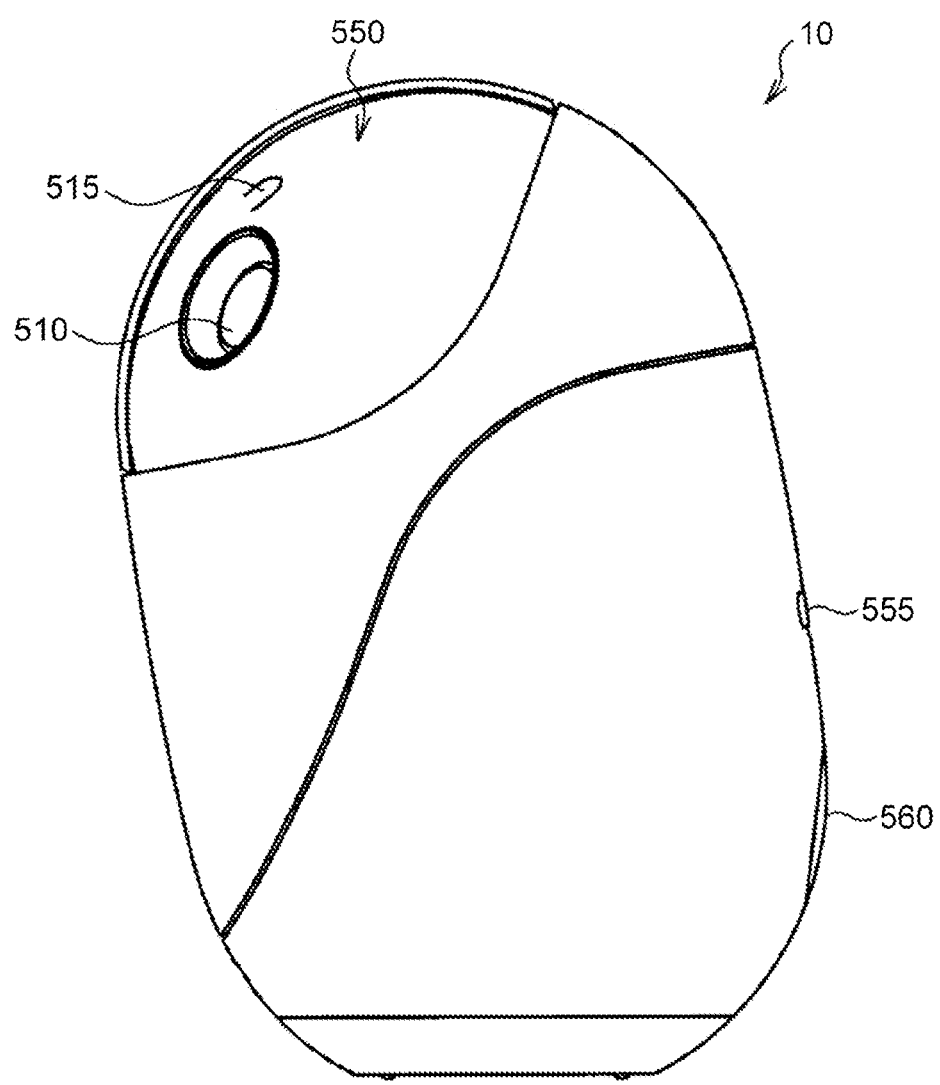
FIG. 3 is a side view of the autonomous mobile body according to the first embodiment.
Figure 4:
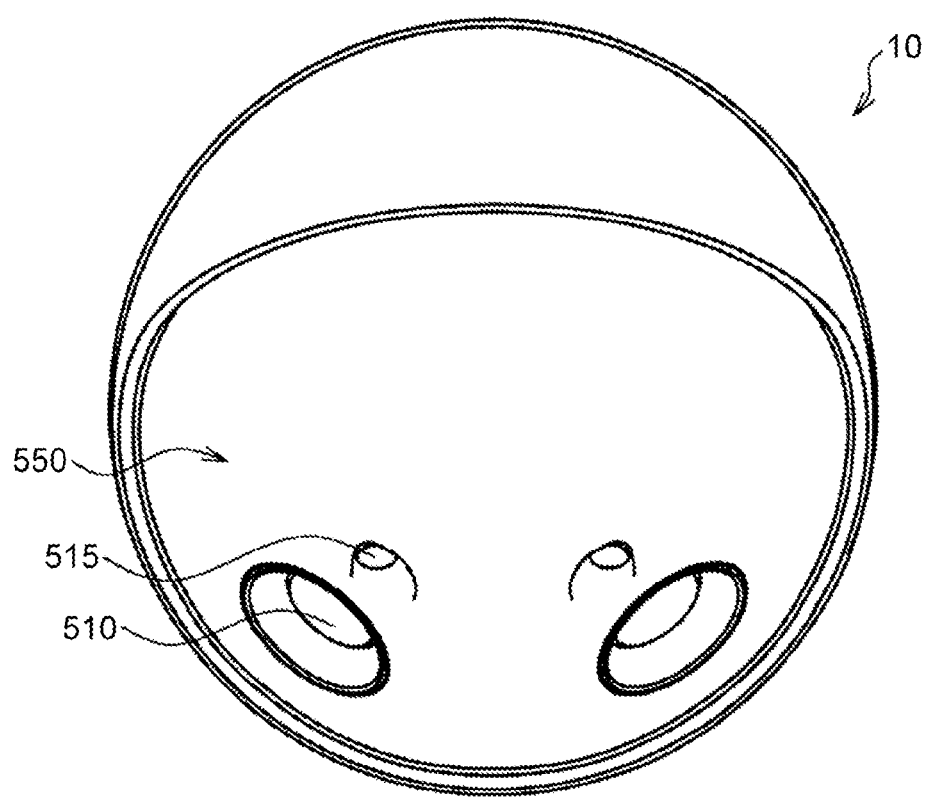
FIG. 4 is a top view of the autonomous mobile body according to the first embodiment.
Figure 5:
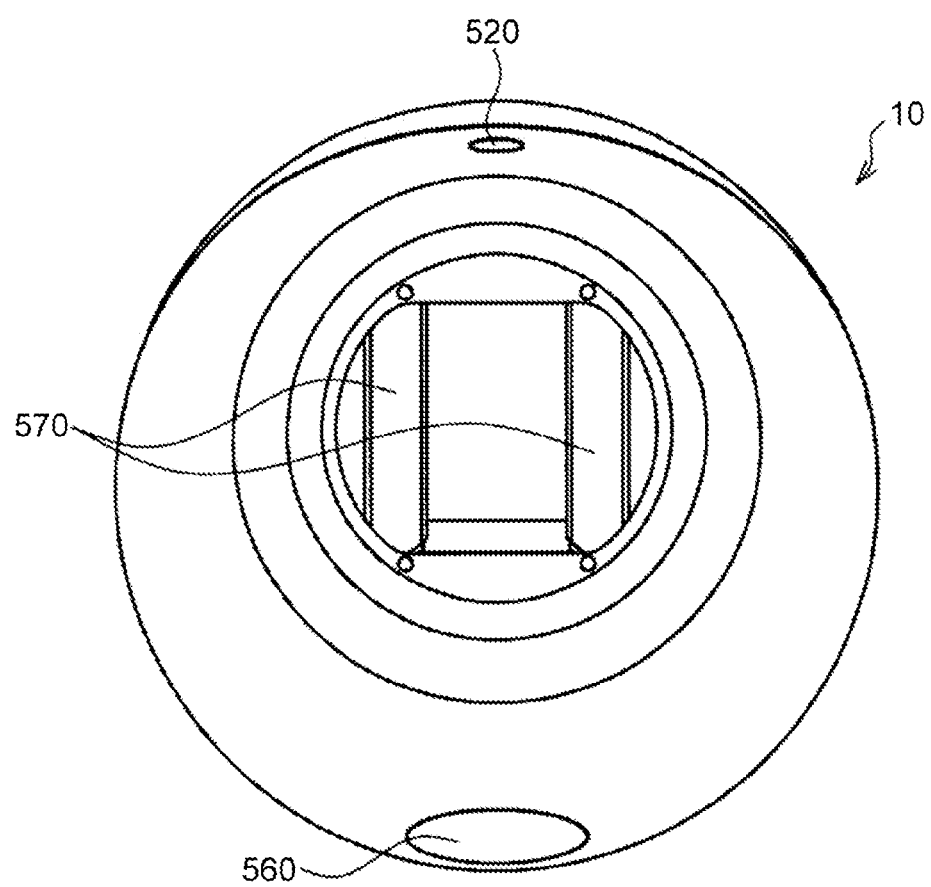
FIG. 5 is a bottom view of the autonomous mobile body according to the first embodiment.

First, an example of an exterior of the autonomous mobile body 10 according to the present embodiment will be described with reference to FIG. 1 to FIG. 5. FIG. 1 is a front view and a rear view of the autonomous mobile body 10 according to the present embodiment. FIG. 2 is a perspective view of the autonomous mobile body 10 according to the present embodiment. FIG. 3 is a side view of the autonomous mobile body 10 according to the present embodiment. FIG. 4 and FIG. 5 are a top view and a bottom view, respectively, of the autonomous mobile body 10 according to the present embodiment.

As illustrated in FIG. 1 to FIG. 4, the autonomous mobile body 10 according to the present embodiment includes two eye parts 510 corresponding to a right eye and a left eye in an upper section of a main body. Each of the eye parts 510 is realized by, for example, an LED, and can express a line of sight, blinks, and the like. Note that the eye parts 510 are not limited to the above example, and may be realized by, for example, two single or independent organic light emitting diodes (OLEDs).

Furthermore, the autonomous mobile body 10 according to the present embodiment includes one or more cameras 515 above the eye parts 510. The camera 515 has a function of imaging the user and a surrounding environment. The autonomous mobile body 10 may realize simultaneous localization and mapping (SLAM) on the basis of an image captured by the camera 515.

Note that the eye parts 510 and the camera 515 according to the present embodiment are placed on a substrate 505 arranged inside an exterior surface. In addition, in the present embodiment, the exterior surface of the autonomous mobile body 10 is basically formed using an opaque material, but a head cover 550 using a transparent or translucent material is provided for sections corresponding to the substrate 505 on which the eye parts 510 and the camera 515 are placed. As a result, the user can recognize the eye parts 510 of the autonomous mobile body 10, and the autonomous mobile body 10 can image the outside.

Furthermore, as illustrated in FIGS. 1, 2, and 5, the autonomous mobile body 10 according to the present embodiment includes a time of flight (ToF) sensor 520 in a front lower section. The ToF sensor 520 has a function of detecting a distance to an object present ahead. According to the ToF sensor 520, distances to various objects can be detected with high accuracy, and it is possible to prevent fall or overturn by detecting a step or the like.

Furthermore, as illustrated in FIGS. 1, 3, and the like, the autonomous mobile body 10 according to the present embodiment may include a connection terminal 555 for an external device and a power switch 560 on a rear surface.

The autonomous mobile body 10 can be connected to the external device via the connection terminal 555 to perform information communication.

In addition, as illustrated in FIG. 5, the autonomous mobile body 10 according to the present embodiment includes two wheels 570 on a bottom surface. The wheels 570 according to the present embodiment are driven by different motors 565. As a result, the autonomous mobile body 10 can realize movements such as forward movement, backward movement, turning, and rotation. Further, the wheels 570 according to the present embodiment may be provided so as to be housed inside the main body and projectable outward. In this case, for example, the autonomous mobile body 10 can jump by vigorously projecting the two wheels 570 outward. FIG. 5 illustrates a state in which the wheels 570 are housed inside the main body.

Figure 6:
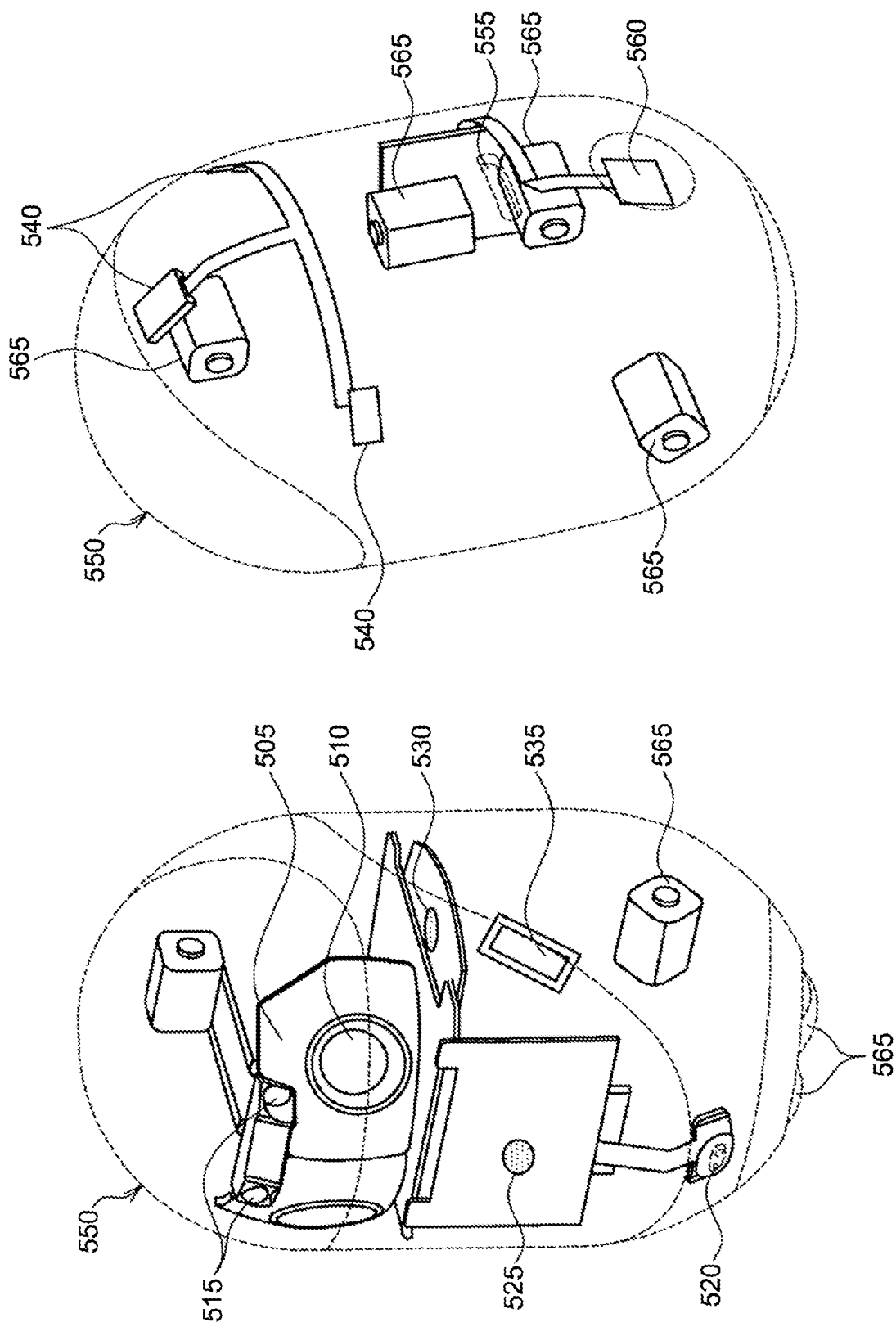
FIG. 6 is a schematic view illustrating an internal structure of the autonomous mobile body according to the first embodiment.

The exterior of the autonomous mobile body 10 according to the present embodiment has been described above. Next, an internal structure of the autonomous mobile body 10 according to the present embodiment will be described. FIG. 6 is a schematic view illustrating the internal structure of the autonomous mobile body 10 according to the present embodiment.

As illustrated on the left side of FIG. 6, the autonomous mobile body 10 according to the present embodiment includes an inertial sensor 525 and a communication device 530 arranged on an electronic substrate. The inertial sensor 525 detects acceleration and angular velocity of the autonomous mobile body 10. The communication device 530 is a configuration for realizing wireless communication with the outside, and includes, for example, Bluetooth (registered trademark), a Wi-Fi (registered trademark) antenna, and the like.

Furthermore, the autonomous mobile body 10 includes, for example, a speaker 535 inside a side surface of the main body. The autonomous mobile body 10 can output various kinds of sound information including voice through the speaker 535.

Furthermore, as illustrated on the right side of FIG. 6, the autonomous mobile body 10 according to the present embodiment includes a plurality of microphones 540 inside the upper section of the main body. The microphones 540 collect user's utterance and ambient environmental sound. Furthermore, since the autonomous mobile body 10 includes the plurality of microphones 540, it is possible to collect sounds generated in the surroundings with high sensitivity to realize localization of a sound source.

Furthermore, as illustrated in FIG. 6, the autonomous mobile body 10 includes a plurality of motors 565. The autonomous mobile body 10 may include, for example, two motors 565 for vertically and horizontally driving the substrate on which the eye parts 510 and the camera 515 are placed, two motors 565 for driving the left and right wheels 570, and one motor 565 for realizing the forward inclination posture of the autonomous mobile body 10. The autonomous mobile body 10 according to the present embodiment can express ample actions by the plurality of motors 565.

Figure 7:
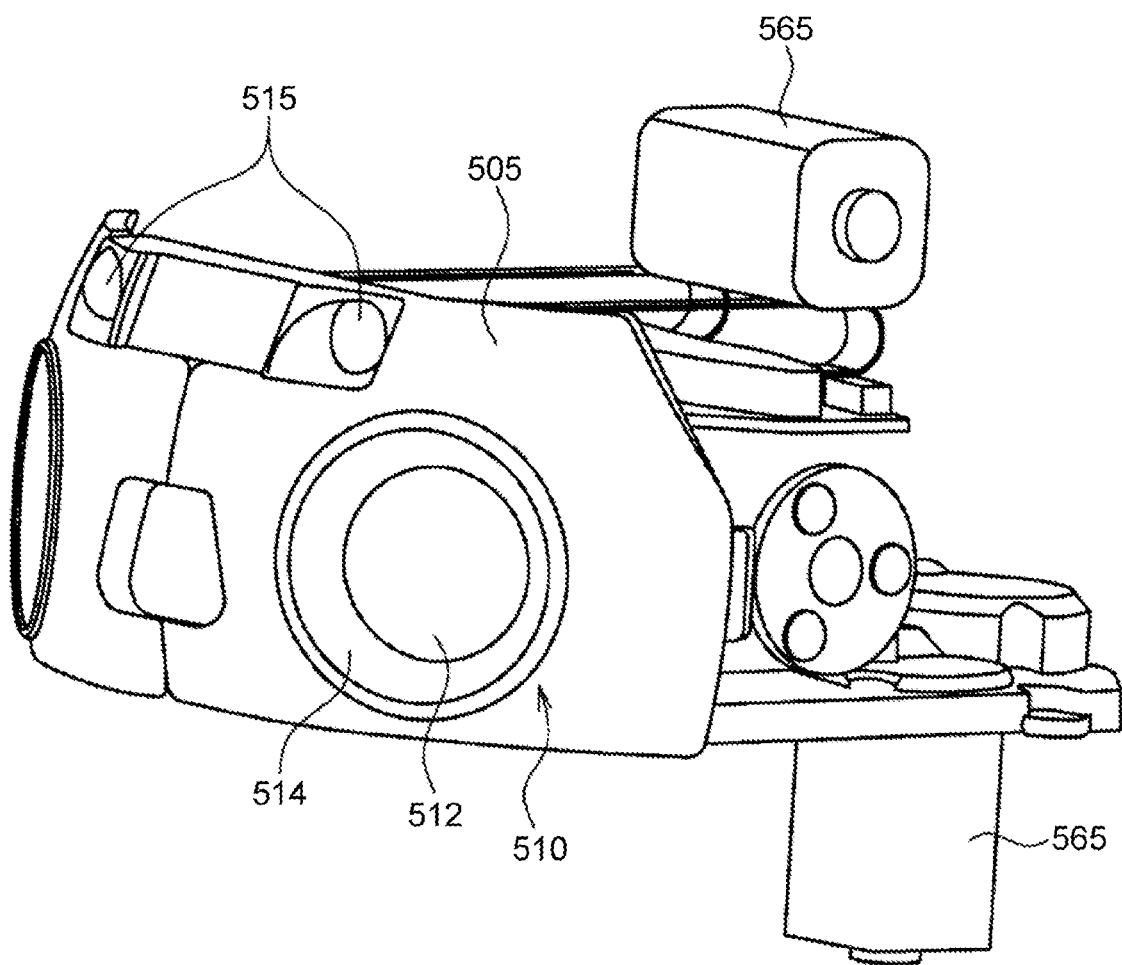
FIG. 7 is a diagram illustrating a configuration of a substrate according to the first embodiment.
Figure 8:
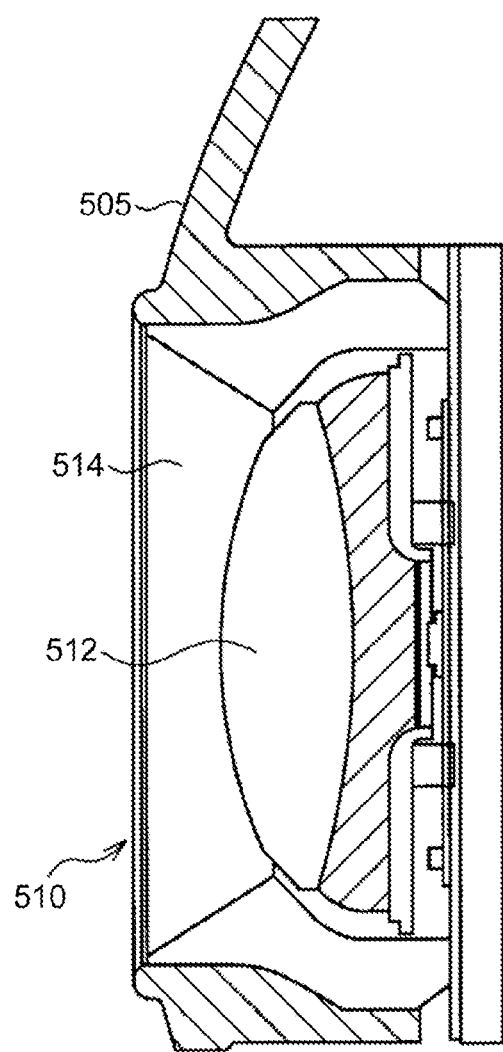
FIG. 8 is a sectional view of the substrate according to the first embodiment.

Next, a configuration of the substrate 505 on which the eye parts 510 and the camera 515 according to the present embodiment are placed and a configuration of the eye parts 510 will be described in detail. FIG. 7 is a diagram illustrating the configuration of the substrate 505 according to the present embodiment. FIG. 8 is a sectional view of the substrate 505 according to the present embodiment. Referring to FIG. 7, the substrate 505 according to the present embodiment is connected to the two motors 565. As described above, the two motors 565 can vertically and horizontally drive the substrate 505 on which the eye parts 510 and the camera 515 are placed. As a result, each of the eye parts 510 of the autonomous mobile body 10 can be flexibly moved in the vertical direction and the horizontal direction, and an ample eyeball movement can be expressed according to the situation and the operation.

Furthermore, as illustrated in FIG. 7 and FIG. 8, the eye part 510 includes a central portion 512 corresponding to an iris and a peripheral edge portion 514 corresponding to a white part of the eye. The central portion 512 expresses any color including blue, red, and green, and the peripheral edge portion 514 expresses white. As described above, the autonomous mobile body 10 according to the present embodiment can express a natural eyeball expression close to an actual living thing by separating the configuration of the eye part 510 into two portions.

Figure 9:
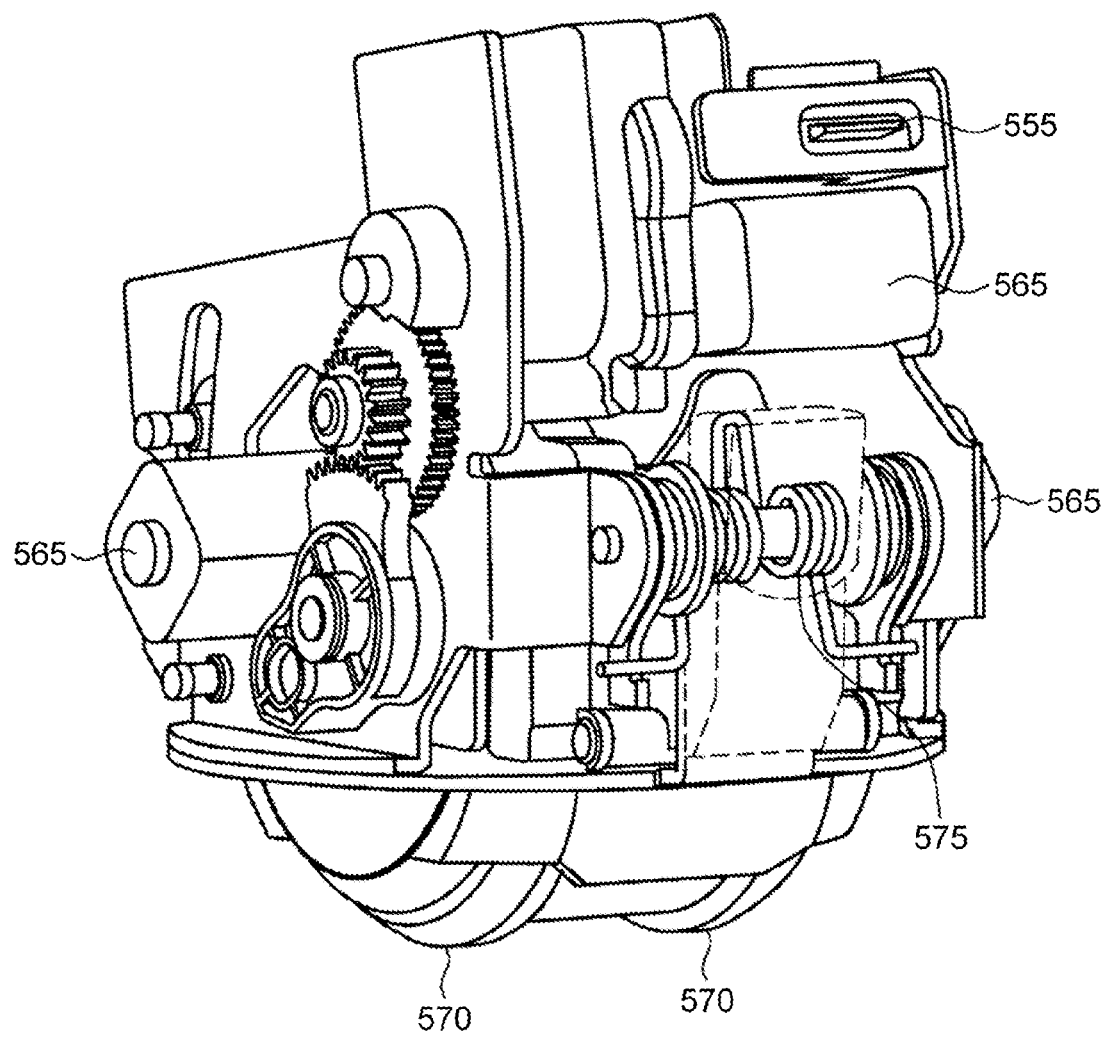
FIG. 9 is a diagram illustrating a peripheral structure of a wheel according to the first embodiment.
Figure 10:
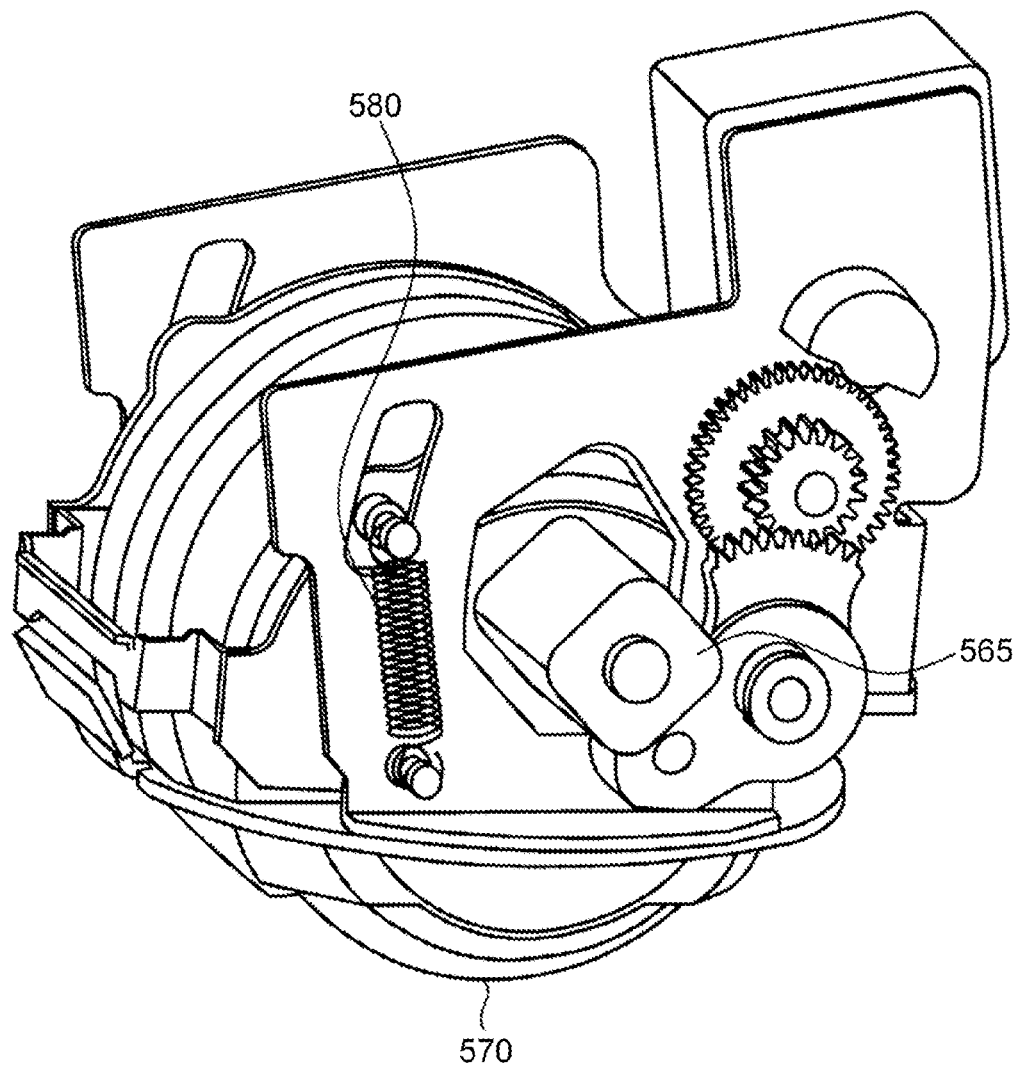
FIG. 10 is a diagram illustrating the peripheral structure of the wheel according to the first embodiment.

Next, a structure of the wheels 570 according to the present embodiment will be described in detail with reference to FIG. 9 and FIG. 10. FIG. 9 and FIG. 10 are diagrams illustrating a peripheral structure of the wheel 570 according to the present embodiment. As illustrated in FIG. 9, the two wheels 570 according to the present embodiment are driven by independent motors 565. According to such a configuration, it is possible to express delicate movements such as turning and rotation on the spot in addition to simple forward and backward movements.

As described above, the wheels 570 according to the present embodiment are provided so as to be housed inside the main body and projectable outward. In addition, since a damper 575 is provided coaxially with the wheels 570 according to the present embodiment, it is possible to effectively reduce transmission of impact and vibration to an axle and the main body.

As illustrated in FIG. 10, each of the wheels 570 according to the present embodiment may be provided with an auxiliary spring 580. Driving of the wheel according to the present embodiment requires the most torque in driving parts included in the autonomous mobile body 10. However, by providing the auxiliary spring 580, a common motor 565 can be used without using different motors 565 for the respective driving parts.

Figure 11:
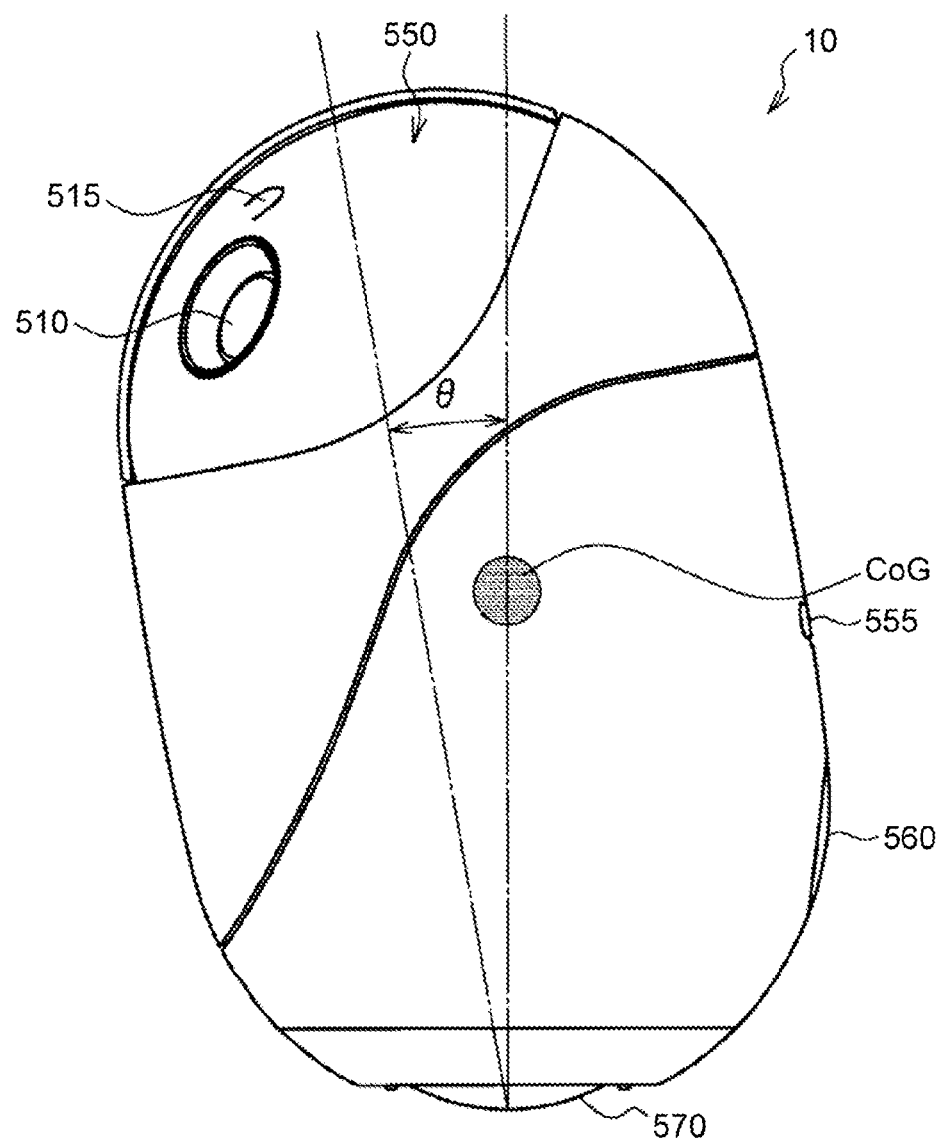
FIG. 11 is a diagram illustrating a forward inclination travel of the autonomous mobile body according to the first embodiment.

Next, features at the time of traveling of the autonomous mobile body 10 according to the present embodiment will be described. FIG. 11 is a diagram illustrating a forward inclination travel of the autonomous mobile body 10 according to the present embodiment. One of the features of the autonomous mobile body 10 according to the present embodiment is that the autonomous mobile body 10 performs movement such as a back-and-forth motion, a turning motion, and a rotational motion while maintaining a forward inclination posture. FIG. 11 illustrates a side view of the autonomous mobile body 10 during traveling.

As illustrated in FIG. 11, one of the features of the autonomous mobile body 10 according to the present embodiment is that the autonomous mobile body 10 is inclined forward by an angle θ in a vertical direction during movement. The angle θ may be, for example, 10°.

Figure 12:
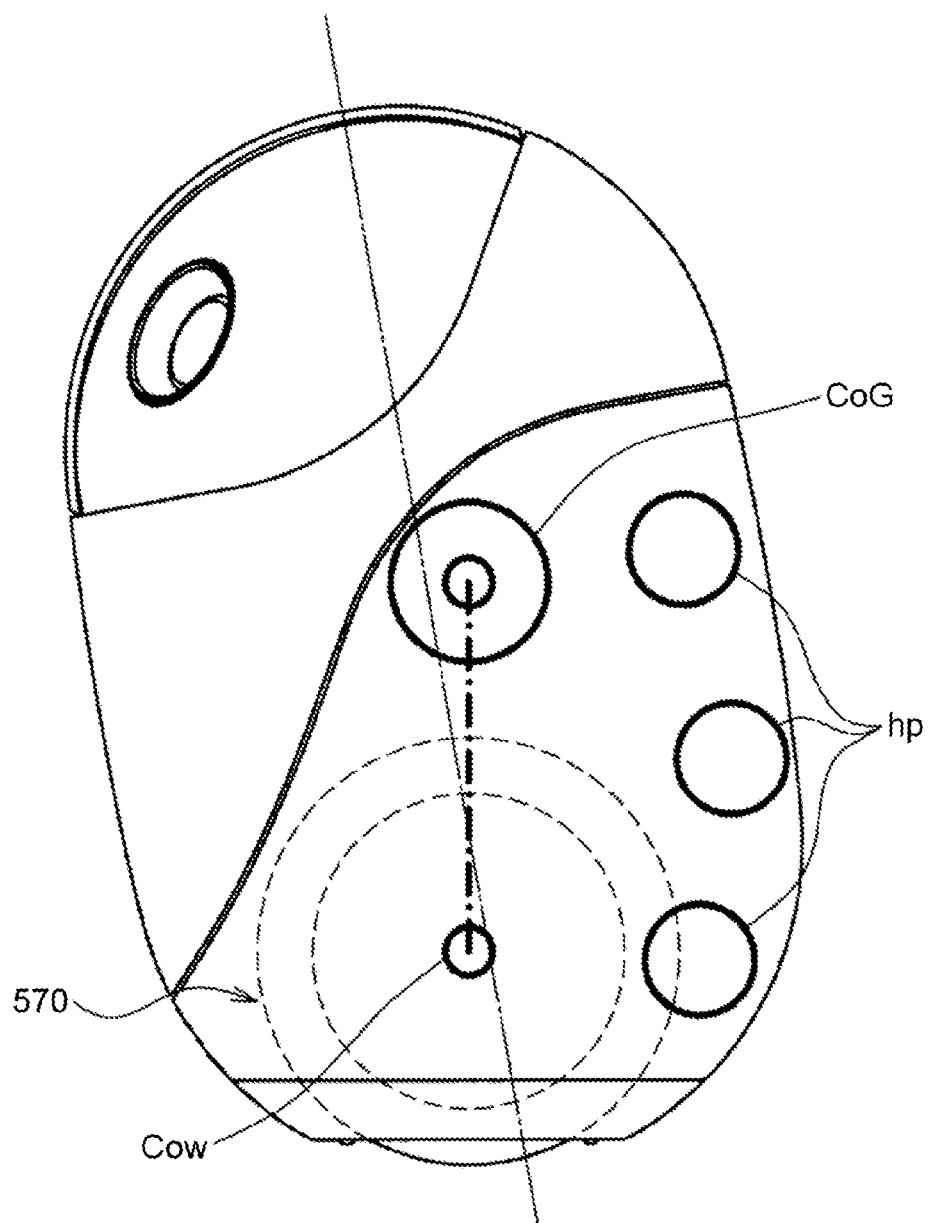
FIG. 12 is a diagram illustrating the forward inclination travel of the autonomous mobile body according to the first embodiment.

In this case, as illustrated in FIG. 12, an operation control unit 230 of an information processing server 20 to be described later controls the movement of the autonomous mobile body 10 such that a center of gravity CoG of the autonomous mobile body 10 is positioned vertically above a rotation axis CoW of the wheel 570. In addition, on a back side of the autonomous mobile body 10 according to the present embodiment, a weight piece hp is arranged to maintain balance during the forward inclination posture. The weight piece hp according to the present embodiment may be a piece heavier than other components of the autonomous mobile body 10. For example, the weight piece hp may be the motor 565, a battery, or the like. According to the component arrangement described above, a posture control is easy in a balanced state even when the head part inclines forward, and the autonomous mobile body 10 can realize the stable forward inclination travel by preventing unintentional overturn.

Next, the movement in which the forward inclination posture is maintained by the autonomous mobile body 10 according to the present embodiment will be described in more detail. FIGS. 13A and 13B are diagrams illustrating an effect obtained by the forward inclination of the autonomous mobile body 10 according to the present embodiment.

Here, FIG. 13A illustrates an example of the rotational motion in a case where the autonomous mobile body does not take the forward inclination posture. As illustrated in FIG. 13A, in a case where the autonomous mobile body 10 performs the movement such as the rotational motion and the back-and-forth motion while keeping the long-elliptic body upright without taking the forward inclination posture, a direction of the long-elliptic body cannot be recognized, and it is difficult to eliminate an impression that the autonomous mobile body is an artificial object.

On the other hand, as illustrated in FIG. 13B, one of the features of the autonomous mobile body 10 according to the present embodiment is that the movement such as rotation is performed in the state that the forward inclination posture is maintained. According to this feature, since an upper front section of the autonomous mobile body 10 evokes a head and a lower rear section evokes a waist, directionality occurs even in a simple long-elliptic body.

As described above, the forward inclination of the autonomous mobile body 10 according to the present embodiment enables to express a structure corresponding to a human body part using a relatively simple exterior. It is possible to give an impression to the user of a living thing beyond a simple artificial object by anthropomorphizing a simple form. As described above, it can be said that the forward inclination according to the present embodiment is a very effective way of providing ample expressions with a robot having a relatively simple exterior such as the long-elliptic body, and evoking a complicated motion like an actual living thing.

The configuration example of the autonomous mobile body 10 according to the first embodiment of the present disclosure has been described in detail. Note that the configuration described above with reference to FIGS. 1, 2, 3, 4, 5, 6, 7, 8, 9, 10, 11, 12, 13A and FIG. 13B are merely an examples, and the configuration of the autonomous mobile body 10 according to the first embodiment of the present disclosure is not limited to the example. The shape and the internal structure of the autonomous mobile body 10 according to the present embodiment can be arbitrarily designed. The autonomous mobile body 10 according to the present embodiment can also be realized as, for example, a walking type, a flying type, or a swimming type robot.

1.3 System Configuration Example

Figure 14:
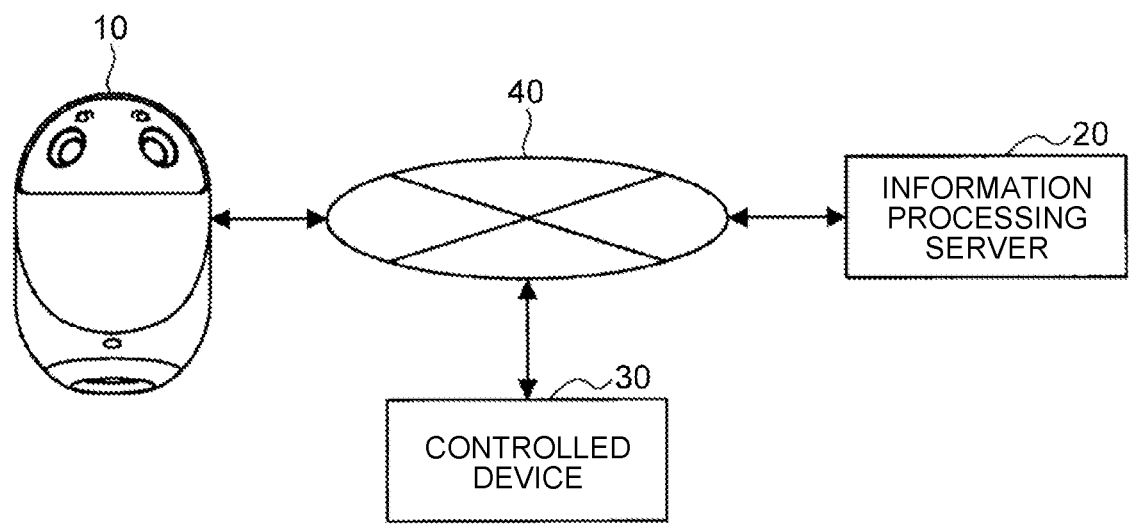
FIG. 14 is a block diagram illustrating a configuration example of an information processing system according to the first embodiment.

Next, a configuration example of an information processing system according to the first embodiment of the present disclosure will be described. FIG. 14 is a block diagram illustrating the configuration example of the information processing system according to the present embodiment. Referring to FIG. 14, the information processing system according to the present embodiment includes the autonomous mobile body 10, the information processing server 20, and a controlled device 30. In addition, these components are connected via a network 40.

(Autonomous Mobile Body 10)

The autonomous mobile body 10 according to the present embodiment is an information processing apparatus that performs an autonomous action based on control by the information processing server 20. As described above, the autonomous mobile body 10 according to the present embodiment can be various robots such as a traveling type, a walking type, a flying type, and a swimming type.

(Information Processing Server 20)

The information processing server 20 according to the present embodiment is an information processing apparatus that controls the operation of the autonomous mobile body 10. The information processing server 20 according to the present embodiment has a function of causing the autonomous mobile body 10 to execute various inducing actions that induce communication with the user. Note that one of the features of the inducing action and the communication is a behavior of the autonomous mobile body 10 in the physical space.

(Controlled Device 30)

The controlled device 30 according to the present embodiment is various devices operated by the information processing server 20 and the autonomous mobile body 10. The autonomous mobile body 10 according to the present embodiment can operate various controlled devices 30 on the basis of the control by the information processing server 20. The controlled device 30 according to the present embodiment may be, for example, a home appliance such as a lighting device, a game device, or a television device.

(Network 40)

The network 40 has a function of connecting the components of the information processing system. The network 40 may include a public line network such as the Internet, a telephone line network, and a satellite communication network, various local area networks (LANs) including Ethernet (registered trademark), a wide area network (WAN), or the like. Furthermore, the network 40 may include a dedicated line network such as an Internet protocol-virtual private network (IP-VPN). Furthermore, the network 40 may include a wireless communication network such as Wi-Fi (registered trademark) or Bluetooth (registered trademark).

The system configuration example according to the first embodiment of the present disclosure has been described above. Note that the configuration described above with reference to FIG. 14 is merely an example, and the configuration of the information processing system according to the first embodiment of the present disclosure is not limited to the example. For example, a control function of the information processing server 20 may be implemented as a function of the autonomous mobile body 10. The system configuration according to the first embodiment of the present disclosure can be flexibly modified according to specifications and operations.

1.4 Functional Configuration Example of Autonomous Mobile Body

Figure 15:
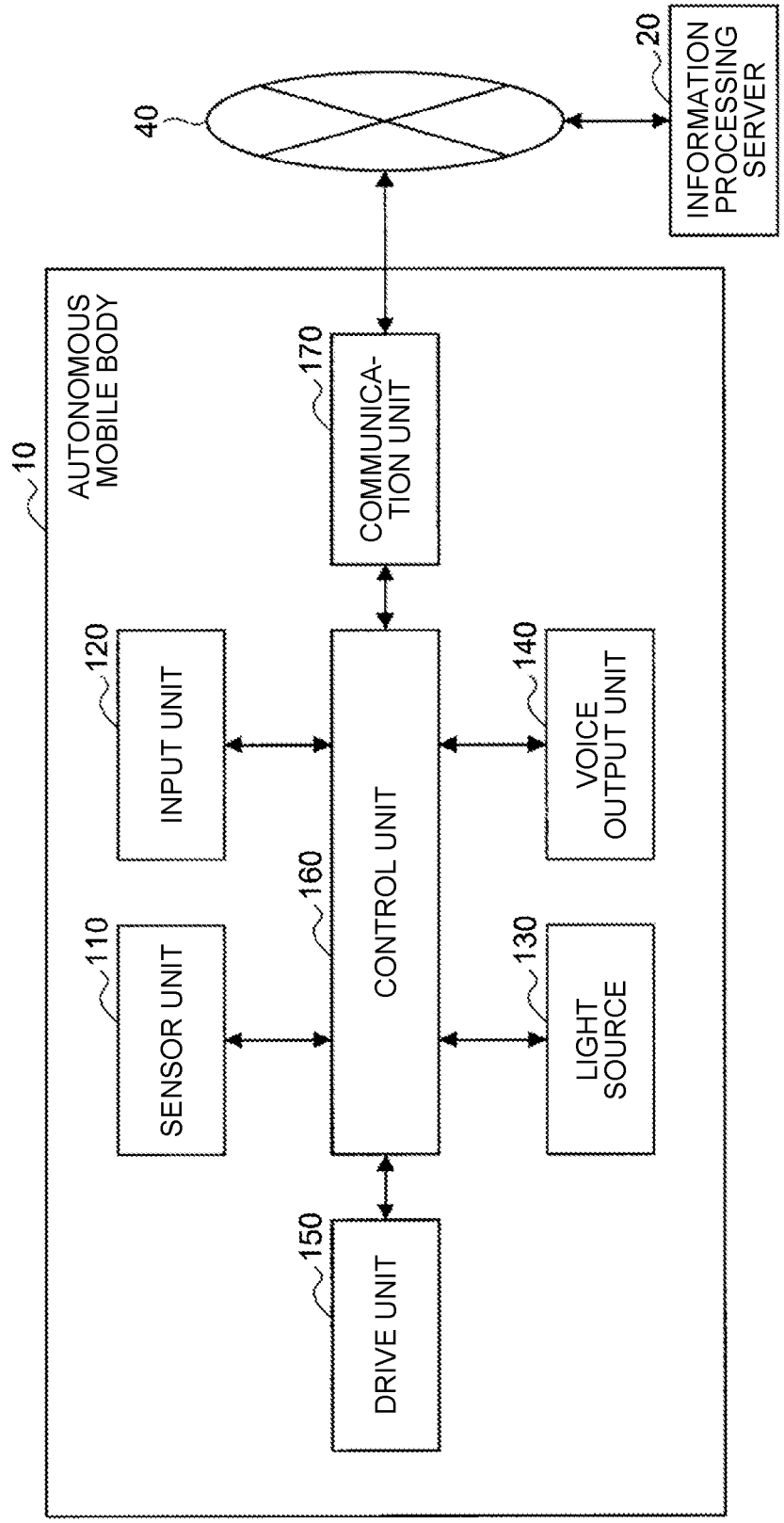
FIG. 15 is a block diagram illustrating a functional configuration example of the autonomous mobile body according to the first embodiment.

Next, a functional configuration example of the autonomous mobile body 10 according to the first embodiment of the present disclosure will be described. FIG. 15 is a block diagram illustrating the functional configuration example of the autonomous mobile body 10 according to the present embodiment. Referring to FIG. 15, the autonomous mobile body 10 according to the present embodiment includes a sensor unit 110, an input unit 120, a light source 130, a voice output unit 140, a drive unit 150, a control unit 160, and a communication unit 170.

(Sensor Unit 110)

The sensor unit 110 according to the present embodiment has a function of collecting various types of sensor information related to the user and the surroundings. For this purpose, the sensor unit 110 according to the present embodiment includes, for example, the camera 515, the ToF sensor 520, the microphone 540, the inertial sensor 525, and the like described above. Furthermore, in addition to the above, the sensor unit 110 may include, for example, various sensors such as various optical sensors including a geomagnetic sensor, a touch sensor, an infrared sensor, and the like, a temperature sensor, a humidity sensor, and the like.

(Input Unit 120)

The input unit 120 according to the present embodiment has a function of detecting a physical input operation by the user. The input unit 120 according to the present embodiment includes, for example, a button such as a power switch 560.

(Light Source 130)

The light source 130 according to the present embodiment expresses eyeball movement of the autonomous mobile body 10. For this purpose, the light source 130 according to the present embodiment includes two eye parts 510.

(Voice Output Unit 140)

The voice output unit 140 according to the present embodiment has a function of outputting various sounds including voice. For this purpose, the voice output unit 140 according to the present embodiment includes a speaker 535, an amplifier, and the like.

(Drive Unit 150)

The drive unit 150 according to the present embodiment expresses a physical action of the autonomous mobile body 10. For this purpose, the drive unit 150 according to the present embodiment includes the two wheels 570 and the plurality of motors 565.

(Control Unit 160)

The control unit 160 according to the present embodiment has a function of controlling each component of the autonomous mobile body 10. The control unit 160 controls, for example, start and stop of each component. Furthermore, the control unit 160 inputs a control signal generated by the information processing server 20 to the light source 130, the voice output unit 140, and the drive unit 150. Furthermore, the control unit 160 according to the present embodiment may have a function equivalent to that of the operation control unit 230 of the information processing server 20 described later.

(Communication Unit 170)

The communication unit 170 according to the present embodiment performs information communication with the information processing server 20, the controlled device 30, and other external devices. For this purpose, the communication unit 170 according to the present embodiment includes the connection terminal 555 and the communication device 530.

The functional configuration example of the autonomous mobile body 10 according to the first embodiment of the present disclosure has been described above. Note that the above-described configuration described with reference to FIG. 15 is merely an example, and the functional configuration of the autonomous mobile body 10 according to the first embodiment of the present disclosure is not limited to the example. For example, the autonomous mobile body 10 according to the present embodiment may not necessarily include all of the components illustrated in FIG. 15. The functional configuration of the autonomous mobile body 10 according to the present embodiment can be flexibly modified according to the shape of the autonomous mobile body 10 or the like.

1.5 Functional Configuration Example of Information Processing Server

Figure 16:
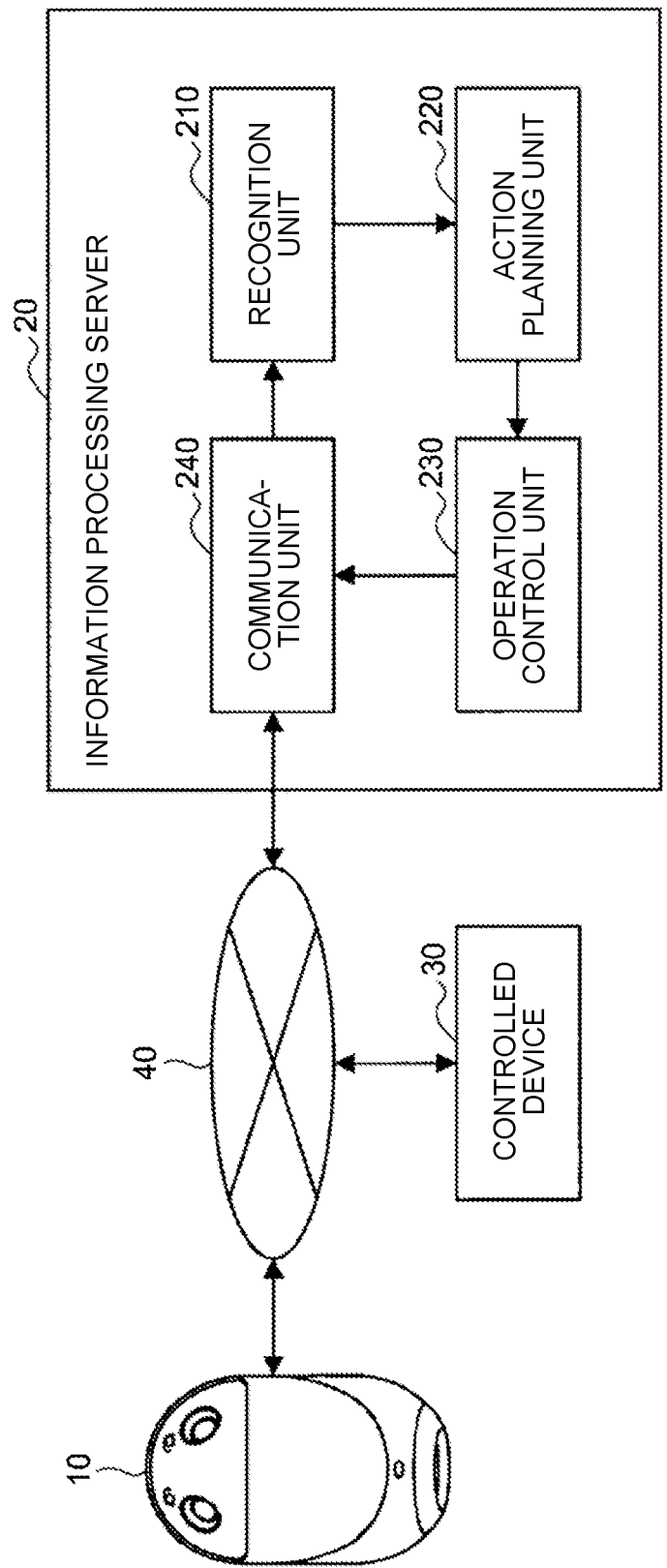
FIG. 16 is a block diagram illustrating a functional configuration example of an information processing server according to the first embodiment.

Next, a functional configuration example of the information processing server 20 according to the first embodiment of the present disclosure will be described. FIG. 16 is a block diagram illustrating the functional configuration example of the information processing server 20 according to the present embodiment. Referring to FIG. 16, the information processing server 20 according to the present embodiment includes a recognition unit 210, an action planning unit 220, the operation control unit 230, and a communication unit 240.

(Recognition Unit 210)

The recognition unit 210 has a function of performing various types of recognition related to the user, the surrounding environment, and the state of the autonomous mobile body 10 on the basis of the sensor information collected by the autonomous mobile body 10. As an example, the recognition unit 210 may perform user identification, recognition of a facial expression or a line of sight, object recognition, color recognition, shape recognition, marker recognition, obstacle recognition, step recognition, brightness recognition, and the like.

Furthermore, the recognition unit 210 performs emotion recognition related to the user's voice, understanding of words, sound source localization, and the like. In addition, the recognition unit 210 can recognize an ambient temperature, the presence of a mobile body, the posture of the autonomous mobile body 10, and the like.

Furthermore, the recognition unit 210 has a function of estimating and understanding the surrounding environment and a situation in which the autonomous mobile body 10 is placed on the basis of the above information recognized. Here, the recognition unit 210 may comprehensively perform situation estimation using environmental knowledge stored in advance.

(Action Planning Unit 220)

The action planning unit 220 has a function of planning an action performed by the autonomous mobile body 10 on the basis of the situation estimated by the recognition unit 210 and a learned knowledge. The action planning unit 220 executes an action plan using, for example, a machine learning algorithm such as deep learning.

(Operation Control Unit 230)

The operation control unit 230 according to the present embodiment controls the operation of the autonomous mobile body 10 on the basis of the action plan by the action planning unit 220. For example, the operation control unit 230 may move the autonomous mobile body 10 having a long-elliptic outer shape while maintaining the forward inclination posture. As described above, the movement includes the back-and-forth motion, the turning motion, the rotational motion, and the like. Furthermore, one of the features of the operation control unit 230 according to the present embodiment is to cause the autonomous mobile body 10 to actively execute the inducing action that induces communication between the user and the autonomous mobile body 10. As described above, the inducing action and the communication according to the present embodiment may include a physical behavior of the autonomous mobile body 10 in the physical space. Details of the inducing action realized by the operation control unit 230 according to the present embodiment will be separately described later.

(Communication Unit 240)

The communication unit 240 according to the present embodiment performs information communication with the autonomous mobile body 10 and an operation target. For example, the communication unit 240 receives the sensor information from the autonomous mobile body 10, and transmits a control signal related to the operation to the autonomous mobile body 10.

The functional configuration example of the information processing server 20 according to the first embodiment of the present disclosure has been described above. Note that the configuration described above with reference to FIG. 16 is merely an example, and the functional configuration of the information processing server 20 according to the first embodiment of the present disclosure is not limited to the example. For example, various functions of the information processing server 20 may be distributed and implemented by a plurality of devices. Furthermore, the function of the information processing server 20 may be implemented as a function of the autonomous mobile body 10. The functional configuration of the information processing server 20 according to the present embodiment can be flexibly modified according to specifications and operations.

1.6 Details of Inducing Action

Next, the inducing action of the autonomous mobile body 10 realized by the operation control unit 230 according to the present embodiment will be described with specific examples. As described above, the autonomous mobile body 10 according to the present embodiment can actively execute various inducing actions on the basis of the control by the operation control unit 230. Furthermore, the autonomous mobile body 10 according to the present embodiment can more impressively approach the user and activate communication by performing the inducing action accompanied by the physical behavior.

The inducing action according to the present embodiment may be, for example, an action for causing the user to perform a predetermined behavior. FIG. 17 to FIG. 20 are diagrams illustrating examples of the inducing action for causing the user to perform the predetermined behavior.

Figure 17:
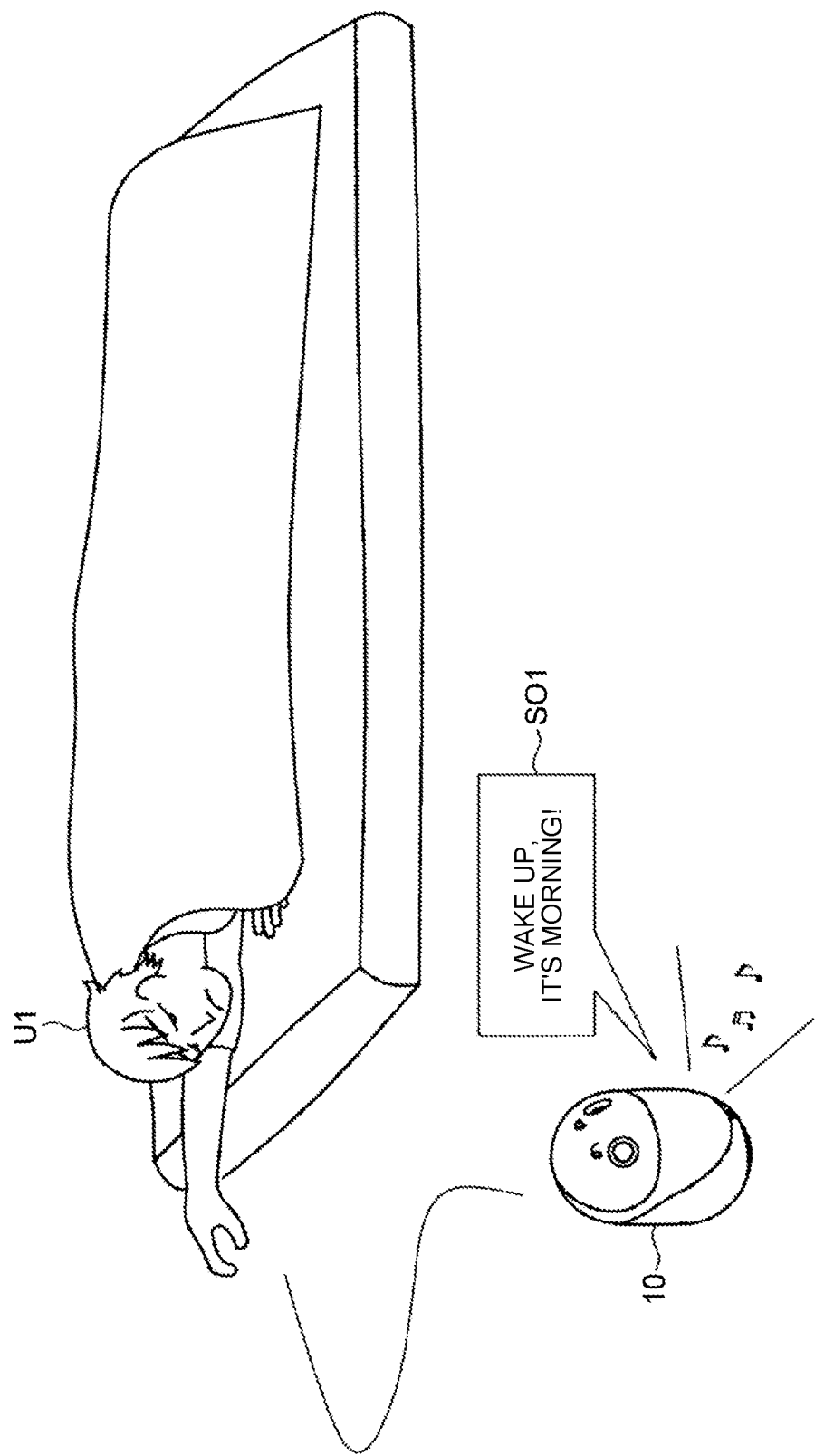
FIG. 17 is a diagram illustrating an example of an inducing action for causing a user to perform a predetermined behavior according to the first embodiment.

FIG. 17 illustrates an example that the autonomous mobile body 10 performs the inducing action of encouraging the user to wake up. The operation control unit 230 according to the present embodiment can cause the autonomous mobile body 10 to execute the inducing action of encouraging a user U1 to wake up on the basis of, for example, the user's daily wake-up habit or a schedule of the day.

Here, the operation control unit 230 causes the autonomous mobile body 10 to output a voice message SO1 such as "Wake up, it's morning!" and an alarm sound or background music (BGM). In this way, the inducing action according to the present embodiment includes a voice message to induce communication. Here, the operation control unit 230 according to the present embodiment may express adorableness, lovableness, or the like by intentionally limiting the number of words (nursery words) or utterance in a random order of words that is output from the autonomous mobile body 10. Note that a fluency of speech by the autonomous mobile body 10 may be improved by learning, or may be designed to speak fluently from the beginning. Furthermore, the setting may be changed on the basis of the setting by the user.

Furthermore, in a case where the user U1 attempts to stop the voice message SO1, the alarm sound, or the like, the operation control unit 230 may cause the autonomous mobile body 10 to execute the inducing action of escaping from the user U1 so as to disturb stopping. In this way, the operation control unit 230 and the autonomous mobile body 10 according to the present embodiment can realize deeper continuous communication accompanied by the physical action, unlike the case of simply and passively outputting the alarm sound at a set time.

Figure 18:
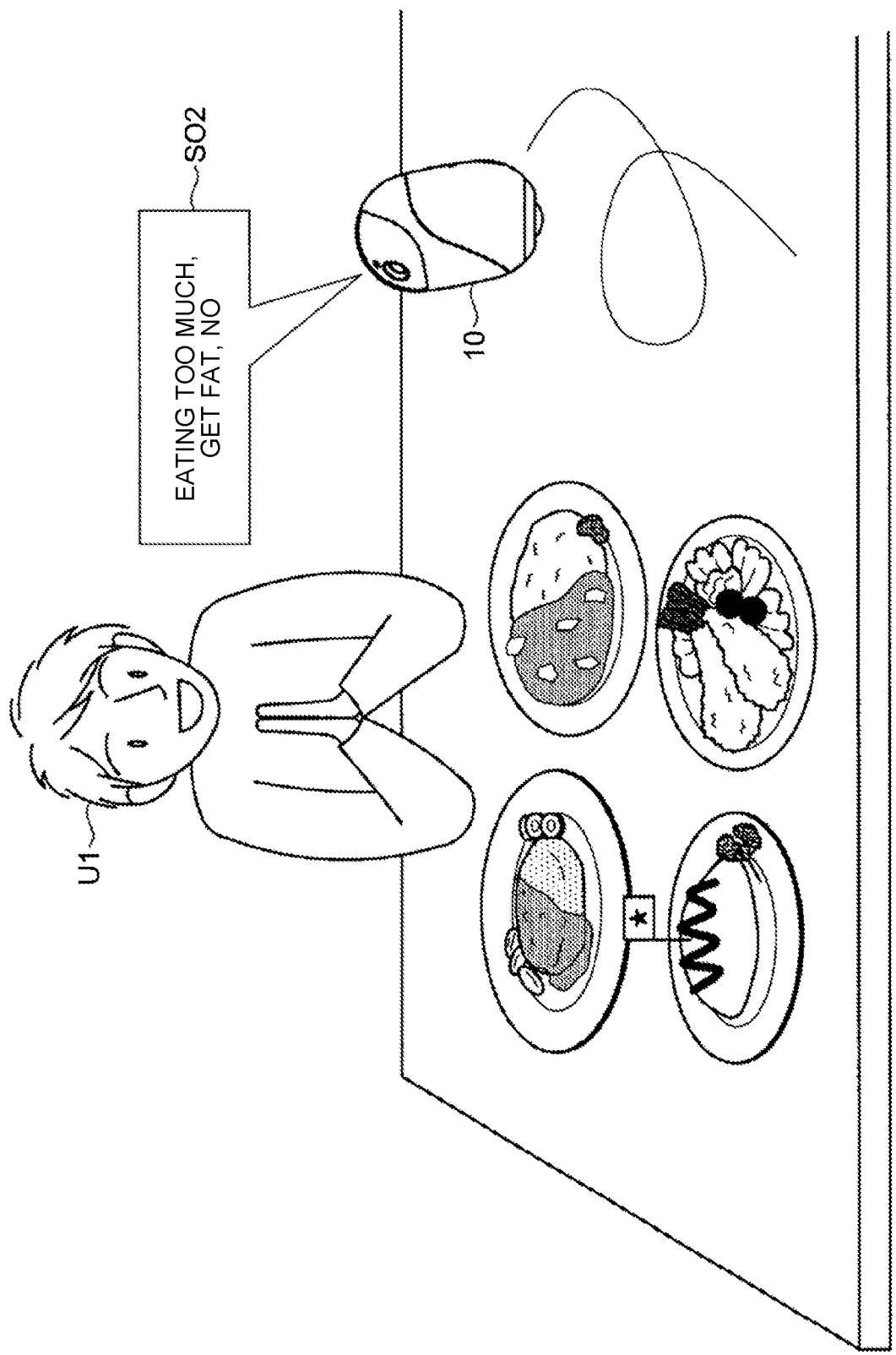
FIG. 18 is a diagram illustrating an example of the inducing action for causing the user to perform the predetermined behavior according to the first embodiment.

In addition, FIG. 18 illustrates an example that the autonomous mobile body 10 performs the inducing action of urging the user U1 to stop eating too much. In this way, the inducing action of causing the user to perform the predetermined behavior according to the present embodiment may include an action of stopping the predetermined behavior. In the example illustrated in FIG. 18, the operation control unit 230 causes the autonomous mobile body 10 to output a voice message SO2 such as "Eating too much, get fat, no", and to execute the inducing action of running around on the table.

In this way, the operation control unit 230 and the autonomous mobile body 10 according to the present embodiment can give a stronger impression to the user for enhancing a warning effect by performing the warning accompanied by the physical action, as compared with the case of simply and passively giving a voice warning on a health condition based on an image recognition. Furthermore, according to the inducing action as illustrated in the drawing, the user who feels annoyed by the inducing action may try to stop the inducing action or make a complaint against the autonomous mobile body 10. Accordingly, an effect of causing further communication can also be expected.

Figure 19:
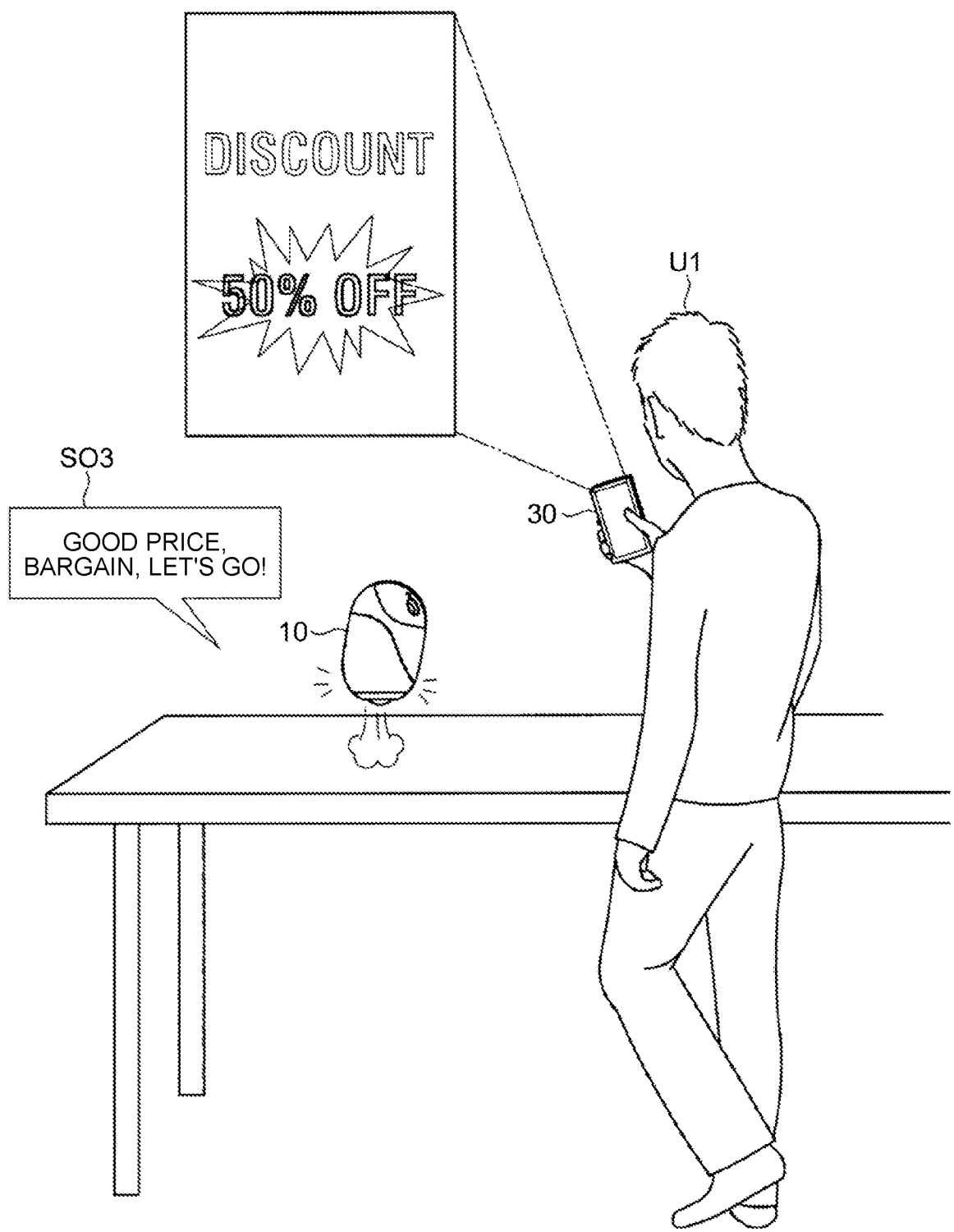
FIG. 19 is a diagram illustrating an example of the inducing action for causing the user to perform the predetermined behavior according to the first embodiment.

Furthermore, FIG. 19 illustrates an example that the autonomous mobile body 10 provides the user U1 with sale information and performs the inducing action of attracting the user to the sale. In this way, the information processing server 20 according to the present embodiment can cause the autonomous mobile body 10 to perform various information presentations on the basis of store information and event information collected on a network, preference of the user, or the like.

In the example illustrated in FIG. 19, the operation control unit 230 causes the autonomous mobile body 10 to output a voice message SO3 such as "Good price, bargain, let's go" and causes the controlled device 30 carried by the user U1 to display the sale information. Here, the operation control unit 230 may directly control the sale information displayed on the controlled device 30, or the control unit 160 of the autonomous mobile body 10 may execute the control via the communication unit 170.

Furthermore, in the example illustrated in FIG. 19, the operation control unit 230 causes the autonomous mobile body 10 to output the voice message SO3, and also causes the autonomous mobile body 10 to execute the inducing action including jumping. As described above, the autonomous mobile body 10 according to the present embodiment can realize the jumping motion by vigorously projecting the wheels 570 outward.

In this way, the operation control unit 230 and the autonomous mobile body 10 according to the present embodiment can give a stronger impression to the user to enhance the effect of providing information by making a recommendation accompanied by the physical action as compared with the case of simply making recommendation by using voice or visual information.

Furthermore, the operation control unit 230 according to the present embodiment may cause the autonomous mobile body 10 to output a voice message such as "Take me, let's go". The autonomous mobile body 10 according to the present embodiment has a size and a weight that can be easily lifted by the user with one hand. For example, the autonomous mobile body 10 can be formed in a size that can be placed in a plastic bottle holder provided in a vehicle. Therefore, the user can easily take the autonomous mobile body 10 outside. Furthermore, for example, while traveling by the vehicle, the operation control unit 230 can boost convenience of the user by causing the autonomous mobile body 10 to navigate the user to a destination, and the like.

Figure 20:
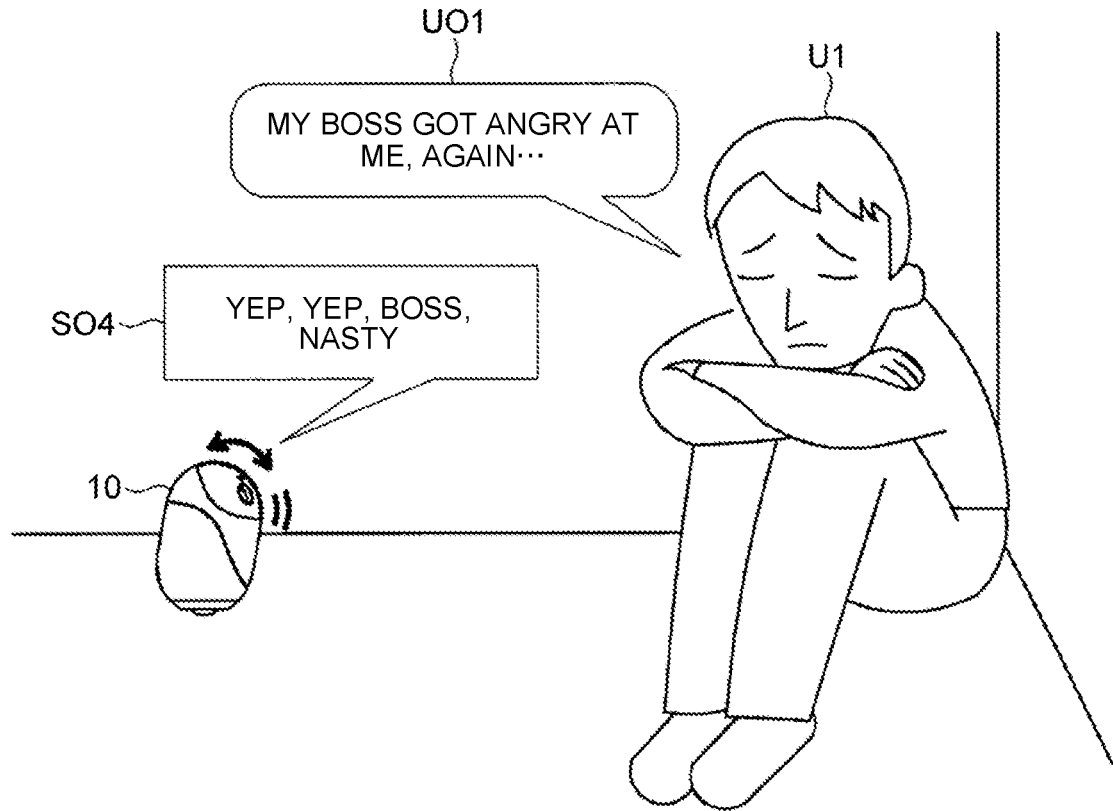
FIG. 20 is a diagram illustrating an example of the inducing action for causing the user to perform the predetermined behavior according to the first embodiment.

Furthermore, FIG. 20 illustrates an example that the autonomous mobile body 10 performs the inducing action of urging the user U1 to continue talking. In the example illustrated in FIG. 20, the operation control unit 230 controls the drive unit 150 of the autonomous mobile body 10 to repeat the forward inclination and backward inclination, thereby expressing nodding (feedback). Furthermore, the operation control unit 230 may cause the autonomous mobile body 10 to output a voice message SO4 using a word included in a user speech UO1 by the user U1, thereby emphasizing that the autonomous mobile body 10 is listening to the speech of the user U1.

Note that the information processing server 20 may cause the autonomous mobile body 10 to execute the above-described inducing actions in a case where it is recognized that the user U1 is depressed. For example, the operation control unit 230 causes the autonomous mobile body 10 to approach the user U1 and causes the autonomous mobile body 10 to output a voice message such as "What's wrong with you?" or "Tell me", so that it can encourage the user U1 to talk.

As described above, according to the operation control unit 230 and the autonomous mobile body 10 according to the present embodiment, it is possible to interact with the user as a more intimate and friendly companion for establishing deeper and continuous communication as compared with the case of simply responding to the user's speech.

Furthermore, the inducing action according to the present embodiment may include an action of causing the user to perform a cooperative behavior with the autonomous mobile body 10. The cooperative behavior includes, for example, playing game by the user and the autonomous mobile body 10. In other words, the operation control unit 230 according to the present embodiment can cause the autonomous mobile body 10 to execute the inducing action of inviting the user to play a game.

Figure 21:
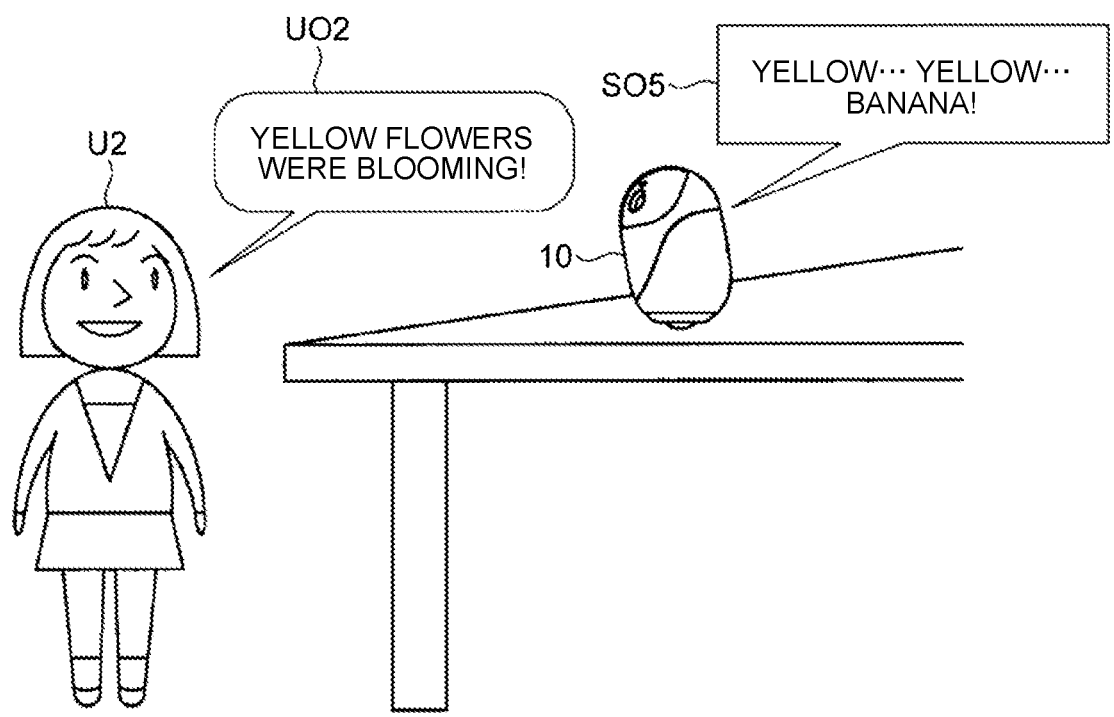
FIG. 21 is a diagram illustrating an example of the inducing action that induces a cooperative action between the user and the autonomous mobile body according to the first embodiment.

FIG. 21 to FIG. 24 are diagrams illustrating examples of the inducing actions that induce the cooperative behavior between the user and the autonomous mobile body 10 according to the present embodiment. FIG. 21 illustrates the example that the autonomous mobile body 10 plays an association game with a user U2. As described above, the game targeted by the autonomous mobile body 10 for the inducing action may include a game using language. Note that examples of the game using the language include, in addition to the association game illustrated in FIG. 21, "shiritori" in a Japanese region (corresponding to "Word Chain" in an English region), charades in which the autonomous mobile body 10 guesses a phrase that the user expresses with gestures, and the like.

Here, the operation control unit 230 may cause the autonomous mobile body 10 to explicitly invite the user to the game using a voice message, but may induce the user to participate in the game by unilaterally starting the game suddenly on the basis of the speech by the user. In the example illustrated in FIG. 21, based on a user speech UO2 of "Yellow flowers were blooming" made by the user U2, the operation control unit 230 causes the autonomous mobile body 10 to output a voice message SO5 related to the start of the association game using "yellow" included in the user speech.

Furthermore, FIG. 22 illustrates the example that the autonomous mobile body 10 plays a game called "Daruma-san ga koronda" (corresponding to "Red light/Green light", "Statues", or the like) with the user U2. As described above, games targeted by the autonomous mobile body 10 through the inducing action include a game that requires the physical action of the user and the autonomous mobile body 10.

As described above, since the autonomous mobile body 10 according to the present embodiment has the two wheels 570, it is possible to move forward, turn, and the like, and it is possible to play a game such as "Statues" with the user. Note that the recognition unit 210 of the information processing server 20 can recognize the turning behavior of the user by detecting the face of the user included in the image captured by the autonomous mobile body 10. Furthermore, the recognition unit 210 may recognize a turning behavior of the user from user speeches UO3, UO4, and the like. Here, the action planning unit 220 plans an action of stopping on the spot, an action of intentionally rolling forward, and the like on the basis of the recognition of the turning behavior, and the operation control unit 230 controls the drive unit 150 of the autonomous mobile body 10 according to the plan. Note that the autonomous mobile body 10 according to the present embodiment can recover from the overturned state by itself by a built-in pendulum or the like.

As in the case of the association game, the operation control unit 230 may invite the user to participate in the game by unilaterally starting the game suddenly. Here, the information processing server 20 repeats the control of stopping the movement of the autonomous mobile body 10 when the sight of the user is directed to the autonomous mobile body 10 and causing the autonomous mobile body 10 to approach the user when sight of the user is out of the autonomous mobile body 10, thereby inducing the user to the game.

Figure 23:
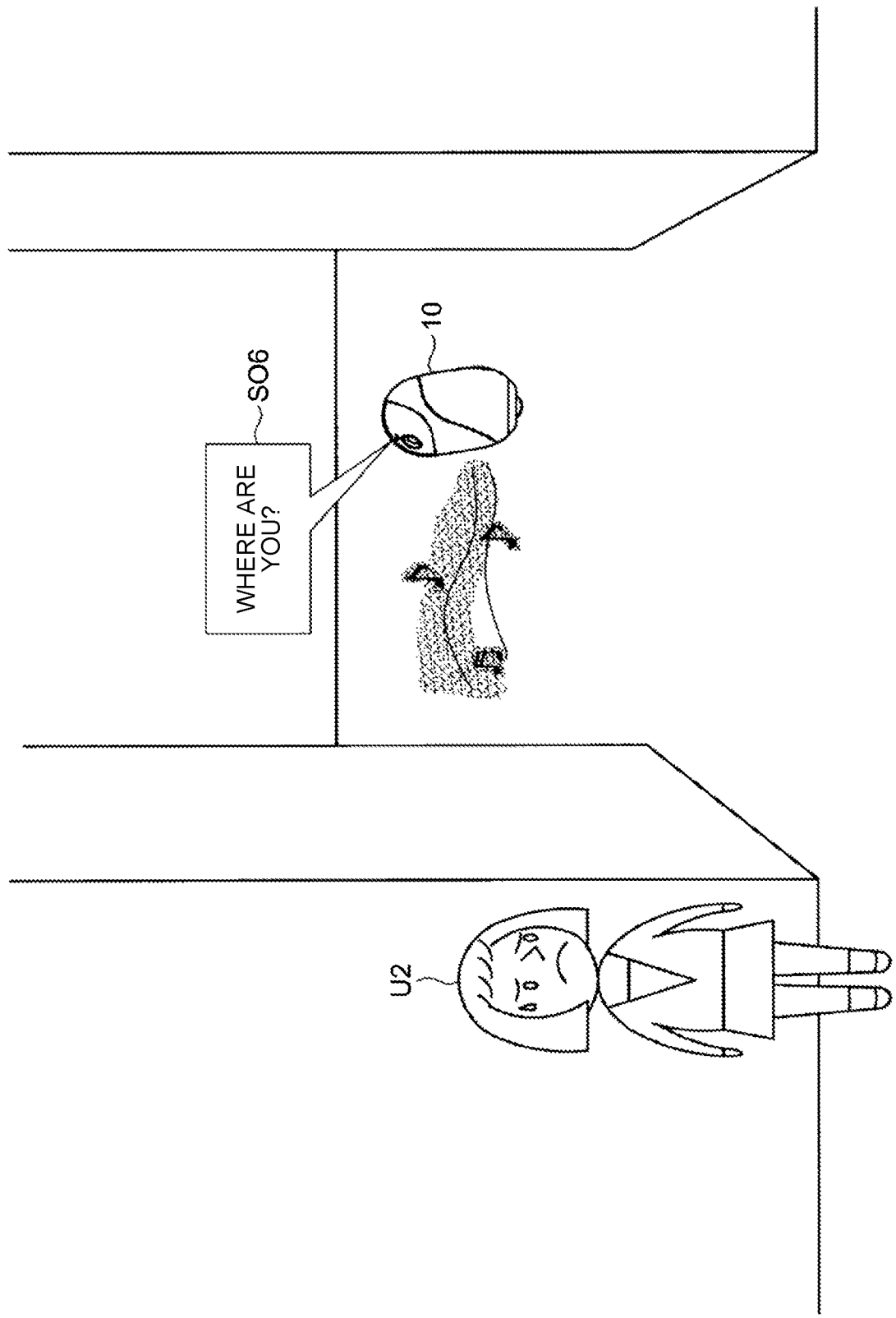
FIG. 23 is a diagram illustrating an example of the inducing action that induces the cooperative action between the user and the autonomous mobile body according to the first embodiment.

Furthermore, FIG. 23 illustrates an example that the autonomous mobile body 10 performs "hide-and-seek" with the user U2. In the example illustrated in FIG. 23, the operation control unit 230 causes the autonomous mobile body 10 to output an eerie BGM together with a voice message SO6 indicating that the autonomous mobile body 10 is looking for the user U2. According to such control, it is possible to effectively express the realistic feeling that the autonomous mobile body 10 is gradually approaching the user U2. As a result, further deeper communication can be established.

Note that the information processing server 20 can cause the autonomous mobile body 10 to search for the user U2, for example, by preparing a SLAM map generated in advance or performing sound source localization related to sound information collected when the user U2 escapes or a sound generated in the surroundings.

Furthermore, FIG. 24 illustrates the example that the autonomous mobile body 10 plays a computer game with the user U2. As described above, the games targeted by the autonomous mobile body 10 through the inducing action according to the present embodiment may include a computer game.

Here, for example, the operation control unit 230 may cause the autonomous mobile body 10 to execute an action of arbitrarily activating the controlled device 30 that is a game device. In this manner, the operation control unit 230 can cause the autonomous mobile body 10 to execute an action not intended by the user or an action not conforming to the intention of the user, that is, a mischievous behavior. The above mischief includes, for example, operation of the controlled device 30 as illustrated.

Here, when the user U2 participates in the computer game, the operation control unit 230 may cause the autonomous mobile body 10 to execute an action from the standpoint of a character in the game that the user U2 plays against. For example, the operation control unit 230 may cause the autonomous mobile body 10 to behave as if the autonomous mobile body 10 actually controls the motion of the character. According to the above control, the user U2 can strongly imagine the feeling of fighting against the autonomous mobile body 10 in the computer game, and can recognize the autonomous mobile body 10 as a more familiar existence than just a robot.

Furthermore, for example, when the character described above falls into a disadvantageous situation, the operation control unit 230 may cause the autonomous mobile body 10 to execute an action (body contact, running around, shaking, etc.) that obstructs the user U2, or may cause the autonomous mobile body 10 to output a voice message SO7 corresponding to the action. According to the above operation control, it is possible to realize more intimate communication with the user through the computer game.

As described above, the operation control unit 230 according to the present embodiment can activate mutual communication between the autonomous mobile body 10 and the user by causing the autonomous mobile body 10 to actively execute the inducing action related to various games.

Figure 25:
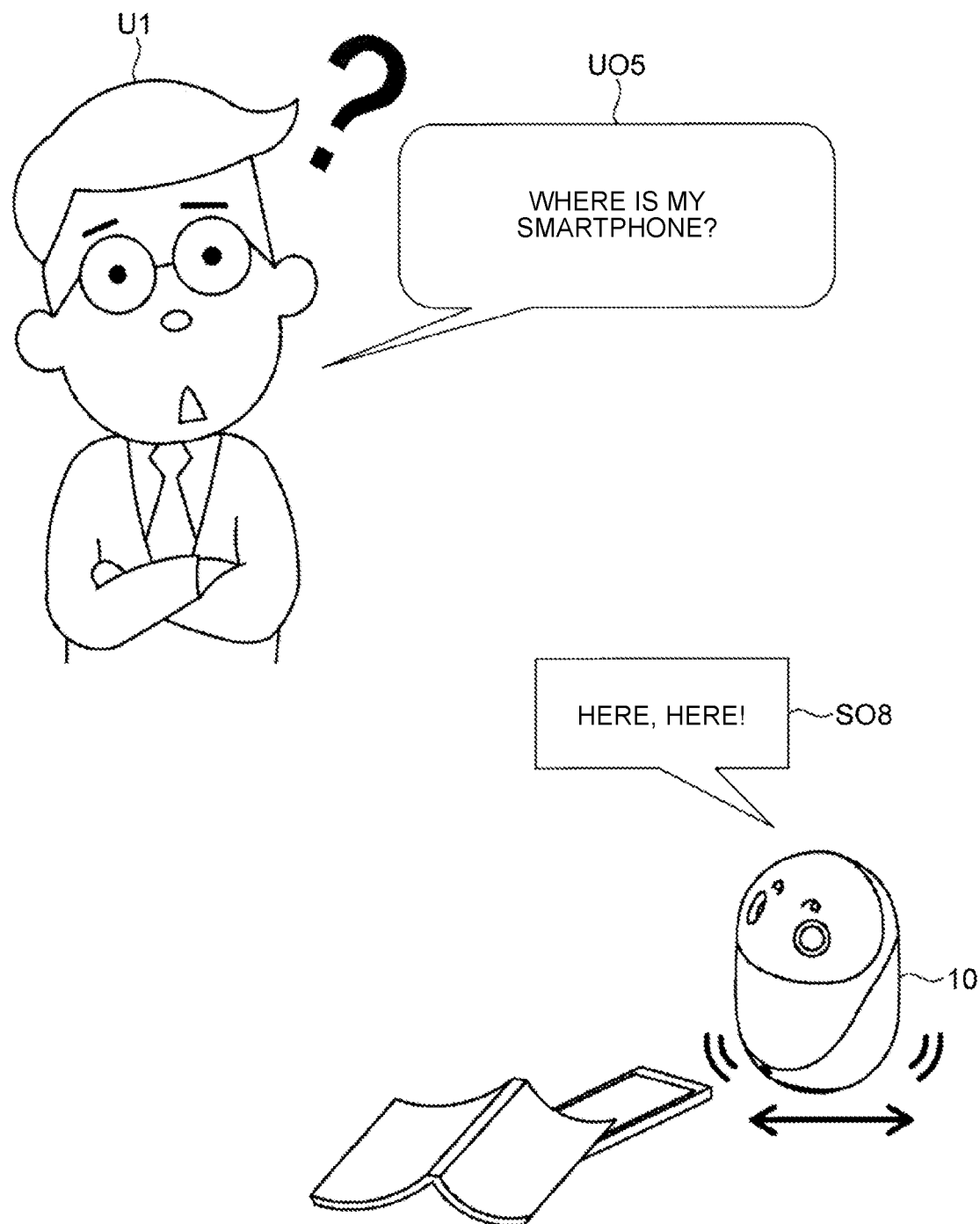
FIG. 25 is a diagram illustrating the inducing action related to presentation of an article location according to the first embodiment.

Next, a specific example of the inducing action according to the present embodiment will continue. FIG. 25 is a diagram illustrating the inducing action related to presentation of an article location according to the present embodiment. FIG. 25 illustrates an example that the autonomous mobile body 10 according to the present embodiment performs the inducing action to indicate the location of the smartphone that the user is searching for. Here, for example, the operation control unit 230 may cause the autonomous mobile body 10 to execute the inducing action such as lightly hitting the smartphone, performing the back-and-forth motion around the smartphone or jumping, in addition to indicating the location of the smartphone by a voice message SO8.

As described above, for example, when it is estimated that the user is searching for a predetermined article from a user speech UO5, the operation control unit 230 according to the present embodiment can cause the autonomous mobile body 10 to execute an operation to indicate the location of the article. Here, the operation control unit 230 causes the autonomous mobile body 10 to perform the inducing action near the place where the article is actually located, so that it is possible to perform effective information presentation to the user. Note that, for example, the recognition unit 210 may detect the location of the article on the basis of image information registered in advance, or may detect the location on the basis of a tag or the like added to the article.

Figure 26:
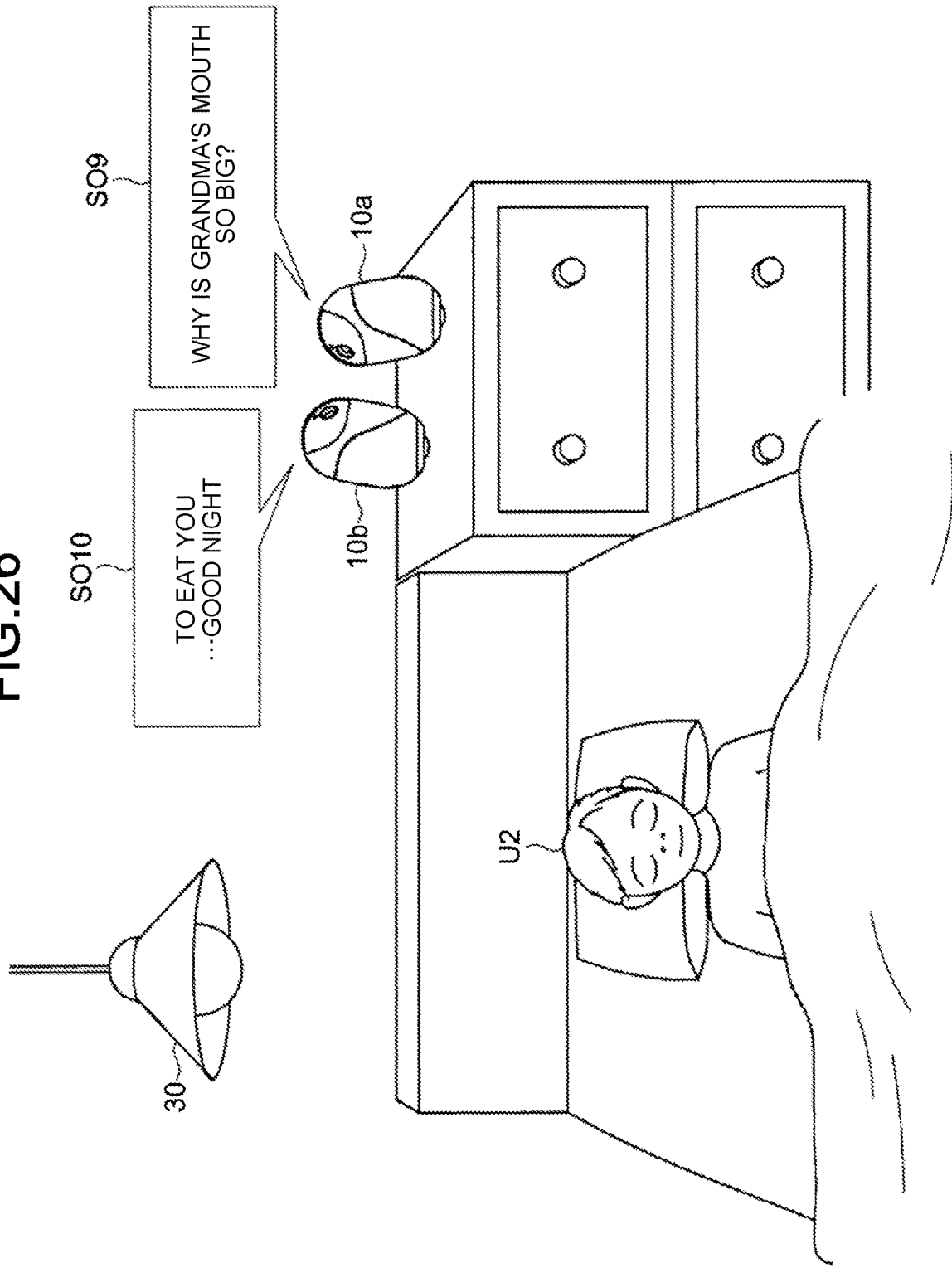
FIG. 26 is a diagram illustrating the inducing action for inducing the user to sleep according to the first embodiment.

Furthermore, FIG. 26 is a diagram illustrating the inducing action of inducing the user to sleep according to the present embodiment. FIG. 26 illustrates an example that the autonomous mobile body 10 reads aloud to put the user U2 to sleep. The autonomous mobile body 10 can read, for example, a story registered in advance as data or various stories acquired through communication. In this case, even when a restriction is usually set on the language (e.g., the number of words and vocabulary) used by the autonomous mobile body 10, the operation control unit 230 may release the restriction when reading a story.

Furthermore, the operation control unit 230 may cause the autonomous mobile body 10 to reproduce a voice of each character in the story expressively or output a sound effect, BGM, or the like together. Furthermore, the operation control unit 230 may cause the autonomous mobile body 10 to perform an action according to a dialogue or a scene.

Furthermore, the operation control unit 230 can control the plurality of autonomous mobile bodies 10 to read the story aloud or reproduce the story. In the example illustrated in FIG. 26, the operation control unit 230 causes two autonomous mobile bodies 10a and 10b to respectively play two characters in the story. In this way, the operation control unit 230 according to the present embodiment can provide the user with a show with ample expressions including the physical action in addition to simple reading of a story by voice.

Furthermore, the operation control unit 230 according to the present embodiment may cause the autonomous mobile body 10 to turn off the controlled device 30, which is a lighting device, when the user falls asleep. In this way, the information processing server 20 and the autonomous mobile body 10 according to the present embodiment can realize a flexible operation according to a change in a situation related to the user or the surrounding environment.

Figure 27:
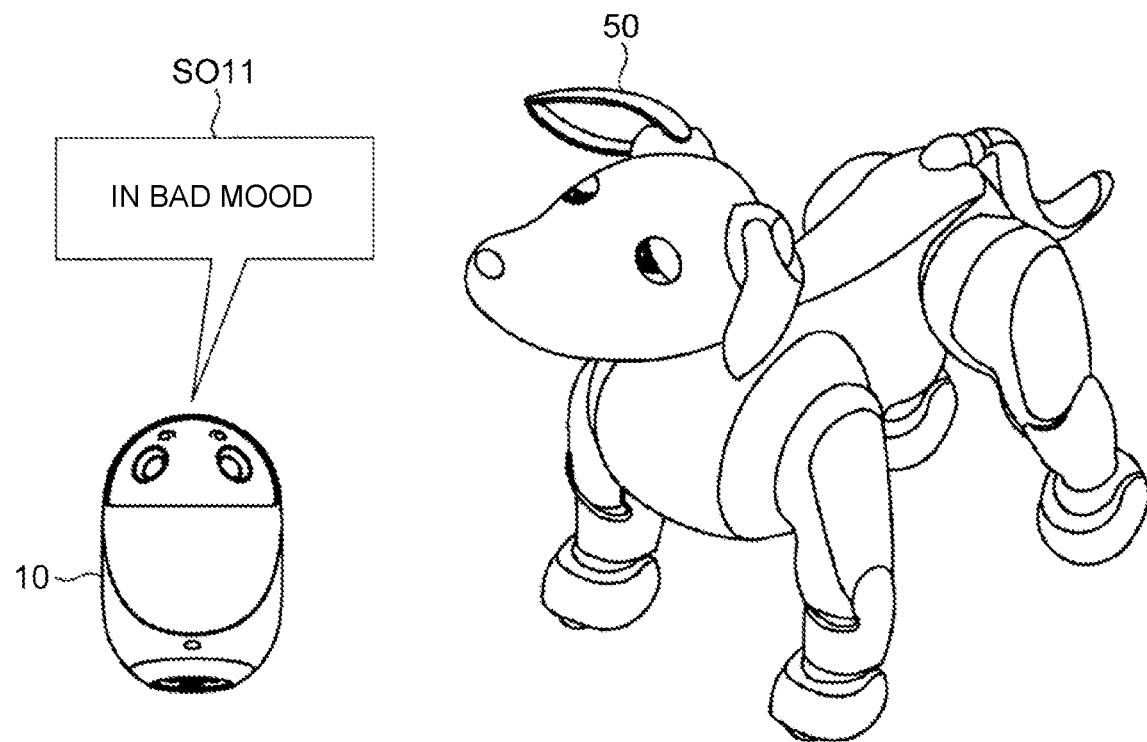
FIG. 27 is a diagram illustrating communication between the autonomous mobile body and another device according to the first embodiment.
Figure 28:
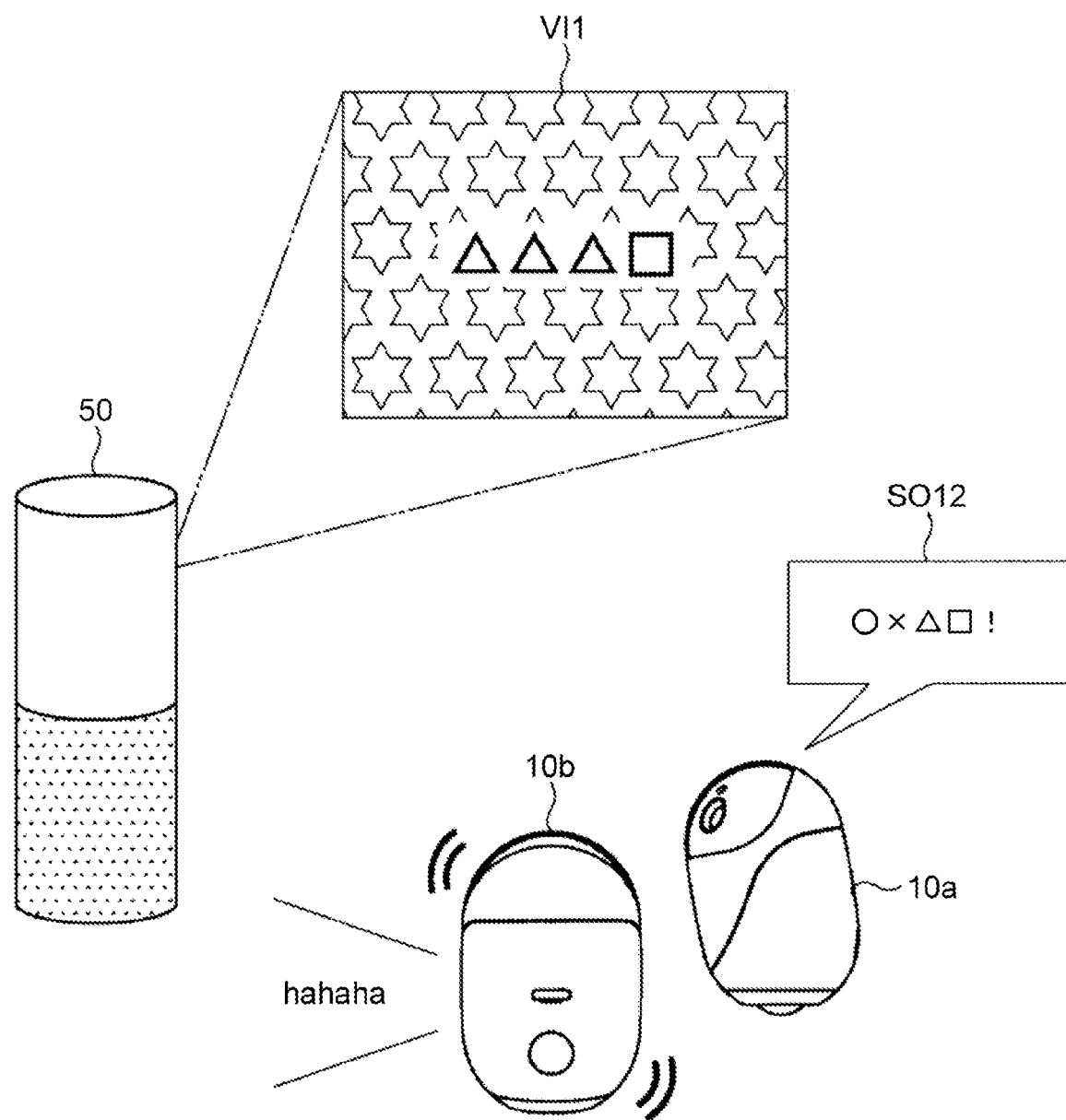
FIG. 28 is a diagram illustrating communication between the autonomous mobile body and another device according to the first embodiment.

Furthermore, the inducing action according to the present embodiment may be communication between the autonomous mobile body 10 and another device. FIG. 27 and FIG. 28 are diagrams illustrating communication between the autonomous mobile body 10 and another device according to the present embodiment.

FIG. 27 illustrates an example that the autonomous mobile body 10 performs interpretation between the user and another device 50 that is a dog-shaped autonomous mobile body. In the present example, the operation control unit 230 presents information regarding an internal state of another device 50 to the user using a voice message SO11. Here, another device 50 that is the dog-shaped autonomous mobile body may be a device that does not have a linguistic communication means.

As described above, the operation control unit 230 according to the present embodiment can present the information regarding the internal state of another device 50 to the user via the autonomous mobile body 10. According to the above-described function of the operation control unit 230 according to the present embodiment, it is possible to notify the user of various types of information related to another device 50 that does not have a direct transmission means using a language with respect to the user. Thus, it is possible to activate communication between the user and the autonomous mobile body 10 or another device 50 via the notification.

Furthermore, FIG. 28 illustrates an example of communication between a plurality of autonomous mobile bodies 10a and 10b and another device 50 that is an agent device having a projection function. For example, the operation control unit 230 can control the autonomous mobile bodies 10a and 10b and another device 50 such that the robots are communicating with each other among the autonomous mobile bodies 10a and 10b and another device 50.

In the example illustrated in FIG. 28, the operation control unit 230 causes another device 50 to project visual information VI1 via the autonomous mobile body 10. Furthermore, the operation control unit 230 causes the autonomous mobile body 10a to output a voice message 12, causes the autonomous mobile body 10 to output laughter and execute an action of swinging the main body.

Here, the operation control unit 230 may cause communication between the devices using a pseudo language that cannot be understood by the user. Such control can strongly attract the user's interest by making the user imagine a situation that the devices are having a mysterious conversation. Furthermore, for example, even when another device 50 is a display device without the agent function, such control makes the user evoke a feeling that a personality exists in the display device. Accordingly, an effect of improving the user's attachment to the display device can be expected.

Note that, although the above example describes the case that the operation control unit 230 according to the present embodiment causes the autonomous mobile body 10 to perform the action of swinging the main body, the operation control unit 230 according to the present embodiment can vibrate the autonomous mobile body 10 by intentionally making the posture control unstable. According to this control, it is possible to express emotions such as shivering, laughing, and fear without providing a separate piezoelectric element or the like.

1.7 Growth Example of Autonomous Mobile Body

The specific examples of the inducing action performed by the autonomous mobile body 10 according to the present embodiment have been described above. All the inducing actions as described above may not be executed from the beginning. For example, behaviors that can be performed may be designed to gradually increase according to a learning progress of the autonomous mobile body 10. An example below is given with respect to a change in actions according to the learning progress of the autonomous mobile body 10 according to the present embodiment, which is a growth of the autonomous mobile body 10. Note that the following will describe the example in which the learning progress of the autonomous mobile body 10 according to the present embodiment is defined by levels from 0 to 200. Furthermore, in the following description, even when a subject of process is the information processing server 20, the autonomous mobile body 10 will be described as the subject.

(Levels 0 to 4)

The autonomous mobile body 10 can hear a speech by a person including the user. Further, the autonomous mobile body 10 expresses its emotion by onomatopoeia or the like without using words. The autonomous mobile body 10 can detect a step and avoid falling, but easily collides with an object and overturns. When the autonomous mobile body 10 overturns, the autonomous mobile body 10 cannot recover the standing state by itself. The autonomous mobile body 10 continues to act until the battery runs out, and the emotion is unstable. The autonomous mobile body 10 often shakes or gets angry, blinks frequently, and changes the color of eyes frequently.

(Levels 5 to 9)

When a predetermined condition (e.g., the number of times of detection) is satisfied as the autonomous mobile body 10 listens to and parrots the user's words, the autonomous mobile body 10 comes to remember and repeat the words. Furthermore, the autonomous mobile body 10 becomes capable of moving without colliding with an object, and learns to seek help when overturned. In addition, when the battery decreases, the autonomous mobile body 10 expresses it as being hungry.
(Levels 10 to 19)

The autonomous mobile body 10 understands its own name by being repeatedly called by the user. The autonomous mobile body 10 recognizes the user's face and shape, and remembers the user's name when a predetermined condition (e.g., the number of times of recognition) is satisfied. In addition, the autonomous mobile body 10 ranks a reliability of recognized persons or objects. In this case, in addition to the user, an animal such as a pet, a toy, a device, and the like may be highly ranked. Further, the autonomous mobile body 10 may learn to return to a charging stand and charge itself when the autonomous mobile body 10 finds the charging stand.
(Levels 20 to 29)

The autonomous mobile body 10 can combine known words with proper nouns learned and utter a short sentence (e.g., "Kazuo, fine"). Further, when recognizing a person, the autonomous mobile body 10 tries to approach the person. Further, the autonomous mobile body 10 may become capable of traveling quickly.
(Levels 30 to 49)

Expressions such as question, denial, and affirmation forms are added to a vocabulary of the autonomous mobile body 10 (e.g., "Kazuo, how are you?"). Further, the autonomous mobile body 10 actively asks questions. For example, a conversation with the user continues such as "Kazuo, what did you have for lunch?", "Curry", "Is curry good?", and so on. Furthermore, the autonomous mobile body 10 approaches the user when being called by the user such as "Come", and becomes silent when the user says "ssh".
(Levels 50 to 69)

The autonomous mobile body 10 tries to imitate movement of a person or an object (e.g., dance). In addition, the autonomous mobile body 10 tries to imitate a special sound (siren, alarm, engine sound, etc.) that is heard. In this case, the autonomous mobile body 10 may reproduce a similar sound registered as data. Further, the autonomous mobile body 10 remembers a cycle of time of one day, grasps a daily schedule, and becomes capable of notifying the user of the daily schedule (e.g., "Kazuo, wake up", and "Kazuo, welcome back").
(Levels 70 to 89)

The autonomous mobile body 10 can control the operation (e.g., ON and OFF) of a registered device. Further, the autonomous mobile body 10 can also perform the above control on the basis of a request by the user. The autonomous mobile body 10 can output registered music according to the situation. The autonomous mobile body 10 remembers a cycle of time of one week, grasps a weekly schedule, and becomes capable of notifying the user of the weekly schedule (e.g., "Kazuo, did you take combustible garbage out?").
(Levels 90 to 109)

The autonomous mobile body 10 learns an action to express emotion. The above expressions include behaviors related to emotions. For example, loud laughing, crying hard, and the like. The autonomous mobile body 10 remembers a cycle of time of one month, grasps a monthly schedule, and becomes capable of notifying the user of the monthly schedule (e.g., "Kazuo, today, pay day!").
(Levels 110 to 139)

When the user is smiling, the autonomous mobile body 10 smiles together, and when the user is crying, the autonomous mobile body 10 approaches the user and worries about the user. The autonomous mobile body 10 learns a nodding response or the like, and acquires various conversation modes such as being a good listener. Furthermore, the autonomous mobile body 10 remembers a cycle of time of one year, grasps an annual schedule, and becomes capable of notifying the user of the annual schedule.
(Levels 140 to 169)

The autonomous mobile body 10 learns self-recovery from an overturned state and jumping during traveling. Furthermore, the autonomous mobile body 10 can play the "Statues" game and the "hide-and-seek" game with the user.
(Levels 170 to 199)

The autonomous mobile body 10 performs a mischievous behavior of operating the registered device regardless of the user's intention. Furthermore, the autonomous mobile body 10 sulks about being scolded by the user (adolescence). The autonomous mobile body 10 can identify a location of a registered article and notify the user of the location.
(Levels 200 and Above)

The autonomous mobile body 10 becomes capable of reading a story book. Furthermore, the autonomous mobile body 10 is provided with a payment function for purchasing products or the like via a network.

An example of the growth of the autonomous mobile body 10 according to the present embodiment has been described above. Note that the above is merely an example, and the operation of the autonomous mobile body 10 can be appropriately adjusted by user setting or the like.

1.8 Flow of Control

Figure 29:
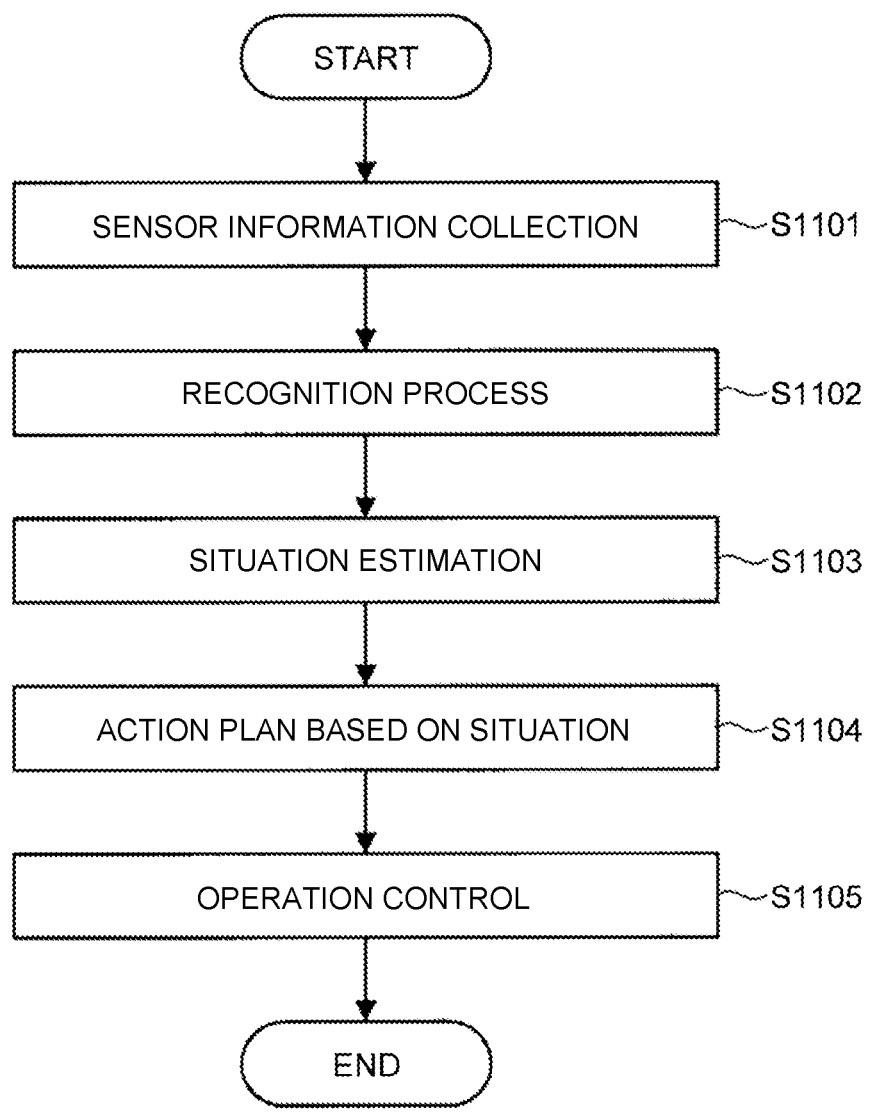
FIG. 29 is a flowchart illustrating a flow of control of the autonomous mobile body by the information processing server according to the first embodiment.

Next, a flow of control of the autonomous mobile body 10 by the information processing server 20 according to the present embodiment will be described in detail. FIG. 29 is a flowchart illustrating the flow of control of the autonomous mobile body 10 by the information processing server 20 according to the present embodiment.

Referring to FIG. 29, the communication unit 240 receives the sensor information from the autonomous mobile body 10 (S1101).

Next, the recognition unit 210 executes various recognition processes on the basis of the sensor information received in Step S1101 (S1102), and estimates a situation (S1103).

Next, the action planning unit 220 performs an action plan on the basis of the situation estimated in Step S1103 (S1104).

Next, the operation control unit 230 performs an operation control of the autonomous mobile body 10 on the basis of the action plan determined in Step S1104 (S1105).

Figure 30:
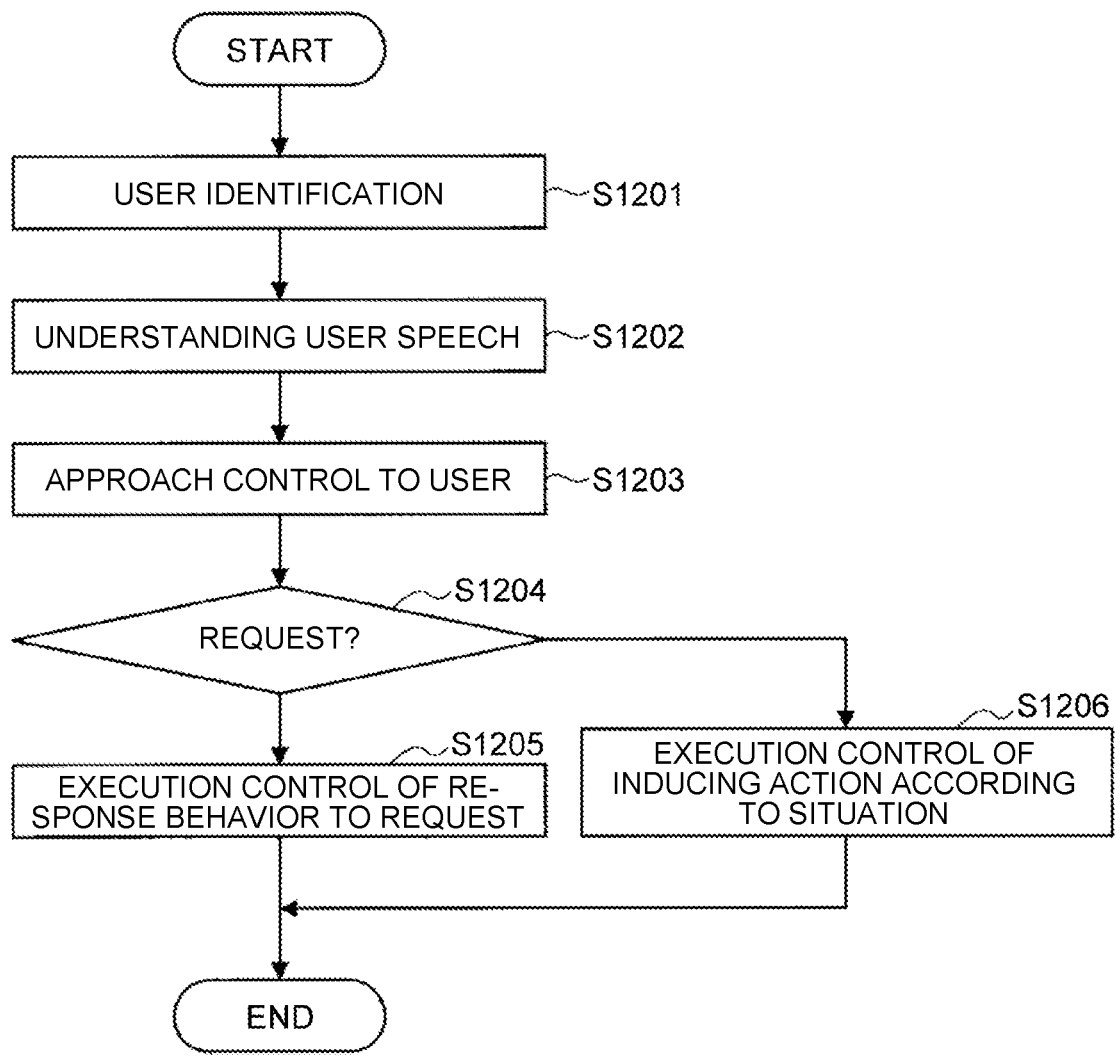
FIG. 30 is a flowchart illustrating an example of a flow from a recognition process to operation control according to the first embodiment.

A rough flow of the control of the autonomous mobile body 10 by the information processing server 20 according to the present embodiment has been described above. Note that from the recognition process in Step S1102 to the operation control in Step S1105 may be repeated in parallel. FIG. 30 is a flowchart illustrating an example of a flow from the recognition process to the operation control according to the present embodiment.

Referring to FIG. 30, for example, the recognition unit 210 identifies the user on the basis of an image or the like captured by the autonomous mobile body 10 (S1201).

Furthermore, the recognition unit 210 performs voice recognition and intention interpretation related to the user's speech collected by the autonomous mobile body 10, and understands the intention of the user's speech (S1202).

Next, the action planning unit 220 plans to approach the user, and the operation control unit 230 controls the drive unit 150 of the autonomous mobile body 10 on the basis of the plan, and causes the autonomous mobile body 10 to approach the user (S1203).

Here, when the intention of the user's speech understood in Step S1202 is a request or the like to the autonomous mobile body 10 (S1204: YES), the operation control unit 230 executes a response behavior to the request on the basis of the action plan determined by the action planning unit 220 (S1205). The above response behavior includes, for example, presentation of an answer to an inquiry from the user and control of the controlled device 30.

On the other hand, when the intention of the user's speech understood in Step S1202 is not a request to the autonomous mobile body 10 (S1204: NO), the operation control unit 230 causes the autonomous mobile body 10 to execute various inducing actions according to the situation on the basis of the action plan determined by the action planning unit 220 (S1206).

1.9 Hardware Configuration Example

Figure 31:
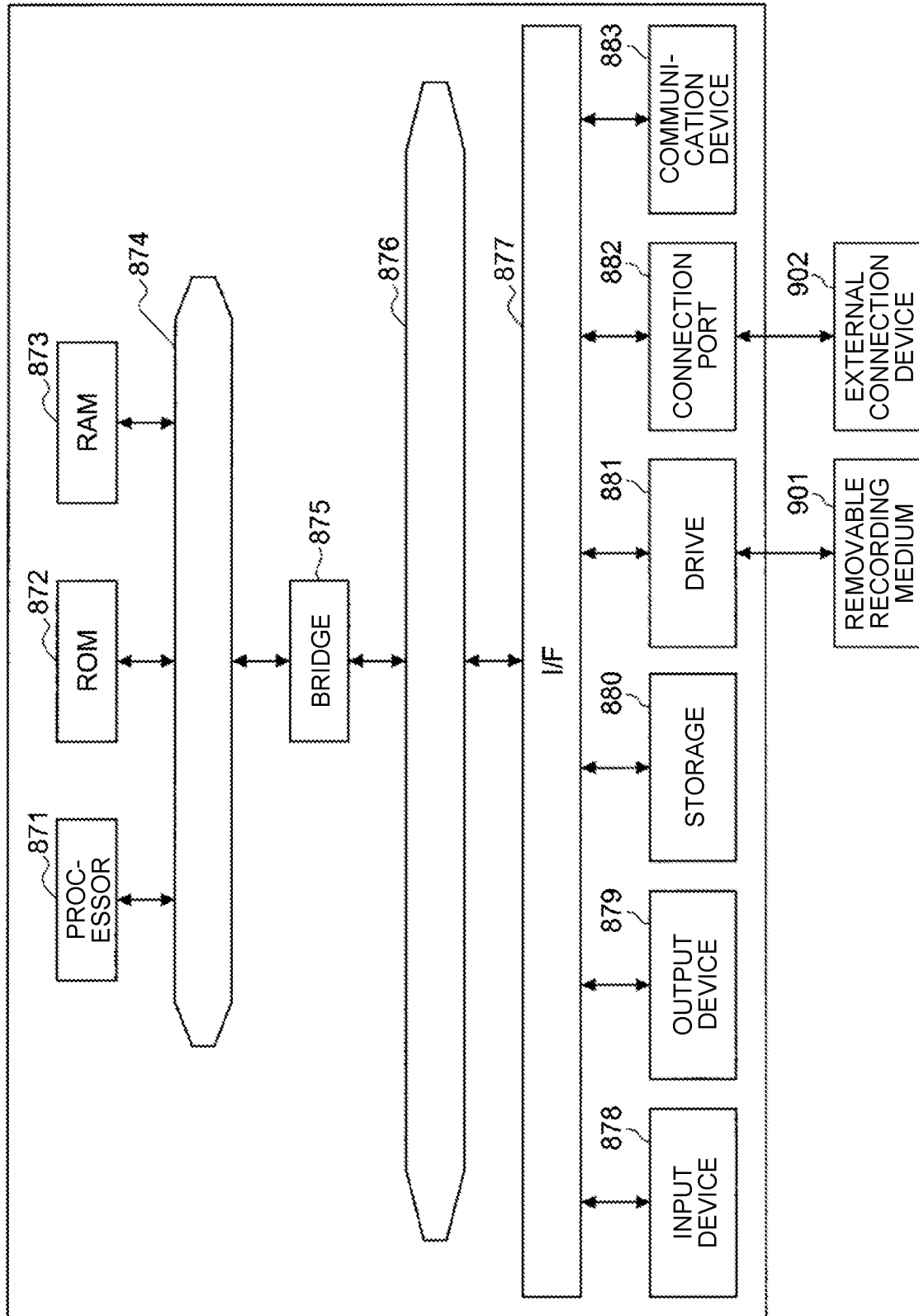
FIG. 31 is a diagram illustrating a hardware configuration example according to the first embodiment.

Next, a hardware configuration example of the information processing server 20 according to the first embodiment of the present disclosure will be described. FIG. 31 is a block diagram illustrating the hardware configuration example of the information processing server 20 according to the first embodiment of the present disclosure. Referring to FIG. 31, the information processing server 20 includes, for example, a processor 871, a ROM 872, a RAM 873, a host bus 874, a bridge 875, an external bus 876, an interface 877, an input device 878, an output device 879, a storage 880, a drive 881, a connection port 882, and a communication device 883. Note that the hardware configuration illustrated here is an example, and some of the components may be omitted. In addition, components other than the components shown here may be further included.

(Processor 871)

The processor 871 functions as, for example, an arithmetic processing device or a control device, and controls the overall operation of each component or a part thereof on the basis of various programs recorded in the ROM 872, the RAM 873, the storage 880, or a removable recording medium 901.

(ROM 872 and RAM 873)

The ROM 872 is a unit that stores a program read by the processor 871, data used for calculation, and the like. The RAM 873 temporarily or permanently stores, for example, the program read by the processor 871, and various parameters that appropriately change when the program is executed.

(Host Bus 874, Bridge 875, External Bus 876, and Interface 877)

The processor 871, the ROM 872, and the RAM 873 are mutually connected via, for example, the host bus 874 capable of high-speed data transmission. On the other hand, the host bus 874 is connected to, for example, the external bus 876 having a relatively low data transmission speed via the bridge 875. In addition, the external bus 876 is connected to various components via the interface 877.

(Input Device 878)

As the input device 878, for example, a mouse, a keyboard, a touch panel, a button, a switch, and a lever are used. Furthermore, as the input device 878, a remote control capable of transmitting a control signal using infrared rays or other radio waves may be used. Furthermore, the input device 878 includes a voice input device such as a microphone.

(Output Device 879)

The output device 879 is a device capable of visually or audibly notifying the user of acquired information, such as a display device including a cathode ray tube (CRT), a liquid crystal display (LCD), or an organic electroluminescent (EL) display, an audio output device including a speaker or a headphone, a printer, a mobile phone, or a facsimile. Furthermore, the output device 879 according to the present disclosure includes various vibration devices capable of outputting tactile stimulation.

(Storage 880)

The storage 880 is a device for storing various types of data. As the storage 880, for example, a magnetic storage device such as a hard disk drive (HDD), a semiconductor storage device, an optical storage device, or a magneto-optical storage device is used.

(Drive 881)

The drive 881 is, for example, a device that reads information recorded on the removable recording medium 901 such as a magnetic disk, an optical disk, a magneto-optical disk, or a semiconductor memory, or writes information to the removable recording medium 901.

(Removable Recording Medium 901)

The removable recording medium 901 is, for example, a DVD medium, a Blu-ray (registered trademark) medium, an HD DVD medium, various semiconductor storage media, or the like. Naturally, the removable recording medium 901 may also be, for example, an IC card on which a non-contact IC chip is mounted, an electronic device, or the like.

(Connection Port 882)

The connection port 882 is, for example, a port for connecting an external connection device 902 such as a universal serial bus (USB) port, an IEEE 1394 port, a small computer system interface (SCSI), an RS-232C port, or an optical audio terminal.

(External Connection Device 902)

The external connection device 902 is, for example, a printer, a portable music player, a digital camera, a digital video camera, an IC recorder, or the like.

(Communication Device 883)

The communication device 883 is a communication device for connecting to a network, and is, for example, a communication card for wired or wireless LAN, Bluetooth (registered trademark), or wireless USB (WUSB), a router for optical communication, a router for asymmetric digital subscriber line (ADSL), a modem for various communications, or the like.

1.10 Summary

As described above, the information processing server 20 according to the first embodiment of the present disclosure includes the operation control unit 230 that controls the action of the autonomous mobile body 10. Furthermore, one of the features of the operation control unit 230 according to the first embodiment of the present disclosure is to cause the autonomous mobile body to actively execute the inducing action that encourages communication between the user and the autonomous mobile body 10. In addition, the inducing action and the communication include at least the behavior of the autonomous mobile body 10 in the physical space. According to this configuration, communication with the user can be more natural and effective.

Note that each step related to the processes of the information processing server 20 in the present specification is not necessarily processed in time series in the order described in the flowchart. For example, each step related to the processes of the information processing server 20 may be processed in an order different from the order described in the flowchart, or may be processed in parallel.

2. Second Embodiment

Next, a second embodiment of the present disclosure will be described in detail below with reference to the drawings. In the following description, configurations and operations similar to those of the above-described embodiment are cited to omit redundant description thereof.

2.1 Overview

First, an overview of the second embodiment of the present disclosure will be described. A posture control of a robot device (autonomous mobile body) is important in order to autonomously execute various actions, including movement, according to a situation of a user, surroundings, and the autonomous mobile body itself. The above posture control may include, for example, the posture control for controlling a balance of the autonomous mobile body on the basis of an angular velocity detected by a gyro sensor provided in the autonomous mobile body. According to such control, for example, it is possible to finely adjust the posture of the autonomous mobile body so that an unintended overturn does not occur.

On the other hand, even when the posture control is performed, it is common that the device main body becomes unstable when the autonomous mobile body does not move and stops on the spot. In addition, there is a tendency that the power cost increases by continuously executing the posture control to prevent autonomous mobile body from overturning while stopped.

The technical idea according to the present disclosure has been conceived focusing on the above points, and one of the features thereof is to increase a contact area with the installation surface by bringing the autonomous mobile body into the seated state when stopped, and to make the main body remain still in the stable state without the posture control. According to this feature, when the autonomous mobile body does not need to move, it is possible to effectively reduce power consumption by reliably stopping the autonomous mobile body on the spot and not performing unnecessary posture control.

Still more, one of the features of the autonomous mobile body according to the present embodiment is that the autonomous mobile body performs movement such as a back-and-forth motion, a turning motion, and a rotational motion in a standing state while retaining a forward inclination posture. According to this feature, even when the autonomous mobile body has a relatively simple outer shape, such as a long-elliptic shape, it is possible to eliminate an impression of being an artificial object by clearly evoking images of head and waist to give the user an image close to an actual living thing.

Hereinafter, the features of the autonomous mobile body according to the present embodiment and effects exerted by the features will be described in detail.

Note that the configuration of the autonomous mobile body according to the present embodiment may be similar to the configuration described with reference to FIGS. 1, 2, 3, 4, 5, 6, 7, 8, 9, 10, 11, 12, 13A and FIG. 13B in the first embodiment described above, and thus a detailed description thereof will be omitted here.

2.2 Functional Configuration Example of Autonomous Mobile Body

Figure 32:
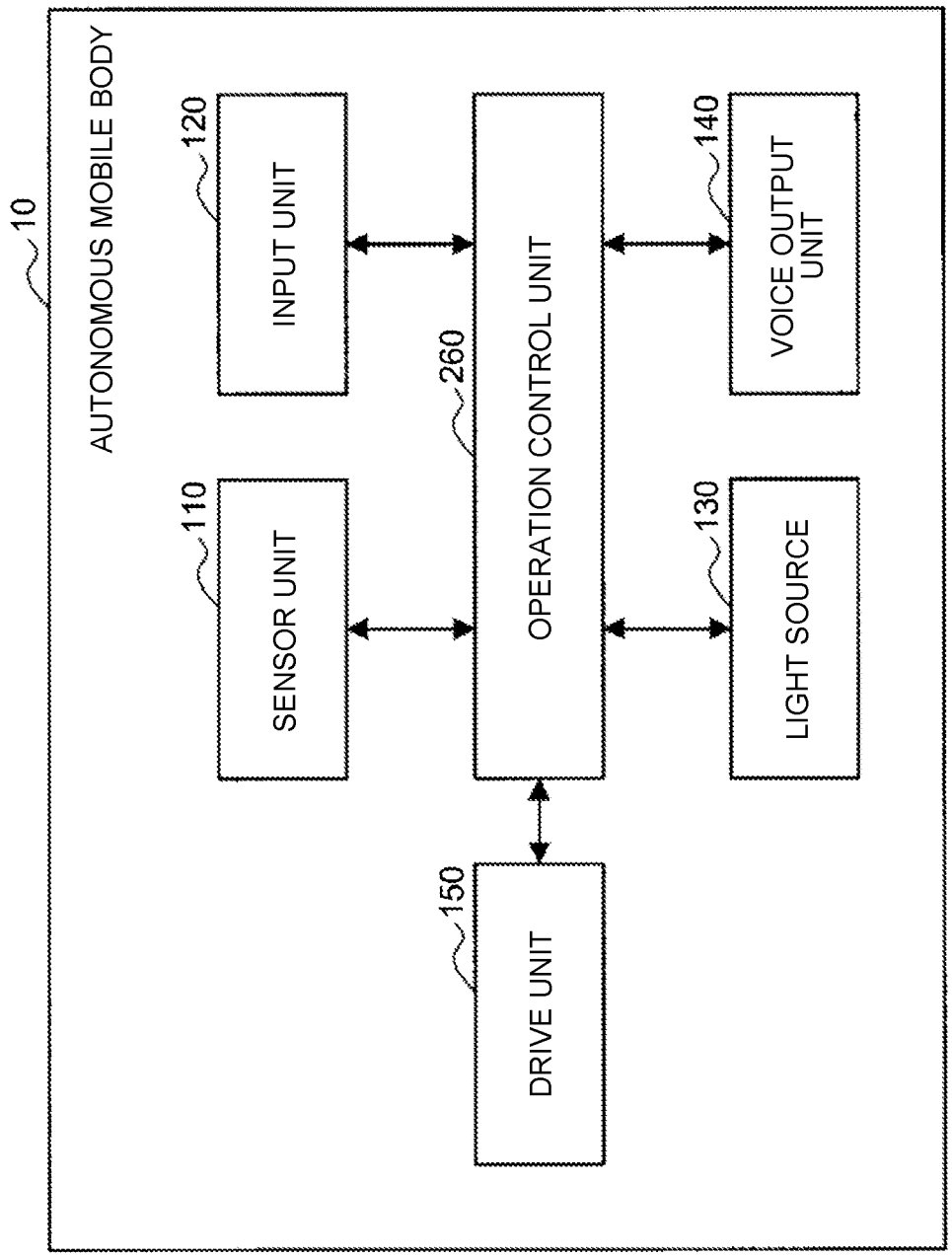
FIG. 32 is a block diagram illustrating a functional configuration example of an autonomous mobile body according to a second embodiment.

Next, a functional configuration example of the autonomous mobile body 10 according to the second embodiment of the present disclosure will be described. FIG. 32 is a block diagram illustrating a functional configuration example of the autonomous mobile body 10 according to the present embodiment. As illustrated in FIG. 32, the autonomous mobile body 10 according to the second embodiment has a configuration in which the control unit 160 is replaced with an operation control unit 260 in the same configuration as that of the autonomous mobile body 10 described with reference to FIG. 15 in the first embodiment.

(Operation Control Unit 260)

The operation control unit 260 according to the present embodiment has a function of controlling each component included in the autonomous mobile body 10. For example, the operation control unit 260 performs an action plan on the basis of the sensor information collected by the sensor unit 110, and controls eyeball expression by the light source 130 and sound output by the voice output unit 140. Furthermore, the operation control unit 260 may control the operation of the drive unit 150 on the basis of the action plan described above.

The functional configuration example of the autonomous mobile body 10 according to the second embodiment of the present disclosure has been described above. Note that the above-described configuration described with reference to FIG. 32 is merely an example, and the functional configuration of the autonomous mobile body 10 according to the second embodiment of the present disclosure is not limited to the example. For example, the operation of the autonomous mobile body 10 according to the present embodiment may be controlled by the information processing server 20 that communicates with the autonomous mobile body 10, same as the autonomous mobile body 10 according to the first embodiment. In other words, the information processing system including the autonomous mobile body 10 according to the second embodiment may have the same configuration as the information processing system described with reference to FIG. 14 to FIG. 16 in the first embodiment. In this case, the autonomous mobile body 10 may include the communication unit 170, transmit the sensor information to the information processing server 20 via the communication device 530 described above, and receive the control signal from the information processing server 20. The functional configuration of the autonomous mobile body 10 according to the present embodiment can be flexibly modified according to the shape of the autonomous mobile body 10 or the like.

2.3 Details of Posture Control

Next, the posture control of the autonomous mobile body 10 by the operation control unit 260 according to the present embodiment will be described in detail. As described above, one of the features of the operation control unit 260 according to the present embodiment is to control the autonomous mobile body 10 to perform the movement while maintaining the forward inclination posture. The above-described function of the operation control unit 260 according to the present embodiment can realize ample actions and expressions closer to the actual living thing by providing directionality in the autonomous mobile body 10.

Figure 33:
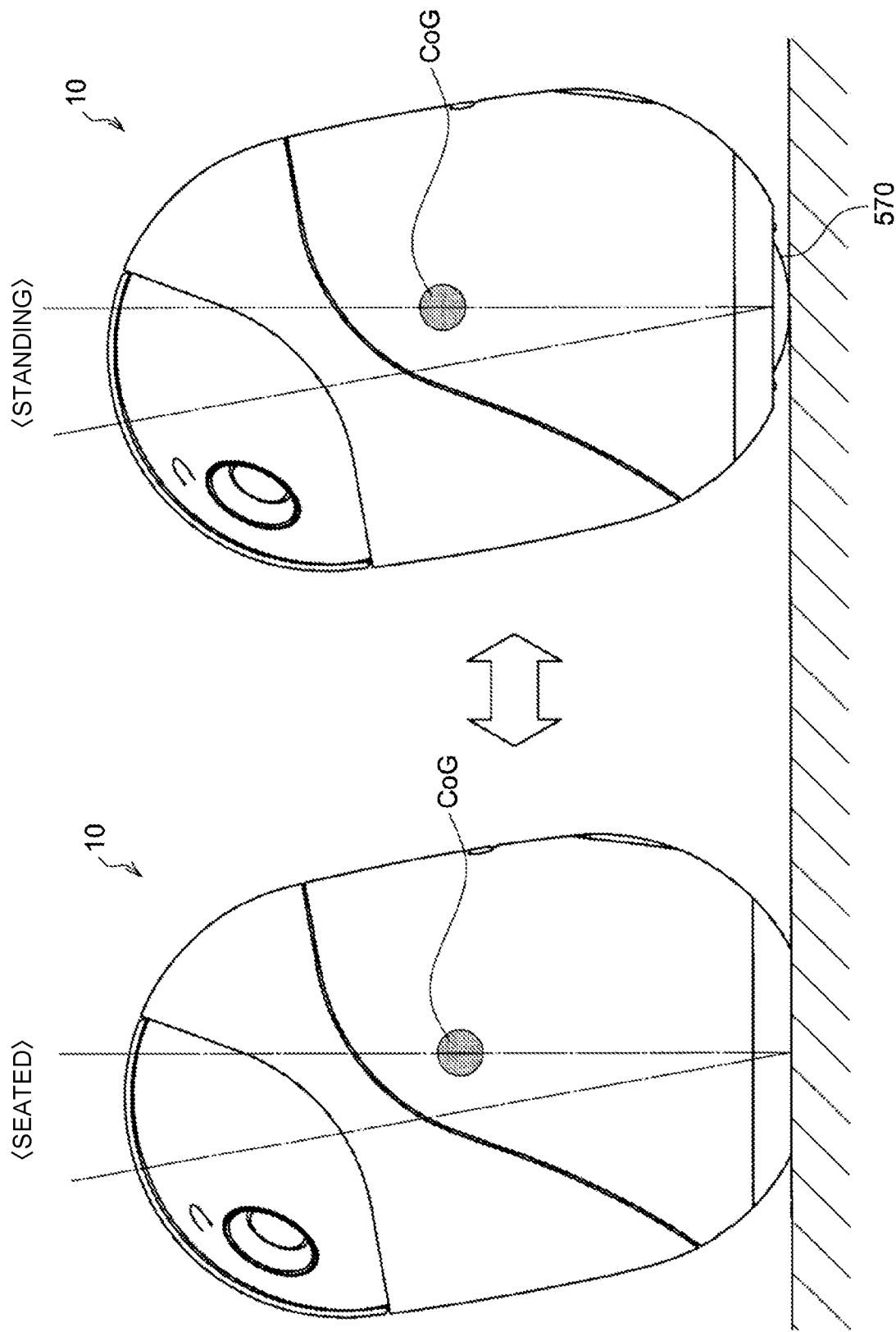
FIG. 33 is a diagram illustrating a posture control during stop and during movement according to the second embodiment.

Furthermore, the operation control unit 260 according to the present embodiment may perform different posture controls between the time of stopping and the time of moving. FIG. 33 is a diagram illustrating the posture controls during stoppage and during movement according to the present embodiment. The left side of FIG. 33 illustrates a case where the autonomous mobile body 10 is not moving and stopping on the spot. In this state, the operation control unit 260 according to the present embodiment may house the wheels 570 inside the main body of the autonomous mobile body 10, and the autonomous mobile body 10 may stay still in the seated state.

According to the above control by the operation control unit 260 according to the present embodiment, when the movement is not necessary, the autonomous mobile body 10 is firmly stopped by housing the wheels 570 inside the main body and making the bottom contact the installation surface, so that it is possible to prevent wobbling while stopping like a general robot device. Furthermore, according to the above control, the autonomous mobile body 10 can be stabilized without the posture control. Accordingly, power consumed for the posture control can be effectively reduced.

On the other hand, the right side of FIG. 33 illustrates a case where the autonomous mobile body performs the movement. Here, the operation control unit 260 according to the present embodiment causes the wheels 570 to project outside of the main body of the autonomous mobile body 10 to maintain the standing state, and also performs the drive control and the posture control of the wheels 570.

Note that, as described above, the operation control unit 260 causes the autonomous mobile body 10 to maintain the forward inclination posture by controlling the center of gravity CoG of the autonomous mobile body 10 to be positioned vertically above the wheels 570. Here, the operation control unit 260 may adjust the position of the wheels 570 in accordance with the position of the center of gravity CoG.

The above control by the operation control unit 260 according to the present embodiment can cause the autonomous mobile body 10 to perform the movement in a state the forward inclination posture is maintained. Even in a case where the autonomous mobile body 10 has a relatively simple outer shape, it is possible to realize ample actions and expressions closer to the actual living thing.

Figure 34:
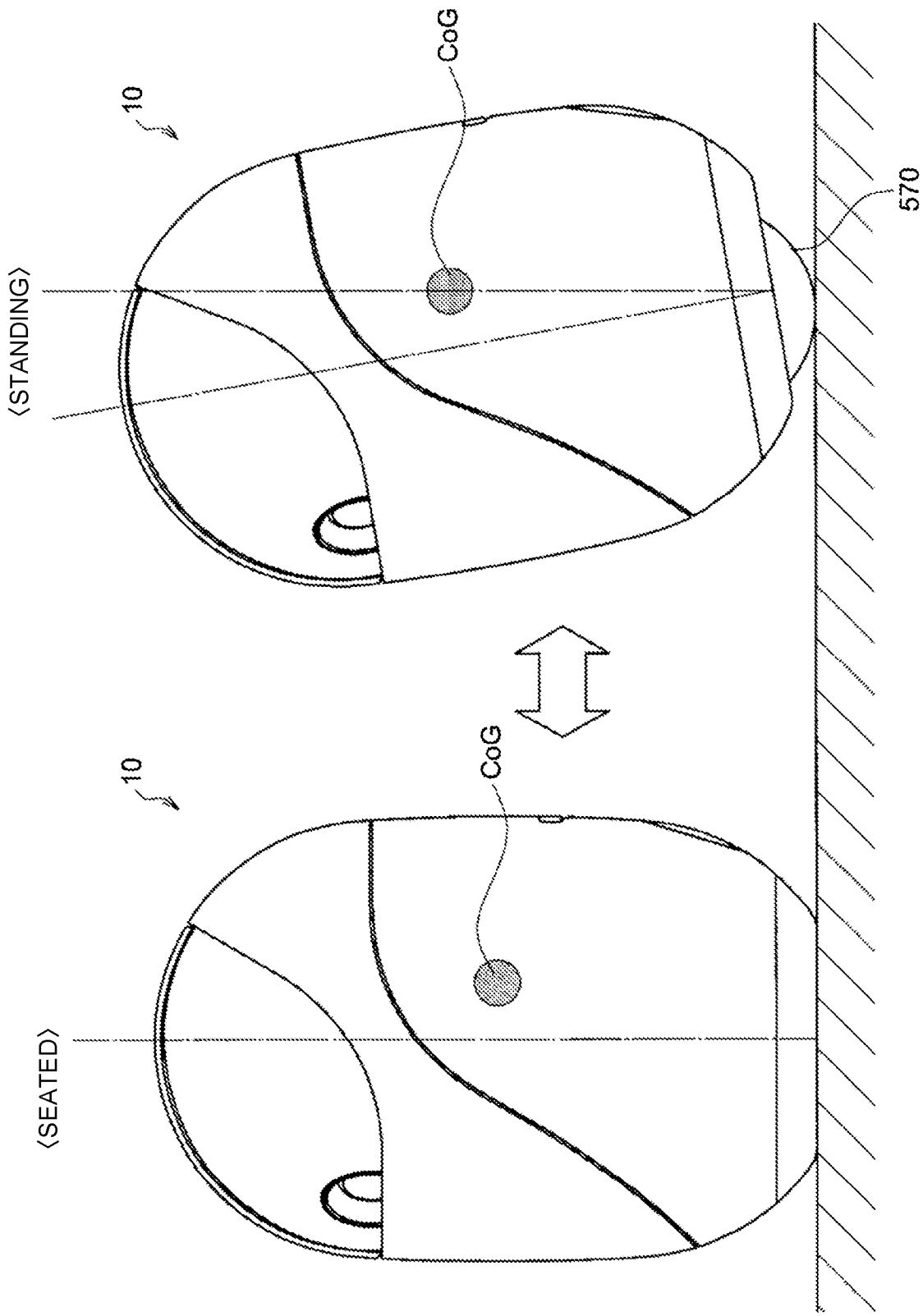
FIG. 34 is a diagram illustrating the posture control during stop and during movement according to the second embodiment.

Note that, the example illustrated in FIG. 33 shows that the autonomous mobile body 10 maintains the forward inclination posture even in the seated state. However, the posture in the seated state according to the present embodiment is not limited to the example. FIG. 34 illustrates an example that the autonomous mobile body 10 according to the present embodiment takes an upright posture in the seated state. In the example illustrated in FIG. 34, it can be seen that the bottom surface is formed such that an angle of the bottom surface is perpendicular to a body axis of the main body. As described above, the posture of the autonomous mobile body 10 in the seated state can be appropriately adjusted by changing the angle of the bottom surface.

As illustrated in FIG. 33, when the bottom surface is obliquely angled with respect to the body axis so that the front side opens, it is possible to further reduce the possibility that the lower front portion comes into contact with a traveling surface during the movement. On the other hand, as illustrated in FIG. 34, when the angle of the bottom surface is perpendicular to the body axis, an effect of more stable stopping of the autonomous mobile body 10 can be expected in the seated state.

However, in this case, in the seated state as illustrated on the left side of FIG. 34, the center of gravity CoG of the autonomous mobile body 10 is deviated from the rotation axis of the wheels 570. Here, when no control is performed, the main body of the autonomous mobile body 10 moves backward by the center of gravity CoG at the moment of transfer to the standing state.

In order to prevent the above situation, the operation control unit 260 according to the present embodiment may rotate the wheels 570 based on a deviation amount between the center of gravity CoG of the autonomous mobile body 10 and the rotation axis of the wheels 570 in the vertical direction at the time of transfer from the seated state to the standing state.

Figure 35:
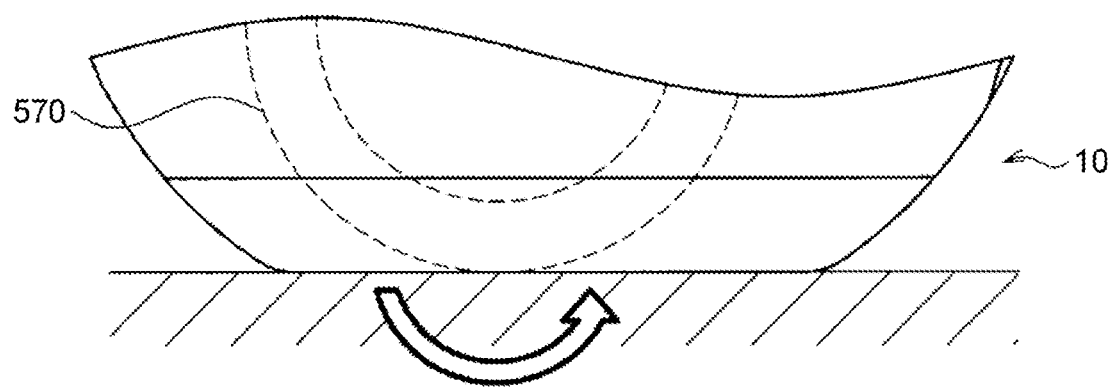
FIG. 35 is a diagram illustrating a wheel control during transfer to a standing state according to the second embodiment.

FIG. 35 is a diagram illustrating the wheel control at the time of transfer to the standing state according to the present embodiment. FIG. 35 illustrates a condition when the wheel 570 of the autonomous mobile body 10 comes into contact with the traveling surface as the wheel 570 is projected. At this point, the operation control unit 260 according to the present embodiment may perform the posture control after rotating the wheel 570 for the above deviation amount+α to position the center of gravity CoG on a vertical line of the rotation axis of the wheels 570. According to the above control by the operation control unit 260, even when a deviation occurs between the center of gravity and the rotation axis of the wheel 570 in the seated state, the deviation is offset, and the autonomous mobile body 10 can be stably transferred to the standing state without moving backward.

Figure 36:
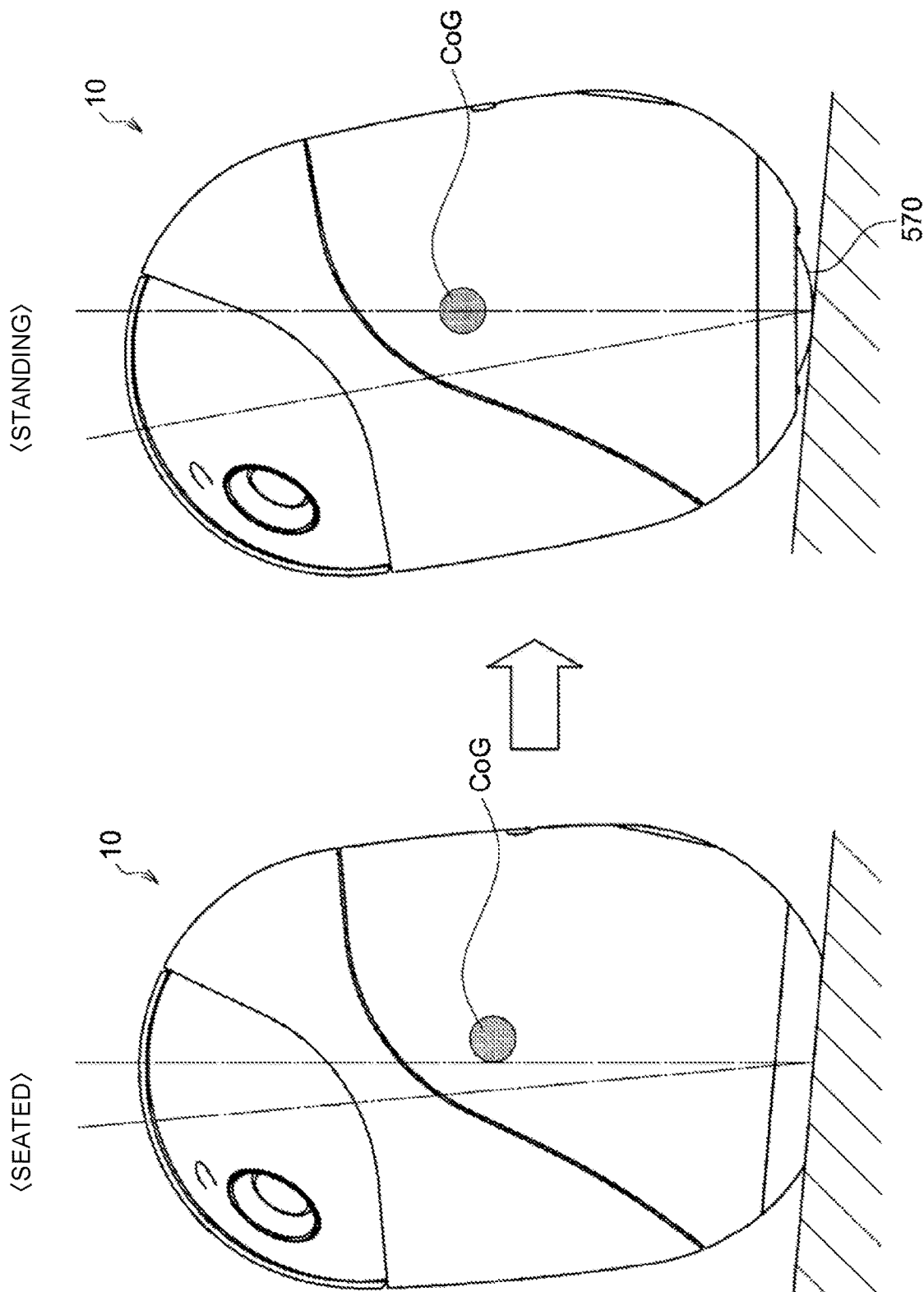
FIG. 36 is a diagram illustrating the wheel control during transfer to the standing state according to the second embodiment.

The above description refers to the example that the deviation occurs between the center of gravity and the rotation axis by forming the bottom surface perpendicular to the body axis. However, the deviation as described above can also occur when the traveling surface is tilted as illustrated in FIG. 36. In an example illustrated in FIG. 36, an angle of the bottom surface is same as that of the example illustrated in FIG. 33. However, since the traveling surface is tilted, the center of gravity CoG in the seated state deviates from the rotation axis of the wheel 570.

However, even in this case, as described with reference to FIG. 35, the operation control unit 260 can stably transfer the autonomous mobile body 10 to the standing state without moving backward by rotating the wheels 570 on the basis of the deviation amount between the center of gravity CoG and the rotation axis of the wheels 570 in the vertical direction.

The posture control in the seated state and the standing state according to the present embodiment has been described above. Next, the posture control using a flywheel according to the present embodiment will be described. In addition to the above-described configuration, the autonomous mobile body 10 according to the present embodiment may further include a flywheel 610. The operation control unit 260 according to the present embodiment can realize the posture control of the autonomous mobile body 10 with higher accuracy by using a gyro effect generated by the rotation of the flywheel 610.

Figure 37:
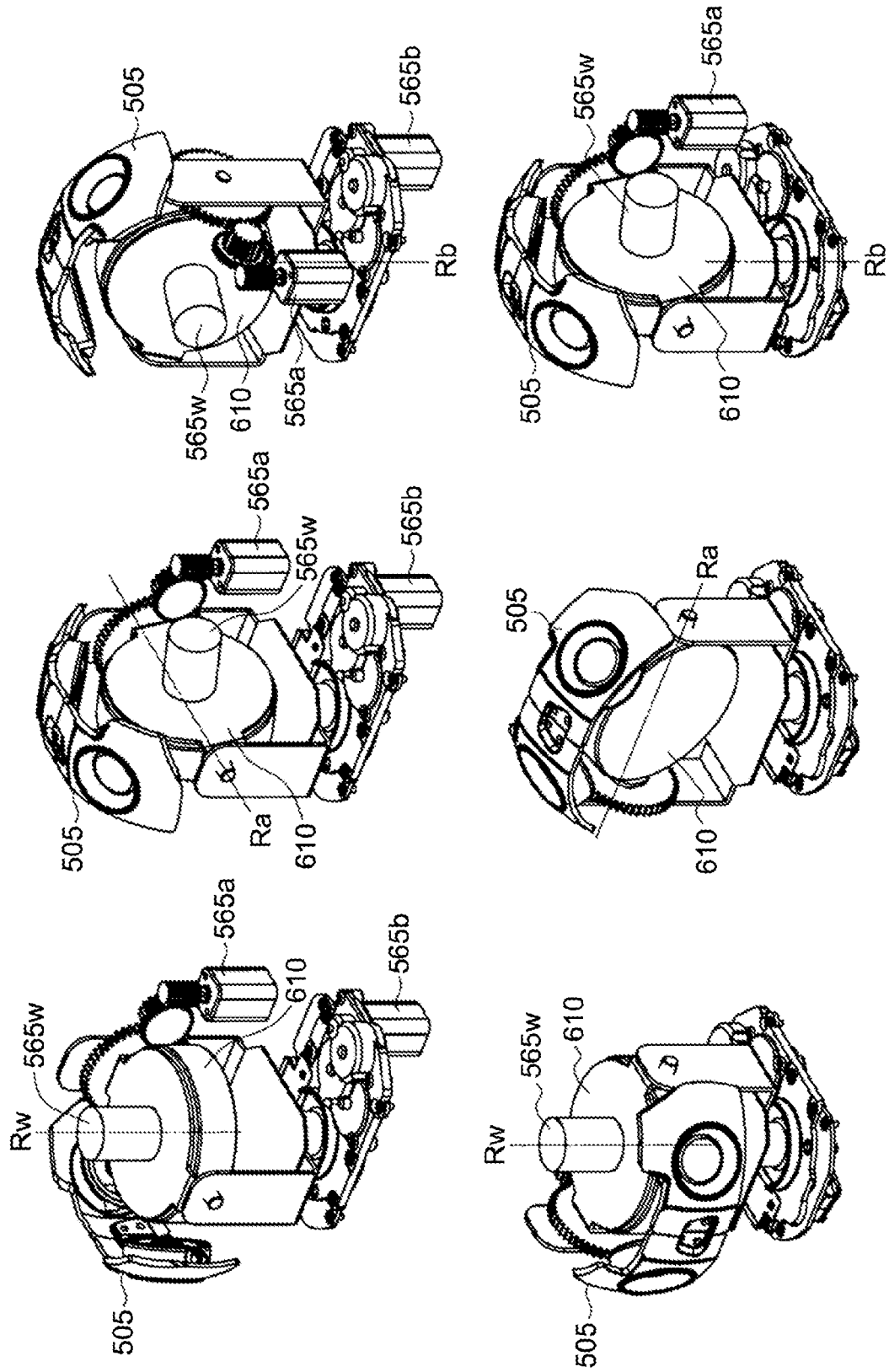
FIG. 37 is a diagram illustrating an arrangement of a flywheel according to the second embodiment.

FIG. 37 is a diagram illustrating an arrangement of the flywheel 610 according to the present embodiment. FIG. 37 illustrates an arrangement relationship of the flywheel and the substrate 505 according to the present embodiment from various angles. As illustrated in FIG. 37, the flywheel 610 according to the present embodiment is arranged inside the substrate 505 on which the eye part 510 and the camera 515 are arranged. The flywheel 610 according to the present embodiment can be arranged on a gimbal interlocked with the substrate 505 so as to have three rotation axes.

A rotation axis Rw illustrated on the left side of FIG. 37 is an axis for rotating the flywheel 610 at high speed. The operation control unit 260 according to the present embodiment drives a motor 565w to rotate the flywheel 610 at high speed, and the posture of the autonomous mobile body 10 can be maintained more stably by a generated gyro effect.

In addition, a rotation axis Ra illustrated in the center of FIG. 37 is an axis for rotating the flywheel 610 in a tilt direction in conjunction with the substrate 505. By driving a motor 565a, the operation control unit 260 according to the present embodiment can tilt the substrate 505 and the flywheel rotating at high speed in the tilt direction, so that a large rotational force can be generated by the gyro effect.

A rotation axis Rb illustrated on the right side of FIG. 37 is an axis for rotating the flywheel 610 in a pan direction in conjunction with the substrate 505. The operation control unit 260 according to the present embodiment can adjust orientation of the substrate 505 and the flywheel 610 in the pan direction by driving a motor 565b. According to the above control, it is possible to determine a direction to generate the rotational force by the gyro effect in an arbitrary direction.

The arrangement of the flywheel 610 according to the present embodiment has been described above. Next, recovery from the overturned state using the flywheel 610 according to the present embodiment will be described. As described above, the operation control unit 260 according to the present embodiment can generate a large rotational force due to the gyro effect by rotating the flywheel 610 at high speed and tilting the flywheel 610 rotating at high speed in the tilt direction.

Figure 38:
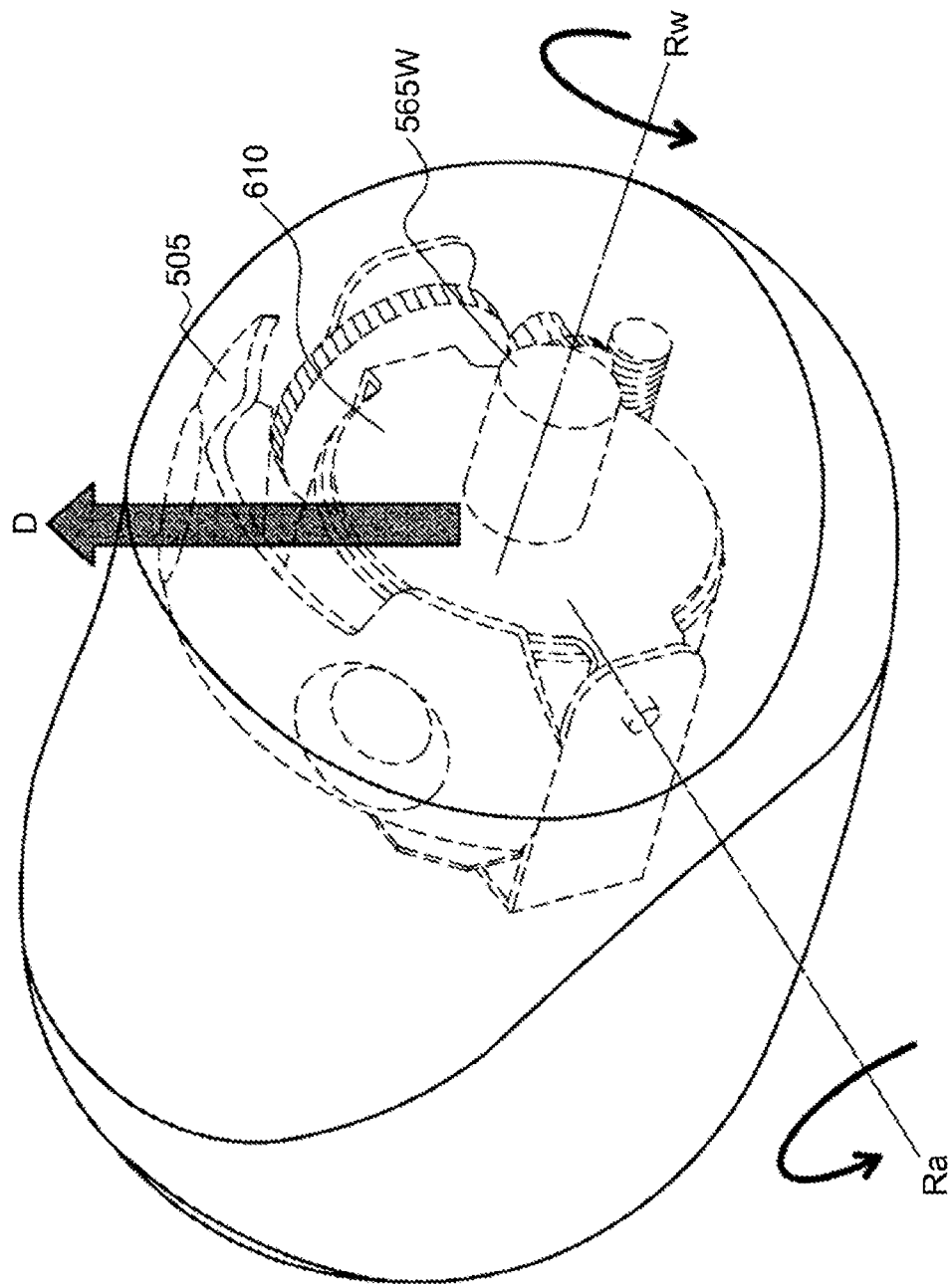
FIG. 38 is a diagram illustrating a rotational force generated by a gyro effect of the flywheel according to the second embodiment.

FIG. 38 is a diagram illustrating the rotational force generated by the gyro effect of the flywheel 610 according to the present embodiment. When the posture control is performed using the rotational force, the operation control unit 260 first causes the flywheel 610 to rotate at high speed about the rotation axis Rw to maintain a large angular momentum.

Next, the operation control unit 260 according to the present embodiment generates a large rotational force by the gyro effect by tilting the flywheel 610 rotating at high speed in the tilt direction around the rotation axis Ra. At this point, a generation direction D of the rotational force generated by the gyro effect is perpendicular to the rotation axes Rw and Ra as illustrated in FIG. 38. The operation control unit 260 according to the present embodiment can recover the autonomous mobile body 10 to the standing state from the overturned state, for example, by using the rotational force generated as described above.

Figure 39:
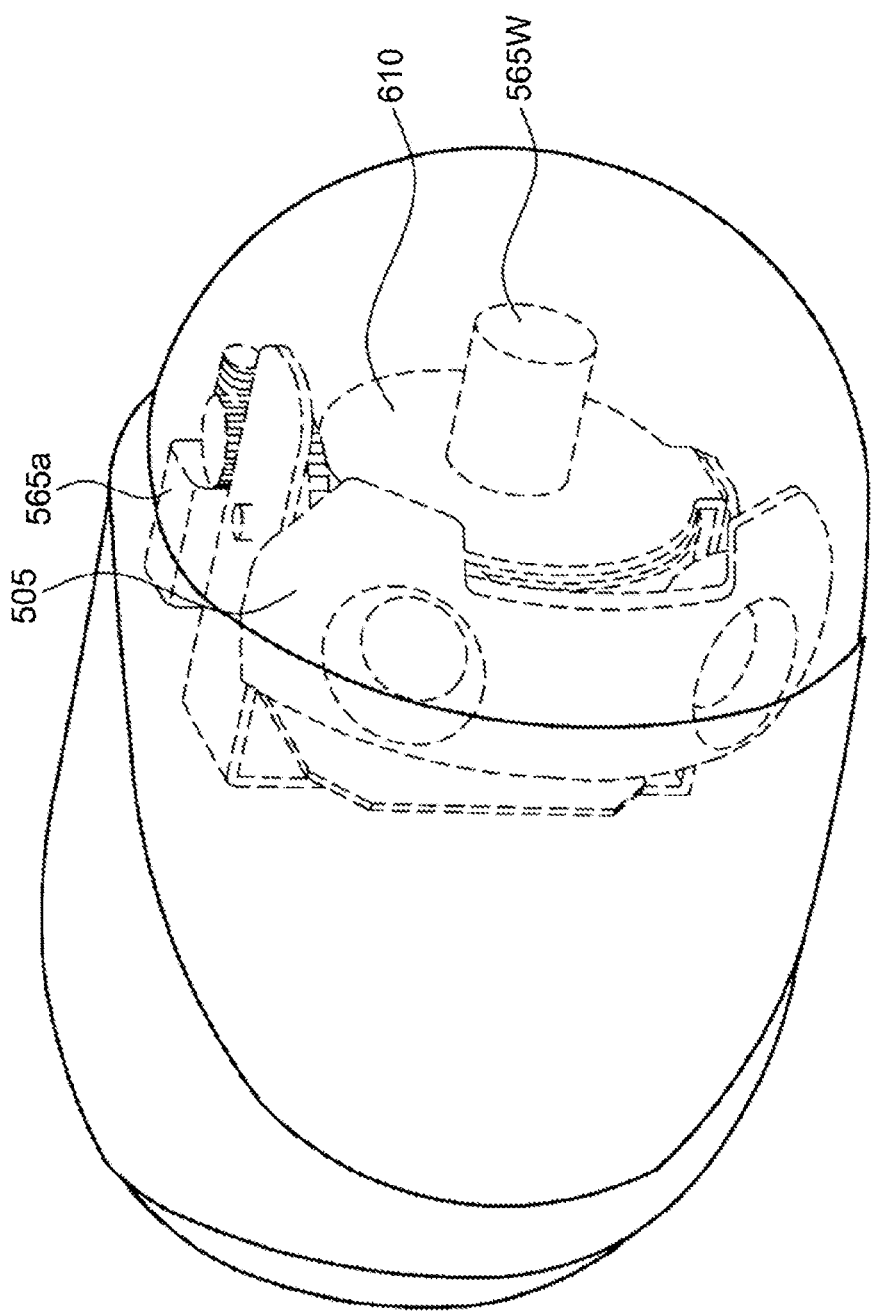
FIG. 39 is a diagram illustrating a flow of a recovery control from an overturned state according to the second embodiment.

FIG. 39 to FIG. 42 are diagrams illustrating a flow of recovery control from the overturned state according to the present embodiment. FIG. 39 is a diagram illustrating an example that the autonomous mobile body 10 has overturned sideways. In this case, the operation control unit 260 detects the direction of the autonomous mobile body 10 in the overturned state on the basis of the sensor information collected by the sensor unit 110.

Figure 40:
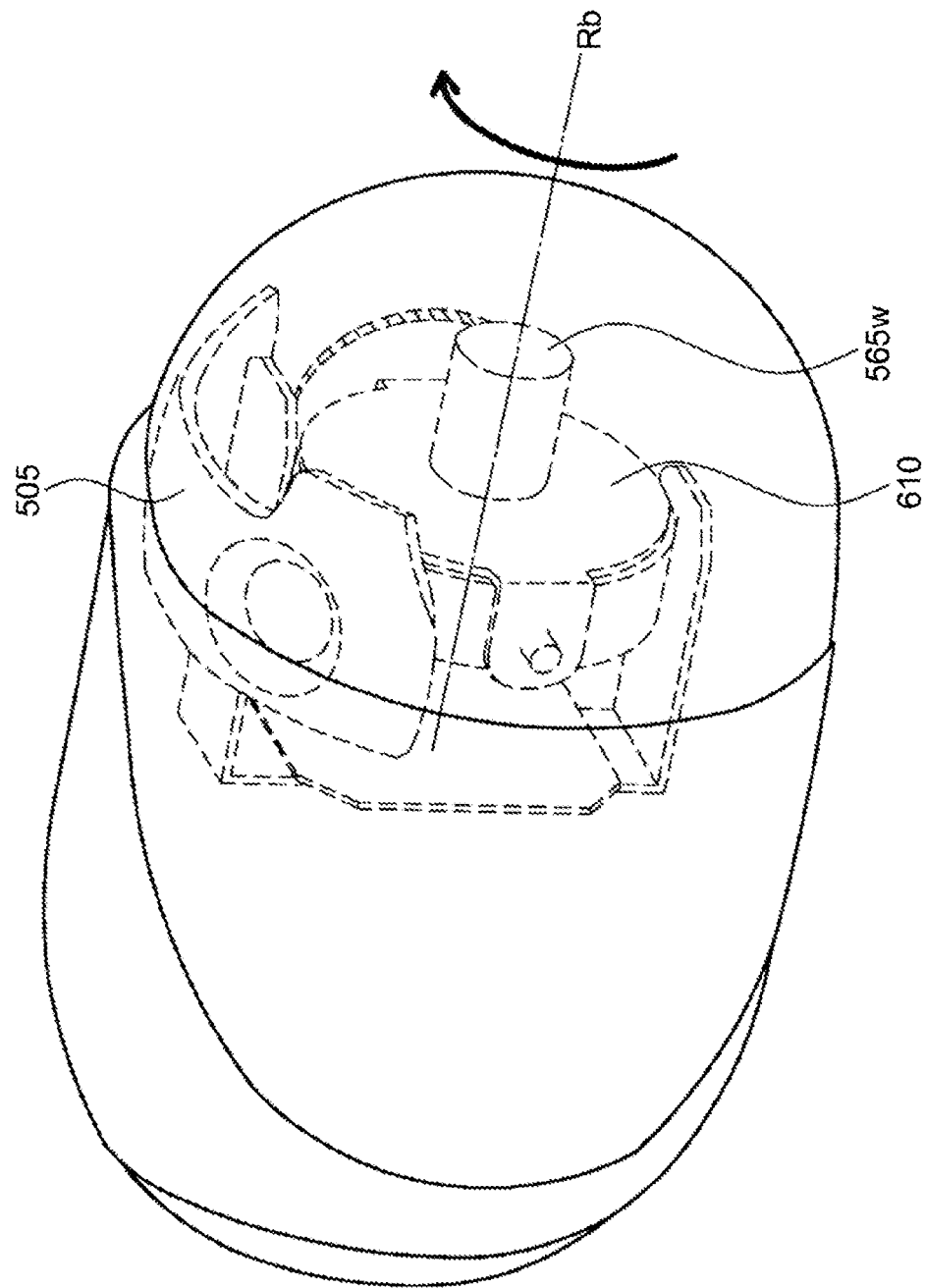
FIG. 40 is a diagram illustrating the flow of the recovery control from the overturned state according to the second embodiment.

Next, based on the direction detected above, the operation control unit 260 drives the motor 565b to rotate the substrate 505 and the flywheel 610 in the pan direction about the rotation axis Rb so that the substrate 505 faces a rising direction as illustrated in FIG. 40. In other words, the operation control unit 260 can adjust the generation direction of the rotational force using the gyro effect by tilting the flywheel 610 in the pan direction. According to the above control, although the autonomous mobile body 10 overturns in any direction, the autonomous mobile body 10 can be recovered to the standing state at a correct mechanical position.

Figure 41:
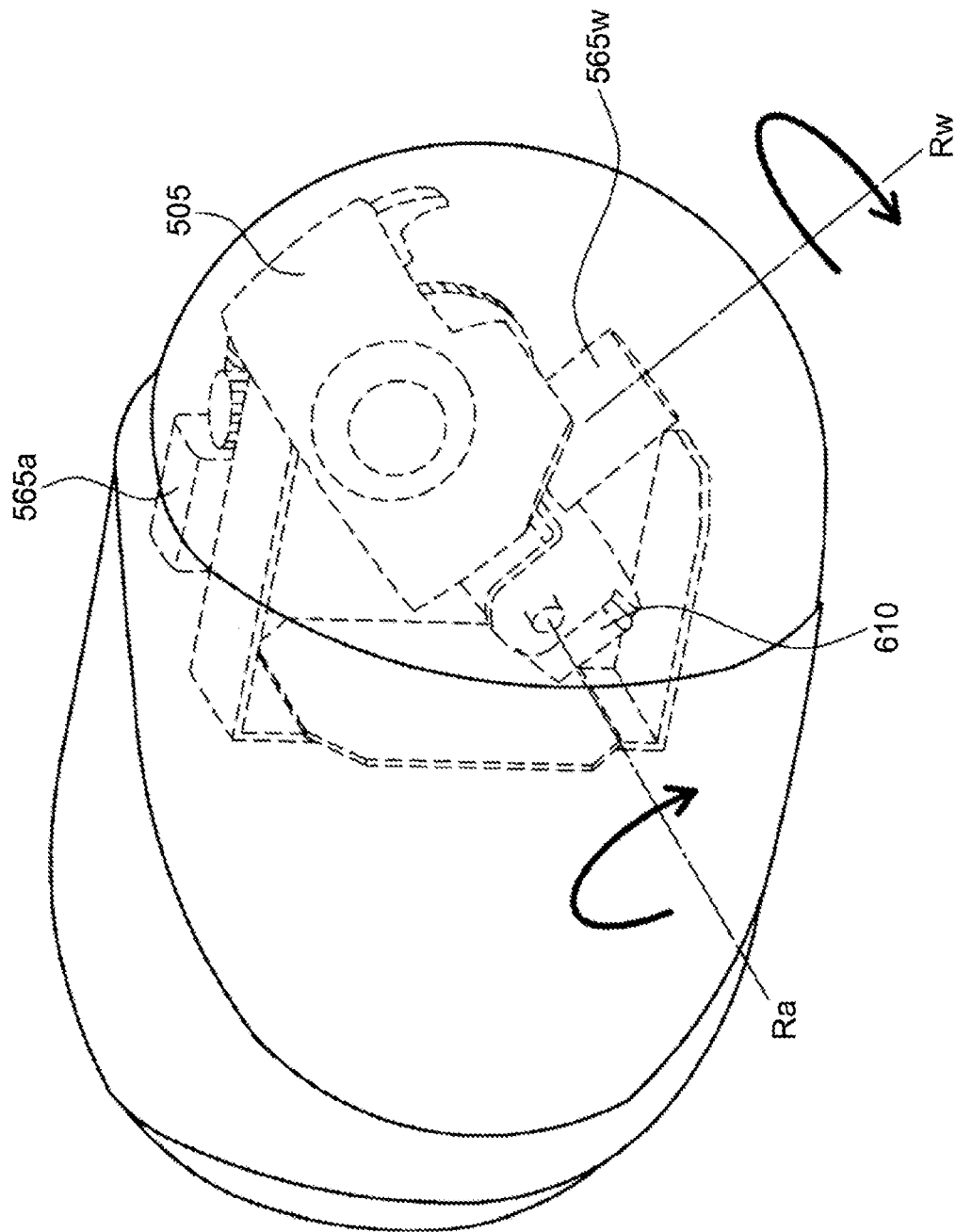
FIG. 41 is a diagram illustrating the flow of the recovery control from the overturned state according to the second embodiment.

Next, as illustrated in FIG. 41, the operation control unit 260 drives the motor 565w to rotate the flywheel 610 at high speed. Here, when the rotation speed of the flywheel 610 exceeds a threshold, the operation control unit 260 drives the motor 565a to tilt the substrate 505 and the flywheel 610 at high speed in the tilt direction around the rotation axis Ra.

Figure 42:
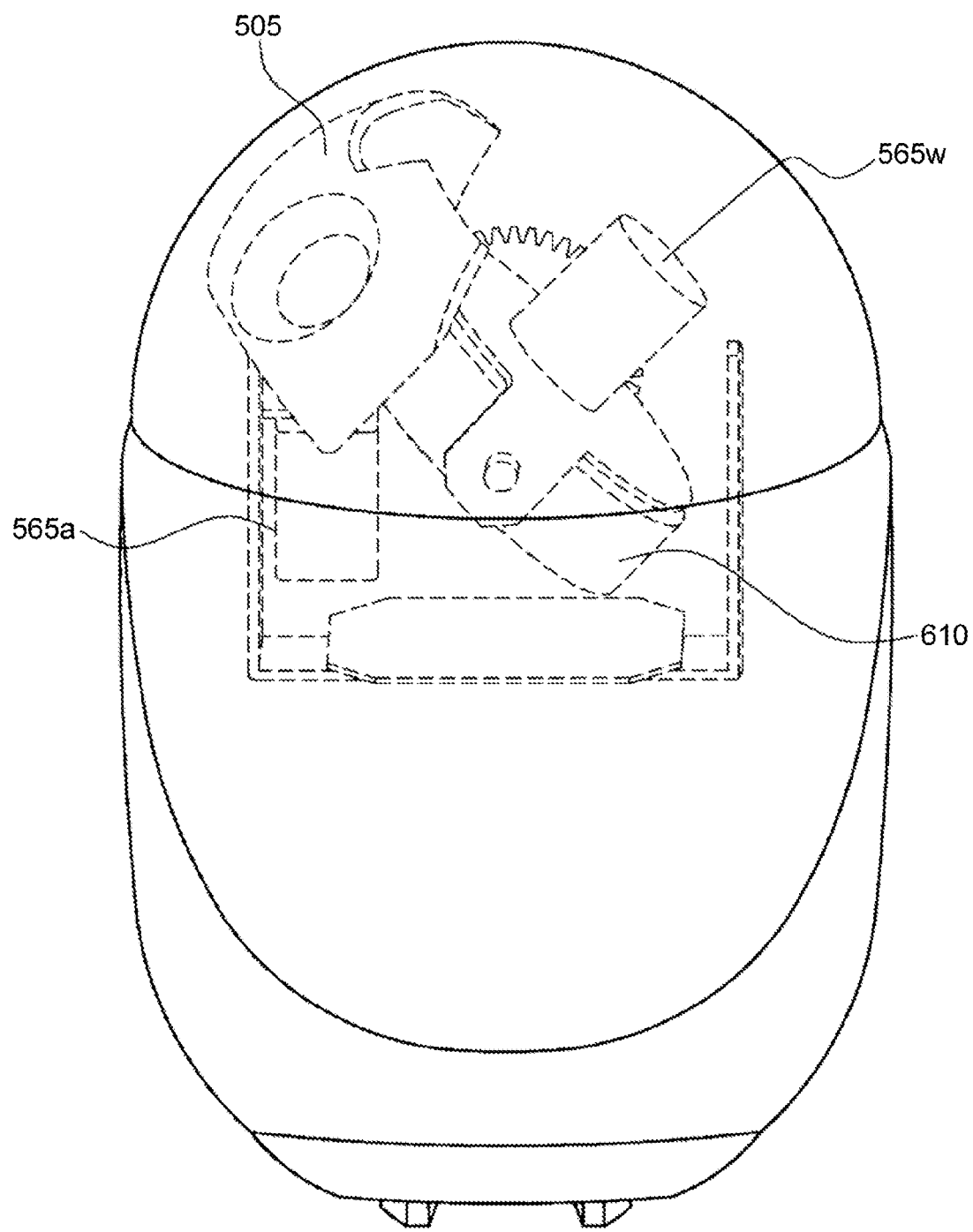
FIG. 42 is a diagram illustrating the flow of the recovery control from the overturned state according to the second embodiment.

According to the control described above, the autonomous mobile body 10 can recover from the overturned state to the standing state as illustrated in FIG. 42 by the rotational force using the gyro effect.

Note that the operation control unit 260 according to the present embodiment is not limited to recovery from the overturned state described above, and can perform various operation controls using the flywheel 610. For example, by using the gyro effect of the flywheel 610, the operation control unit 260 can also stop the body axis of the autonomous mobile body 10 close to horizontal, or recover the body axis from this state to the standing state. Furthermore, for example, the operation control unit 260 can also cause the autonomous mobile body 10 to execute jumping, forward rotation, side rotation, and the like. The flywheel 610 and the operation control unit 260 according to the present embodiment can realize the stable posture control of the autonomous mobile body 10 and also realize more ample actions and expressions.

2.4 Summary

As described above, the autonomous mobile body 10 according to the second embodiment of the present disclosure includes the wheels 570 capable of being housed inside the main body and projected outside the main body. In addition, when the autonomous mobile body 10 moves, the operation control unit 260 according to the second embodiment of the present disclosure projects the wheels 570 outside the main body to maintain the standing state, and performs the drive control of the wheels 570 and the posture control of the autonomous mobile body 10. Further, when the autonomous mobile body 10 is stopped, the operation control unit 260 stops the autonomous mobile body 10 in the seated state by housing the wheels 570 inside the main body. According to this configuration, the autonomous mobile body can realize ample actions and expressions with easier posture control.

Other configurations, operations, and effects may be similar to those of the above-described embodiment, and thus detailed description thereof is omitted here.

3. Third Embodiment

Next, a third embodiment of the present disclosure will be described in detail below with reference to the drawings. In the following description, configurations and operations similar to those of the above-described embodiment are cited to omit redundant description thereof.

In the present embodiment, a more specific configuration of the sensor unit 110 mounted on the autonomous mobile body 10 according to the above-described embodiments will be described with an example.

Note that the configuration of the autonomous mobile body according to the present embodiment may be similar to the configuration described with reference to FIGS. 1, 2, 3, 4, 5, 6, 7, 8, 9, 10, 11, 12, 13A and FIG. 13B in the first embodiment described above, and thus a detailed description thereof will be omitted here. In the present embodiment, a case where the functional configuration example described with reference to FIG. 32 in the above-described second embodiment is adopted as the functional configuration of the autonomous mobile body. However, the present embodiment is not limited thereto, and for example, the information processing system described with reference to FIG. 14 to FIG. 16 in the above-described first embodiment can also be adopted.

3.1 Configuration Example of Sensor Unit

Figure 43:
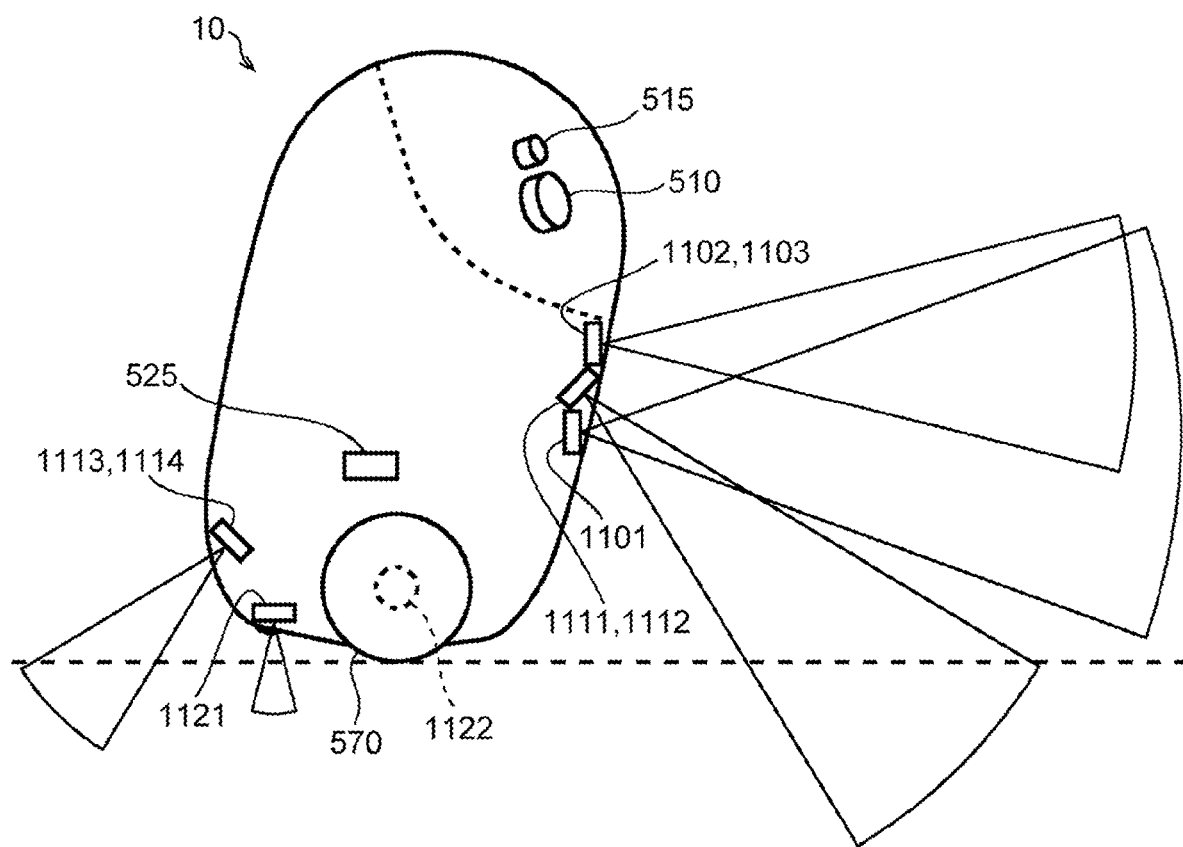
FIG. 43 is a schematic diagram illustrating a configuration example of a sensor unit mounted on an autonomous mobile body according to a third embodiment (side view).
Figure 44:
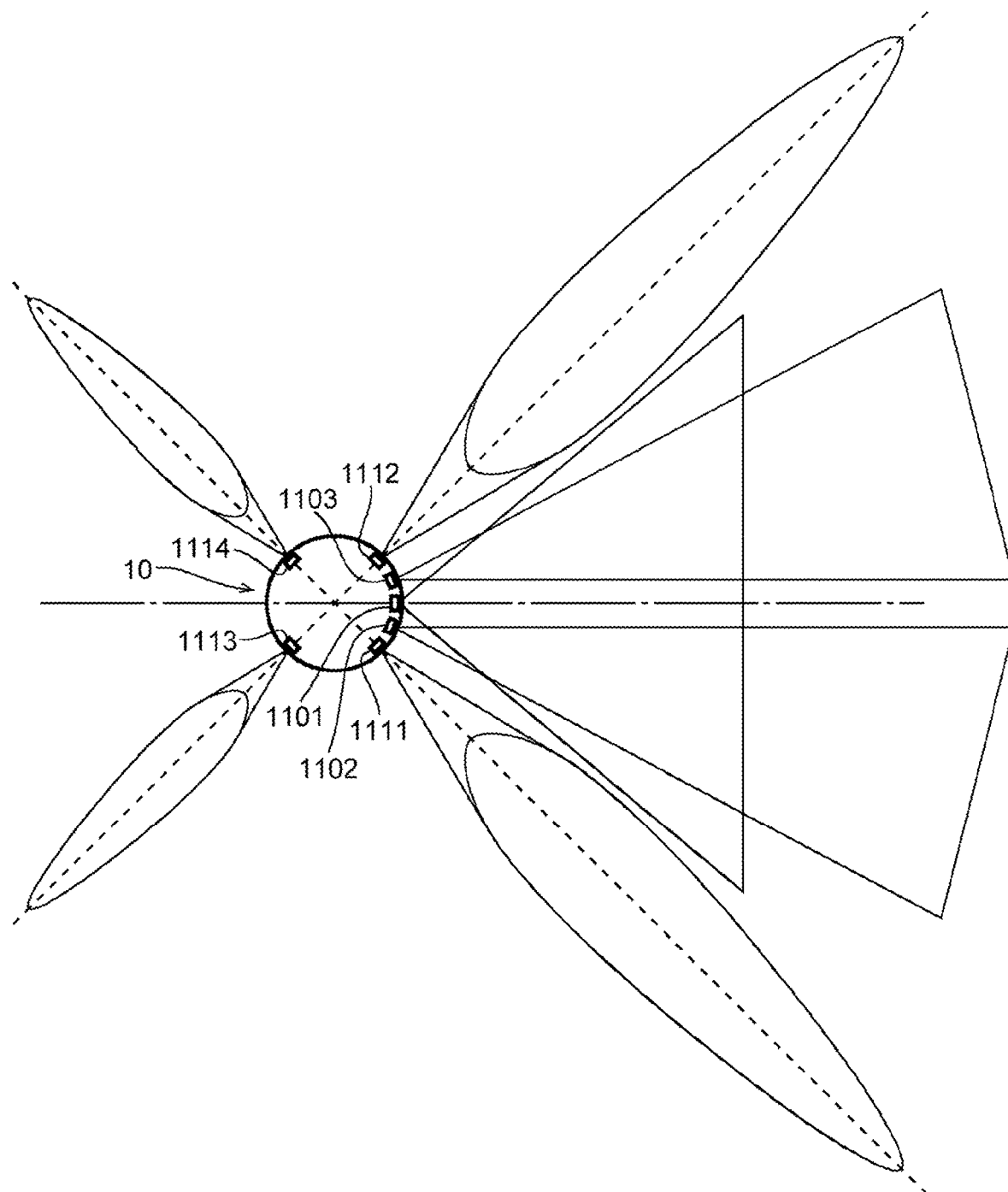
FIG. 44 is a schematic diagram illustrating the configuration example of the sensor unit mounted on the autonomous mobile body according to the third embodiment (top view).

FIG. 43 and FIG. 44 are schematic diagrams illustrating a configuration example of the sensor unit mounted on the autonomous mobile body according to the third embodiment of the present disclosure. FIG. 43 is a schematic diagram illustrating a sensor position when the autonomous mobile body 10 is viewed from a side, and FIG. 44 is a schematic diagram illustrating the sensor position when the autonomous mobile body 10 is viewed from above.

As illustrated in FIG. 43 and FIG. 44, the autonomous mobile body 10 according to the present embodiment includes, for example, a first obstacle sensor 1101, second obstacle sensors 1102 and 1103, first to fourth floor surface sensors 1111 to 1114, a proximity sensor 1121, and a torque sensor 1122. Further, the autonomous mobile body 10 also includes the inertial sensor 525 and the camera 515 as in the above-described embodiments.

(First Obstacle Sensor 1101)

The first obstacle sensor 1101 is provided, for example, on the front of the autonomous mobile body 10 in the standing state, and detects an obstacle or an object such as a person present in a relatively wide angle range in a front forward of the autonomous mobile body 10. The first obstacle sensor 1101 may be, for example, a millimeter wave radar sensor. However, the present invention is not limited thereto, and for example, various sensors capable of detecting an object such as an obstacle or a person can be applied to the first obstacle sensor 1101. This includes a three-dimensional ToF sensor that detects a distance to the object or a shape of the object using reflected light, a ToF sensor that uses an infrared light source or a near-infrared light source as a light source, an ultrasonic sensor that emits an ultrasonic wave and detects a distance to the object and the like based on reflection of the ultrasonic wave, a camera that images the object, and the like.

(Second Obstacle Sensors 1102 and 1103)

The second obstacle sensor 1102 is provided, for example, on the front right side of the autonomous mobile body 10 in the standing state, and detects an obstacle or an object such as a person present in a right forward direction of the autonomous mobile body 10. On the other hand, the second obstacle sensor 1103 is provided, for example, on the front left side of the autonomous mobile body 10 in the standing state, and detects an obstacle or an object such as a person present in a left forward direction of the autonomous mobile body 10. These second obstacle sensors 1102 and 1103 may be, for example, one-dimensional ToF sensors that measure a distance to an object existing in one direction. However, the present invention is not limited thereto, and various sensors, such as a millimeter wave radar sensor, a three-dimensional ToF sensor, and an ultrasonic sensor, capable of detecting an obstacle or an object such as a person can be applied to the second obstacle sensors 1102 and 1103.

As illustrated in FIG. 44, a detection range of the first obstacle sensor 1101 and a detection range of the second obstacle sensor 1102 or 1103 overlap with each other. In other words, the present embodiment is configured such that the first obstacle sensor 1101 and the second obstacle sensor 1102 detect an object present in the right forward direction of the autonomous mobile body 10, and the first obstacle sensor 1101 and the second obstacle sensor 1103 detect an object present in the left forward direction of the autonomous mobile body 10.

(First to Fourth Floor Surface Sensors 1111 to 1114)

The first to fourth floor surface sensors 1111 to 1114 are, for example, arranged along an outer periphery of the autonomous mobile body 10 in the standing state, and detect the shape of the floor surface around the autonomous mobile body 10. The floor surface on which the autonomous mobile body 10 is placed refers to, for example, the floor surface such as a wooden floor or a tatami (knitted straw) mat and a top surface of the top plate of a table, a desk, or the like. A shape of the floor surface may be an outer edge of the top surface of the top plate, a shape of a room, a corridor, or the like partitioned by a wall, a rail, or the like. Note that, in the following description, the outer edge of the top surface of the top plate, or walls and rails that partition a room, a corridor, and the like are referred to as a "boundary".

For example, the first floor surface sensor 1111 is provided obliquely downward toward the front right of the autonomous mobile body 10 in the standing state, and detects the boundary in the right forward direction of the autonomous mobile body 10. Similarly, the second floor surface sensor 1112 is provided obliquely downward on the left front of the autonomous mobile body 10 in the standing state to detect the boundary in the left forward direction of the autonomous mobile body 10, the third floor surface sensor 1113 is provided obliquely downward on the right back of the autonomous mobile body 10 in the standing state to detect the boundary in the right backward direction of the autonomous mobile body 10, and the fourth floor surface sensor 1114 is provided obliquely downward on the left back of the autonomous mobile body 10 in the standing state to detect the boundary in the left backward of the autonomous mobile body 10. The first to fourth floor surface sensors 1111 to 1114 on the outer periphery of the autonomous mobile body 10 may be, for example, installed at 90-degree intervals.

These first to fourth floor surface sensors 1111 to 1114 may be, for example, one-dimensional ToF sensors. However, the present invention is not limited thereto, and various sensors, such as an ultrasonic sensor and a proximity sensor, can be applied to the first to fourth floor surface sensors 1111 to 1114 as long as the sensors can detect a distance to an object (floor surface, etc.) present at a position obliquely downward where each sensor faces or identify the boundary shape.

(Proximity Sensor 1121)

The proximity sensor 1121 is provided, for example, on the bottom of the autonomous mobile body 10 in the standing state or the seated state, and detects whether or not an object such as a floor is in proximity to the bottom of the autonomous mobile body 10. In other words, the proximity sensor 1121 detects, for example, whether the autonomous mobile body 10 is placed in the standing or seated state with respect to the floor surface or the like, lifted by the user or the like, or placed in a horizontal state with respect to the floor surface or the like. Note that, instead of the proximity sensor 1121, a sensor capable of determining whether or not an object such as the floor surface is in proximity to the bottom of the autonomous mobile body 10, such as a ToF sensor, may be used.

(Torque Sensor 1122)

The torque sensor 1122 is provided, for example, on the axle of the wheels 570 and detects torque generated on the axle. As the torque sensor 1122, for example, various torque sensors such as a magnetostrictive type, a strain gauge type, a piezoelectric type, an optical type, a spring type, and a capacitance type may be adopted.

(Inertial Sensor 525)

As described in the first embodiment, the inertial sensor 525 may be, for example, a sensor such as an inertial measurement unit (IMU) that is capable of detecting at least one of acceleration, angle, angular velocity, angular acceleration, and the like.

(Camera 515)

The camera 515 is an imaging device that images a user and a surrounding environment. Image data acquired by the camera 515 may be, for example, provided to the user as a photograph or may be used for user's face recognition.

Note that the sensor unit 110 may further include various sensors such as a microphone for inputting sound such as voice uttered by the user, and a global positioning system (GPS) for measuring the position of the autonomous mobile body 10.

3.2 Operation Example Based on Detection Result

Next, a control operation based on the detection result obtained by the sensor unit 110 configured as above will be described with some examples.

3.2.1 Collision Prevention Operation

Collision prevention operation is an operation in which the autonomous mobile body 10 avoids an obstacle present in a traveling direction or a travel route to prevent a collision. The collision prevention operation includes, for example, an obstacle detection operation and an obstacle avoidance operation. The obstacle detection and avoidance are executed using the first obstacle sensor 1101 and the second obstacle sensors 1102 and 1103 of the sensor unit 110.

Here, the first obstacle sensor 1101 and the second obstacle sensors 1102 and 1103 are preferably different types of sensors. For example, when a millimeter wave radar sensor is used as the first obstacle sensor 1101, it is preferable to use a sensor type different from the millimeter wave radar sensor for the second obstacle sensors 1102 and 1103, such as the one-dimensional ToF sensor.

Specifically, the operation control unit 260 determines whether an obstacle is present in the traveling direction or the travel route of the autonomous mobile body 10 based on the detection result obtained from the first obstacle sensor 1101 and the detection result obtained from the second obstacle sensor 1102 and/or 1103. When the obstacle is detected in at least one of the first obstacle sensor 1101 and the second obstacle sensor 1102 and/or 1103, the operation control unit 260 determines that an obstacle is present on the traveling direction or the travel route of the autonomous mobile body 10.

As described above, by using different types of sensors for the first obstacle sensor 1101 and the second obstacle sensors 1102 and 1103, it is possible to detect the obstacle more reliably.

In other words, the millimeter wave radar sensor, the one-dimensional ToF sensor, the ultrasonic sensor, and the like have different detection accuracy depending on the size, shape, material, color, and the like of a target object, and also have different robustness against changes in detection conditions such as flaw and adhesion of dust. For example, the millimeter wave radar sensor has low detection accuracy with respect to a transparent object, and the detection accuracy of the distance measuring sensor such as the one-dimensional ToF sensor greatly reduces due to flaw or adhesion of dust on a sensor window. Therefore, by using different types of sensors for the first obstacle sensor 1101 and the second obstacle sensors 1102 and 1103 and determining that the obstacle is present when the obstacle is detected by any of the sensors, it is possible to improve the robustness against types of detection targets, detection conditions, and the like.

Then, when it is determined that there is an obstacle to be avoided in the traveling direction or on the travel route, the operation control unit 260 executes an operation for avoiding the obstacle (obstacle avoidance operation). Specifically, the operation control unit 260 determines whether to avoid the obstacle to the right or left side based on the traveling direction and/or the travel route of the autonomous mobile body 10 and the position of the obstacle, and causes the autonomous mobile body 10 to travel in the determined direction.

Here, the operation control unit 260 may perform the obstacle avoidance operation with various methods such as the obstacle avoidance operation by updating the travel route to a destination to include a route for avoiding the obstacle, or determining a new travel route to the destination based on the current position of the autonomous mobile body 10 after avoiding the obstacle. Furthermore, the obstacle avoidance operation may include deceleration, stop, and the like of the autonomous mobile body 10.

Detection results obtained by the second obstacle sensors 1102 and 1103 may be used for determining whether to avoid the obstacle to the right or left. For example, the operation control unit 260 may control the autonomous mobile body 10 to pass on the left side of the obstacle when the obstacle is detected by the second obstacle sensor 1102 arranged on the right front surface, and to pass on the right side of the obstacle when the obstacle is detected by the second obstacle sensor 1103 arranged on the left front surface.

3.2.2 Fall and Collision Prevention Operation

The fall and collision prevention operation is an operation for preventing the autonomous mobile body 10 from falling from a table or the like or from colliding with a wall. The fall and collision prevention operation includes, for example, a boundary detection operation and a boundary avoidance operation, and the boundary is detected and avoided using a plurality of (four in this example) first to fourth floor surface sensors 1111 to 1114.

As described above, the first to fourth floor surface sensors 1111 to 1114 are arranged, for example, along the outer periphery of the autonomous mobile body 10 in the standing state. Therefore, it is possible to detect the shape of the boundary around the autonomous mobile body 10 by using the first to fourth floor surface sensors 1111 to 1114. Accordingly, even when the autonomous mobile body 10 travels in any direction, it is possible to prevent the autonomous mobile body 10 from falling from the table or the like or from colliding with the wall.

However, for example, in a case where a distance measuring sensor such as the one-dimensional ToF sensor is used as the first to fourth floor surface sensors 1111 to 1114, detection accuracy greatly reduces due to flaw or adhesion of dust on the sensor window.

Therefore, in the present embodiment, in addition to an absolute value of a value detected by each of the first to fourth floor surface sensors 1111 to 1114, a position, distance, and the like of the boundary in each direction are detected based on a change amount of the values detected by each of the first to fourth floor surface sensors 1111 to 1114. Specifically, for example, the operation control unit 260 monitors the change amount (differential value) of values detected by the first to fourth floor surface sensors 1111 to 1114, and estimates or identifies the position, the distance, or the like of the boundary in each direction from both values of a distance to the boundary obtained from the absolute value of the value detected by each of the first to fourth floor surface sensors 1111 to 1114 and the change amount of the values detected by the first to fourth floor surface sensors 1111 to 1114.

Here, in general, the one-dimensional ToF sensor or the like used for the first to fourth floor surface sensors 1111 to 1114 has an individual value, and its distance measurement accuracy differs by individual sensor. In such a case, it is possible to enhance robustness with respect to distance measurement and detection accuracy by calibrating each of the first to fourth floor surface sensors 1111 to 1114 before shipment of the autonomous mobile body 10 or when the autonomous mobile body 10 is initially activated.

The present embodiment gives an example of arranging the four floor surface sensors 1111 to 1114 along the outer periphery of the autonomous mobile body 10. However, the number of floor surface sensors to be arranged is not limited to four, and may be variously changed. In this case, the number of floor surface sensors is determined in consideration with spreading of the detection range of each floor surface sensor. This makes it possible to accurately detect the presence of the boundary around the autonomous mobile body 10, the distance to the boundary, and the like.

Then, when it is determined that there is the boundary on the traveling direction or the travel route, the operation control unit 260 executes an operation for avoiding the boundary (boundary avoidance operation). Specifically, the operation control unit 260 determines whether to change the traveling direction to the right or left side based on the traveling direction and/or the travel route of the autonomous mobile body 10 and the boundary position, and corrects the traveling direction of the autonomous mobile body 10 to the determined direction.

Here, the operation control unit 260 may perform the boundary avoidance operation with various methods such as the boundary avoidance operation by updating the travel route to a destination to include a route for avoiding the boundary, or determining a new travel route to the destination based on the current position of the autonomous mobile body 10 after the boundary avoidance operation for avoiding the boundary. Furthermore, the boundary avoidance operation may include deceleration, stop, and the like of the autonomous mobile body 10.

3.2.3 Idling Prevention Operation

The idling prevention operation is an operation for preventing the wheels 570 from idling when the autonomous mobile body 10 is lifted by the user or the like, dropped from a table or the like, overturned, or the like. The idling prevention operation includes, for example, detecting the lifting and the like and a wheel stop operation. The proximity sensor 1121, the torque sensor 1122, and the inertial sensor 525 are used for detecting lifting and the like of the autonomous mobile body 10 and stopping the wheels 570. The first to fourth floor surface sensors 1111 to 1114 may be further used for detecting the lifting and the like.

For example, when at least one or a predetermined number or more of the following conditions (1) to (4) are satisfied while the autonomous mobile body 10 is traveling, the operation control unit 260 stops the rotation of the wheels 570 in order to prevent further idling of the wheels 570.

(1) When the proximity sensor 1121 detects that the bottom of the autonomous mobile body 10 is separated from the floor surface (2) When the inertial sensor 525 detects an acceleration change in a predetermined direction (e.g., Z-axis direction).

(3) When values of all of the first to fourth floor surface sensors 1111 to 1114 change for a predetermined value or more.

(4) When a torque detected by the torque sensor 1122 does not change for a certain period of time or more.

In this way, by configuring to detect idling (or the possibility thereof) of the wheels 570 using different types of sensors, it is possible to more reliably prevent the idling of the wheels 570. For example, even when the proximity sensor 1121 is covered by the user's hand, or the autonomous mobile body 10 is slowly lifted and the inertial sensor 525 cannot detect the acceleration change in the vertical direction (Z-axis direction), lifting, falling, overturning, or the like of the autonomous mobile body 10 can be detected on the basis of detection results of other sensors to stop the rotation of the wheels 570.

To supplement the condition (4), when the autonomous mobile body 10 stands still or travels in an inverted state, for example, the motor 565 applies a periodically changing torque to the axle of the wheels 570 in order to maintain the inverted state of the autonomous mobile body 10. Therefore, during this period, the torque sensor 1122 detects the torque that periodically changes. The torque that the motor 565 applies to the axle is controlled by, for example, a feedback control based on a value detected by the inertial sensor 525. Therefore, for example, when acceleration detected by the inertial sensor 525 is not accompanied with a periodic change, due to the autonomous mobile body 10 being lifted, dropped, or overturned, the torque detected by the torque sensor 1122 is also not accompanied with the periodic change. Therefore, in the present embodiment, when the torque detected by the torque sensor 1122 does not change for a certain period of time or more, the operation control unit 260 may determine that the autonomous mobile body 10 has been lifted, dropped, or overturned.

In addition, conditions for determining whether the autonomous mobile body 10 is lifted, dropped, or overturned is not limited to the above conditions. For example, in a case where the condition (1) is satisfied, the operation control unit 260 may determine that the autonomous mobile body 10 is lifted, dropped, or overturned regardless of other conditions. Further, regarding the condition (2), when the acceleration change in the Z-axis direction detected by the inertial sensor 525 exceeds a preset threshold, the operation control unit 260 may determine that the autonomous mobile body 10 has been lifted, dropped, or overturned. Further, regarding the condition (3), when the change amount of the values detected by each of the first to fourth floor surface sensors 1111 to 1114 is a predetermined value or more, the operation control unit 260 may determine that the autonomous mobile body 10 is lifted, dropped, or overturned. Furthermore, regarding the condition (4), in a case where the torque detected by the torque sensor 1122 suddenly decreases, the operation control unit 260 may determine that the autonomous mobile body 10 is lifted, dropped, or overturned.

Note that the operation control unit 260 according to the present embodiment may determine whether or not the autonomous mobile body 10 is in the standing state (also referred to as the inverted state) on the basis of the detection results acquired by the first to fourth floor surface sensors. Then, when the autonomous mobile body 10 is determined to be in the inverted state based on the detection results, the operation control unit 260 may control the motor 565, which is the drive mechanism of the wheels 570, to maintain the inverted state of the autonomous mobile body 10.

3.2.4 Human, Breath, and Gesture Detecting Operation

Furthermore, in the present embodiment, in addition to the above-described operation examples, a human sensing operation for detecting whether or not the user or the like is present nearby, a breath detecting operation for detecting a breath of the user or the like, a gesture detecting operation for detecting a gesture by the user or the like, and the like may be executed on the basis of detection results obtained by the sensor unit 110.

For example, the human sensing operation may be the operation of detecting whether a person or the like is present around the autonomous mobile body 10 and switching between the normal mode and the standby mode based on the detection result. In addition, the breath detecting operation may be the operation of detecting breath of a person, a pet animal, or the like and identifying a health condition, a mental condition, or the like of the detection target based on the detection result. Furthermore, the gesture detecting operation may be the operation of detecting a gesture motion of a person or the like and executing a reaction or behavior according to the detected gesture motion. For these operations, the first obstacle sensor 1101 or other sensors may be used.

3.3 Flow of Control Based on Sensor Result

Next, a flow of control of the autonomous mobile body 10 based on a result detected by the sensor unit 110 according to the present embodiment will be described in detail. In the following description, for the sake of simplicity, a case where the autonomous mobile body 10 is placed on a table will be exemplified.

3.3.1 Main Operation (Including Obstacle and Boundary Avoidance Operation)

Figure 45:
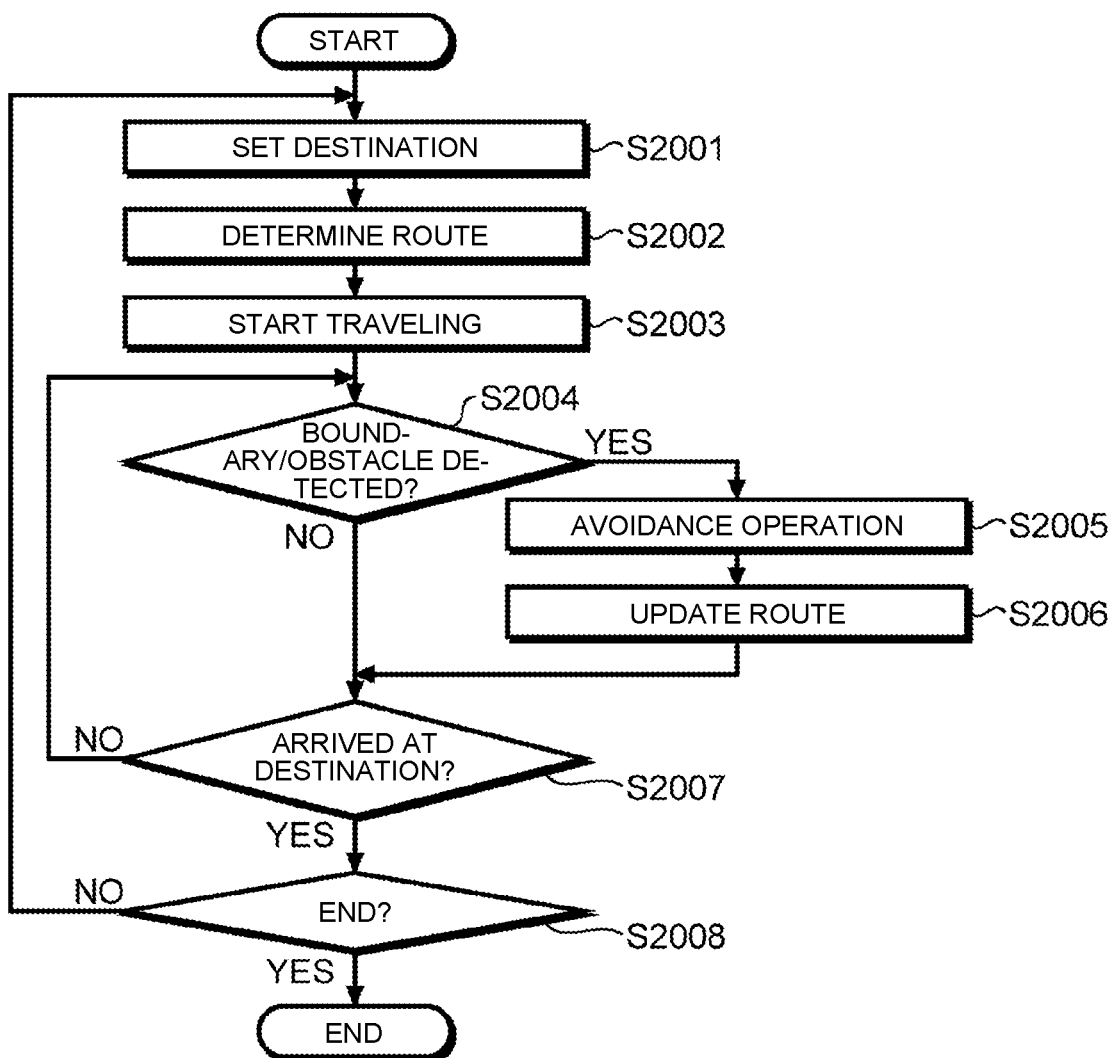
FIG. 45 is a flowchart illustrating an example of a main operation executed by an operation control unit according to the third embodiment.

FIG. 45 is a flowchart illustrating an example of a main operation executed by the operation control unit according to the present embodiment. As illustrated in FIG. 45, in the main operation, first, the operation control unit 260 sets, for example, a destination of the autonomous mobile body 10 (Step S2001). For example, the operation control unit 260 identifies a position of a face of the user on the basis of the image data acquired by the camera 515, a position of an object detected by the first obstacle sensor 1101, and the like, and sets a position on the table near the identified position of the face as the destination. After setting the destination, the operation control unit 260 determines a travel route to the destination set in Step S2001 (Step S2002). Note that, for example, a technique such as SLAM (including simplified SLAM) may be used for setting the destination and determining the travel route.

When the travel route to the destination is determined in this manner, the operation control unit 260 drives the motor 565 or the like to cause the autonomous mobile body 10 to start traveling along the travel route (Step S2003).

During traveling, the operation control unit 260 detects a boundary or an obstacle by monitoring, continuously or at a predetermined cycle, detection values from the first obstacle sensor 1101, the second obstacle sensors 1102 and 1103, and the first to fourth floor surface sensors 1111 to 1114 (Step S2004). When no boundary or obstacle is detected (NO in Step S2004), the operation control unit 260 proceeds to Step S2007. On the other hand, when a boundary or an obstacle is detected (YES in Step S2004), the operation control unit 260 executes the boundary avoidance operation or the obstacle avoidance operation (Step S2005). Furthermore, the operation control unit 260 recalculates the travel route to the destination to update the travel route to the destination (Step S2006), and proceeds to Step S2007.

In Step S2007, the operation control unit 260 determines whether or not the autonomous mobile body 10 has arrived at the destination. When the autonomous mobile body 10 has not arrived at the destination (NO in Step S2007), the operation control unit 260 returns to Step S2004 and repeats the subsequent operations until the autonomous mobile body 10 arrives at the destination. On the other hand, when the autonomous mobile body 10 has arrived at the destination (YES in Step S2007), the operation control unit 260 determines whether or not to end the present operation (Step S2008). To end the present operation (YES in Step S2008), the operation control unit 260 completes the present operation. On the other hand, to continue (NO in Step S2008), the operation control unit 260 returns to Step S2001 and executes subsequent operations.

3.3.2 Idling Prevention Operation

Figure 46:
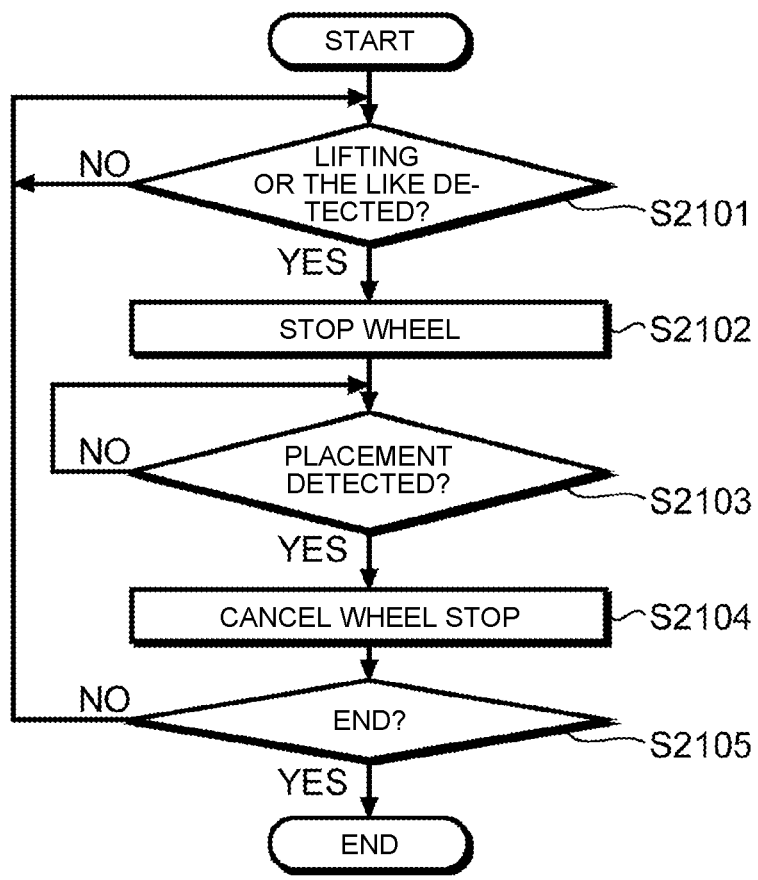
FIG. 46 is a flowchart illustrating an example of an idling prevention operation according to the third embodiment.

In addition, the operation control unit 260 executes the idling prevention operation separately from the main operation described with reference to FIG. 45. FIG. 46 is a flowchart illustrating an example of the idling prevention operation according to the present embodiment.

As illustrated in FIG. 46, in the present operation, the operation control unit 260 detects lifting, falling, or overturning of the autonomous mobile body 10 by monitoring, continuously or at a predetermined cycle, detection values from the proximity sensor 1121, the inertial sensor 525, the first to fourth floor surface sensors 1111 to 1114, and the torque sensor 1122 (Step S2101).

When lifting or the like of the autonomous mobile body 10 is detected (YES in Step S2101), the operation control unit 260 executes the operation to stop the rotation of the wheels 570 (Step S2102). Even in this state, the operation control unit 260 monitors, continuously or at a predetermined cycle, the detection values from the proximity sensor 1121, the inertial sensor 525, the first to fourth floor surface sensors 1111 to 1114, and the torque sensor 1122.

Thereafter, the operation control unit 260 detects that the autonomous mobile body 10 is placed on the floor surface or the table based on the detection values acquired from the proximity sensor 1121, the inertial sensor 525, the first to fourth floor surface sensors 1111 to 1114, and/or the torque sensor 1122 (Step S2103).

When the placement of the autonomous mobile body 10 on the floor surface or the like is detected (YES in Step S2103), the operation control unit 260 cancels stoppage of the wheels 570 (Step S2104). Accordingly, in order to return the autonomous mobile body 10 to a state ready for travel, the operation control unit 260 executes the operation described with reference to FIG. 45 from the beginning, for example, to determine the travel route to the destination and cause the autonomous mobile body 10 to travel to the destination.

Then, the operation control unit 260 determines whether or not to end the present operation (Step S2105). To end the present operation (YES in Step S2105), the operation control unit 260 completes the present operation. On the other hand, to continue (NO in Step S2105), the operation control unit 260 returns to Step S2101 and executes subsequent operations.

3.3.3 Mode Switching Operation

In addition, the operation control unit 260 executes a mode switching operation for switching between the normal operation mode and the standby mode separately from the main operation described with reference to FIG. 45. Note that the normal operation mode may be a mode executing an interactive operation with the user mainly including the main operation illustrated in FIG. 45, and the standby mode may be a mode in which the operation of the autonomous mobile body 10 is stopped to save power. Furthermore, in the present description, for the sake of simplicity, it is assumed that the normal operation mode is first executed when the autonomous mobile body 10 is activated.

Figure 47:
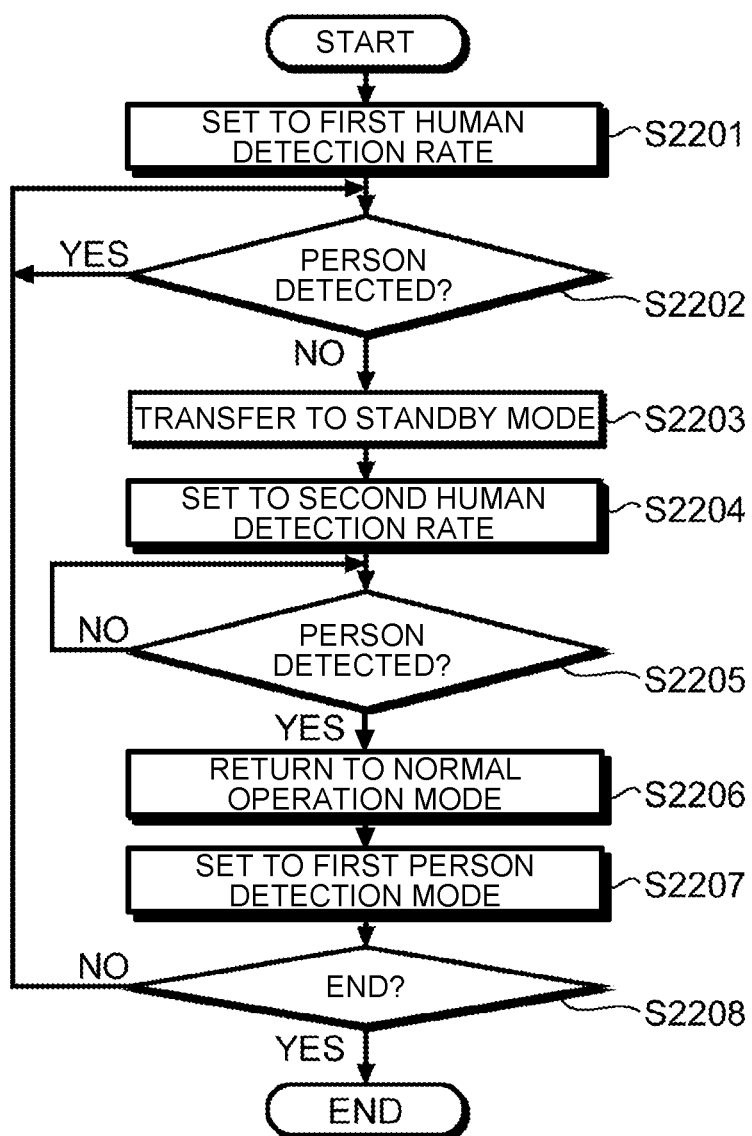
FIG. 47 is a flowchart illustrating an example of a mode switching operation according to the third embodiment.

FIG. 47 is a flowchart illustrating an example of the mode switching operation according to the present embodiment. As illustrated in FIG. 47, in the present operation, for example, the operation control unit 260 first sets the human detection rate for the human sensing operation using the first obstacle sensor 1101 to a first human detection rate (Step S2201), and executes the human sensing operation at the set first human detection rate (Step S2202). Note that the first human detection rate may be, for example, a rate necessary and sufficient for interactive communication with the user, such as once every 0.1 seconds or once every 1 second.

Then, for example, when a state in which no person is detected continues for a certain period of time or more (NO in Step S2202), the operation control unit 260 switches the operation mode of the autonomous mobile body 10 to the standby mode (Step S2203). Then, the operation control unit 260 sets the human detection rate for the human sensing operation using the first obstacle sensor 1101 to, for example, a second human detection rate lower than the first human detection rate (Step S2204), and executes the human sensing operation at the set second human detection rate (Step S2205). Note that the second human detection rate may be a rate lower than the first human detection rate, for example, once every 10 seconds, once per minute, or the like.

Next, when a person is detected (YES in Step S2205), the operation control unit 260 returns the operation mode of the autonomous mobile body 10 to the normal mode (Step S2206), and sets the human detection rate for the human sensing operation using the first obstacle sensor 1101 to the first human detection rate (Step S2207).

Then, the operation control unit 260 determines whether or not to end the present operation (Step S2208). To end the present operation (YES in Step S2208), the operation control unit 260 completes the present operation. On the other hand, to continue (NO in Step S2208), the operation control unit 260 returns to Step S2202 and executes subsequent operations.

3.3.4 Human Detection Rate Switching Operation

Figure 48:
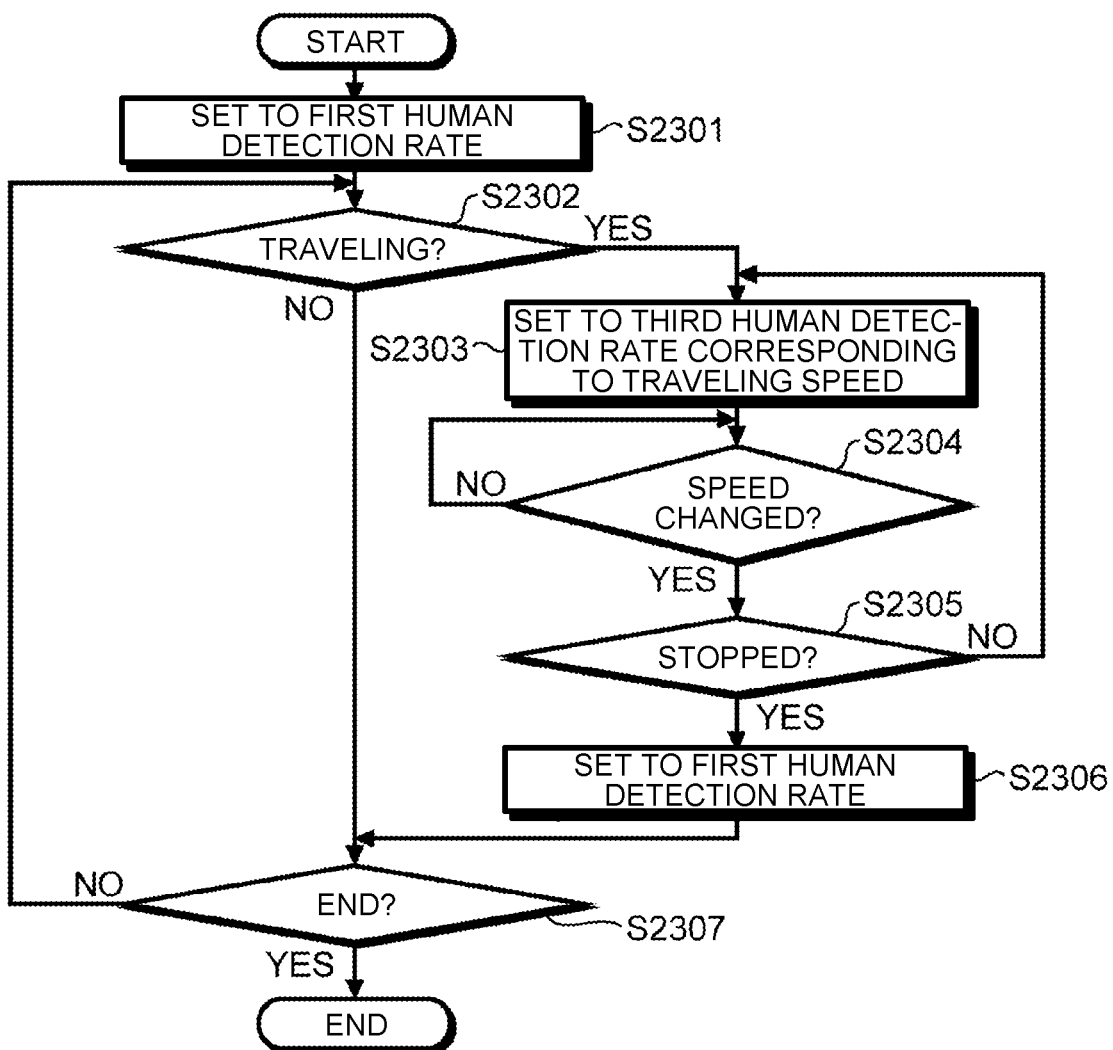
FIG. 48 is a flowchart illustrating an example of a human detection rate switching operation according to the third embodiment.

The human detection rate during the normal operation mode may be switched, for example, according to a traveling speed of the autonomous mobile body 10. FIG. 48 is a flowchart illustrating an example of the human detection rate switching operation according to the present embodiment.

As illustrated in FIG. 48, in the present operation, first, the operation control unit 260 sets the human detection rate to the first human detection rate in the normal operation mode immediately after the activation of the autonomous mobile body 10 (Step S2301). Step S2301 may be same as Step S2201 in FIG. 47.

Next, the operation control unit 260 determines whether the autonomous mobile body 10 is traveling or stopping, for example, based on a detection value from the torque sensor 1122 (Step S2302). When the autonomous mobile body 10 is currently stopped (NO in Step S2302), the operation control unit 260 proceeds to Step S2307.

On the other hand, when the autonomous mobile body 10 is traveling (YES in Step S2302), the operation control unit 260 sets a third human detection rate according to the traveling speed of the autonomous mobile body 10 (Step S2303). For example, when the autonomous mobile body 10 has a function of changing the traveling speed in four stages, different third human detection rates may be set in advance for the respective stages. In this case, the higher the traveling speed, the higher the third human detection rate may be set.

Subsequently, the operation control unit 260 detects the traveling speed of the autonomous mobile body 10 on the basis of, for example, a detection value from the torque sensor 1122, and monitors whether or not there is a change in the traveling speed (Step S2304). When there is a change in the traveling speed (YES in Step S2304), the operation control unit 260 determines whether the autonomous mobile body 10 has stopped (Step S2305), and when not stopped (NO in Step S2305), the process returns to Step S2303 to set the third human detection rate according to the changed traveling speed. On the other hand, when the autonomous mobile body 10 is stopped (YES in Step S2305), the operation control unit 260 sets the first human detection rate (Step S2306), and proceeds to Step S2307.

In Step S2307, the operation control unit 260 determines whether or not to end the present operation. To end the present operation (YES in Step S2307), the operation control unit 260 completes the present operation. On the other hand, to continue (NO in Step S2307), the operation control unit 260 returns to Step S2302 and executes subsequent operations.

3.3.5 Mapping Operation

Furthermore, the autonomous mobile body 10 according to the present embodiment may execute an operation of creating a map on which obstacles, boundaries, and the like present around the autonomous mobile body 10 are mapped (mapping operation) on the basis of detection results from the first obstacle sensor 1101, the second obstacle sensors 1102 and 1103, the first to fourth floor surface sensors 1111 to 1114, and the like.

Figure 49:
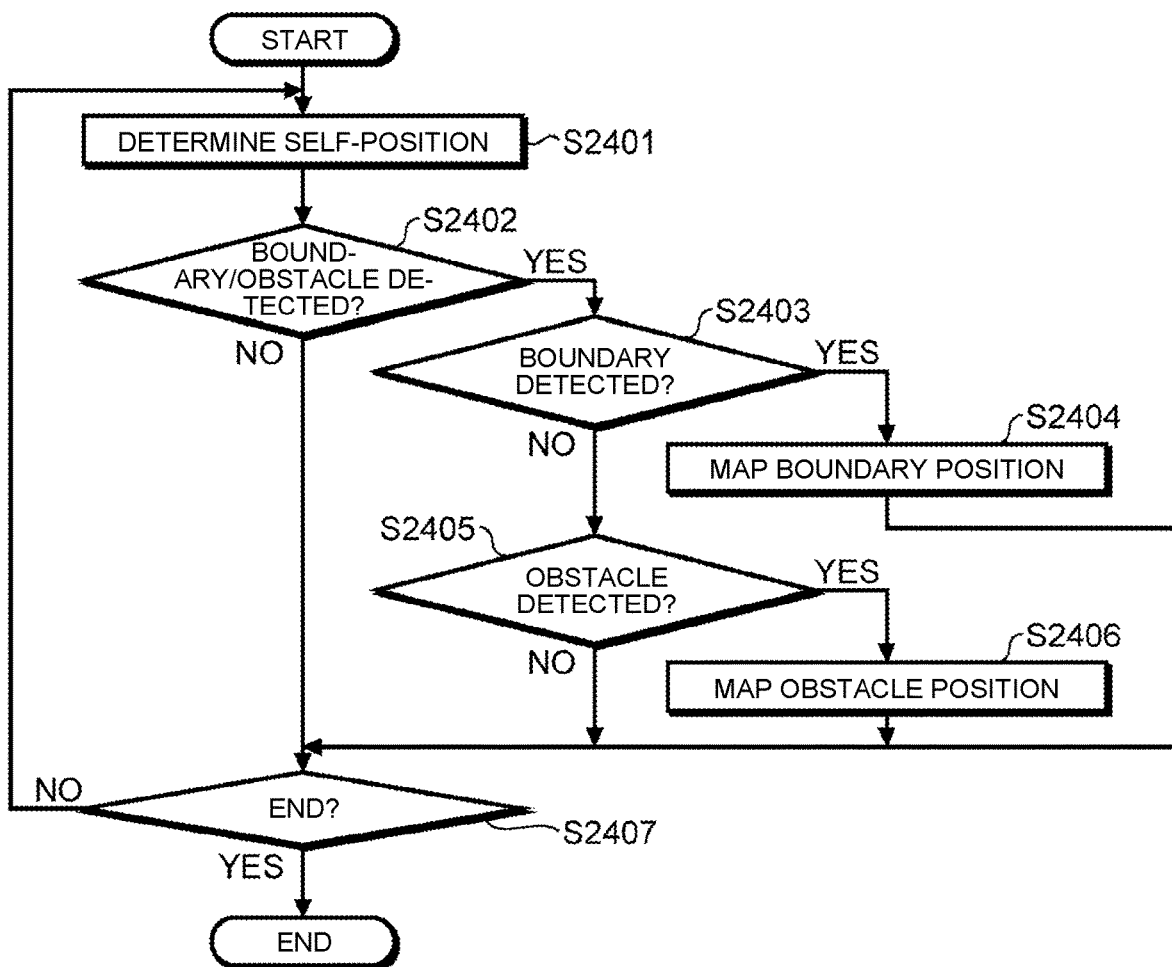
FIG. 49 is a flowchart illustrating an example of a mapping operation according to the third embodiment.

FIG. 49 is a flowchart illustrating an example of the mapping operation according to the present embodiment. As illustrated in FIG. 49, in the present operation, the operation control unit 260 first determines a position (hereinafter, referred to as a self-position) of the autonomous mobile body 10 (Step S2401). The self-position may be, for example, a position on a two-dimensional map in which a position of the autonomous mobile body 10 at the time of activation or a position at which the autonomous mobile body 10 first stops after activation is set as a start point (origin) and a direction of the autonomous mobile body 10 at that time is set as the X-axis direction.

Note that the coordinates on the two-dimensional map of the position of the autonomous mobile body 10 (self-position) with respect to the origin may be determined by using various methods such as coordinates obtained from a moving distance and a direction of the autonomous mobile body 10 detected by an encoder (or a potentiometer) provided on the axle of the wheel 570, coordinates obtained from inertia generated in the autonomous mobile body 10 detected by the inertial sensor 525, coordinates obtained from a relative position with respect to a mark (feature point) in image data acquired by the camera 515, coordinates obtained from a relative position with respect to an obstacle detected by the first obstacle sensor 1101 and the second obstacle sensors 1102 and 1103, coordinates obtained from a relative position with respect to a boundary detected by the first to fourth floor surface sensors 1111 to 1114, and coordinates obtained based on at least one of these.

Next, the operation control unit 260 detects the boundary or the obstacle by monitoring, continuously or at a predetermined cycle, detection values from the first obstacle sensor 1101, the second obstacle sensors 1102 and 1103, and the first to fourth floor surface sensors 1111 to 1114 (Step S2402). When no boundary or obstacle is detected (NO in Step S2402), the operation control unit 260 proceeds to Step S2407.

On the other hand, when the boundary or the obstacle is detected (YES in Step S2402), the operation control unit 260 determines whether the detected item is a boundary (Step S2403). When the boundary is detected (YES in Step S2403), the operation control unit 260 arranges the position of the detected boundary on the two-dimensional map (Step S2404), and proceeds to Step S2407.

When the detected object is not a boundary (NO in Step S2403), the operation control unit 260 determines whether or not the detected object is an obstacle (Step S2405). When the obstacle is detected (YES in Step S2405), the operation control unit 260 arranges the position of the detected obstacle on the two-dimensional map (Step S2406), and proceeds to Step S2407. When the detected object is neither a boundary nor an obstacle (NO in Step S2405), the operation control unit 260 proceeds directly to Step S2407.

In Step S2407, the operation control unit 260 determines whether or not to end the present operation. To end the present operation (YES in Step S2407), the operation control unit 260 completes the present operation. On the other hand, to continue (NO in Step S2407), the operation control unit 260 returns to Step S2401 and executes subsequent operations.

By executing the above operation, a two-dimensional map in which boundaries and obstacles are arranged is created. Note that the data of the two-dimensional map may be stored in, for example, the RAM 873 or the storage 880 provided in the autonomous mobile body 10, or may be stored in the removable recording medium 901 (see FIG. 31).

3.4 Summary

As described above, according to the third embodiment of the present disclosure, it is possible to detect the obstacle using a plurality of sensors (first obstacle sensor 1101, second obstacle sensors 1102 and 1103) of different types. Accordingly, it is possible to more reliably detect and avoid the obstacle.

Furthermore, according to the present embodiment, since the position of the boundary around the autonomous mobile body 10 can be detected using the plurality of sensors (the first to fourth floor surface sensors 1111 to 1114) arranged along the outer periphery of the autonomous mobile body 10, it is possible to more reliably prevent the autonomous mobile body 10 from falling or colliding. In this case, by detecting the position of the boundary using both the absolute value of the value acquired by the sensor and the change amount, it is possible to enhance robustness with respect to distance measurement and detection accuracy with respect to the boundary.

Furthermore, according to the present embodiment, since it is possible to detect lifting, falling, and overturning of the autonomous mobile body 10 using a plurality of sensors (proximity sensor 1121, torque sensor 1122, inertial sensor 525, and first to fourth floor surface sensors 1111 to 1114) of different types, it is possible to more reliably prevent the wheels 570 from idling.

By obtaining the above effects, the autonomous mobile body 10 according to the present embodiment can smoothly move according to the situation. Thus, more natural and effective communication with the user can be realized.

Other configurations, operations, and effects may be similar to those of the above-described embodiment, and thus detailed description thereof is omitted here.

4. Fourth Embodiment

Next, a fourth embodiment of the present disclosure will be described in detail below with reference to the drawings. In the following description, configurations and operations similar to those of the above-described embodiment are cited to omit redundant description thereof.

The second embodiment described above gives the example that the autonomous mobile body 10 is stopped in the seated state by housing the wheels 570 inside the main body of the autonomous mobile body 10 when stopped and the bottom of the main body comes into contact with the floor surface. On the other hand, the present embodiment describes an example that the autonomous mobile body 10 is stopped in the seated state without housing the wheels 570 inside the main body of the autonomous mobile body 10.

Note that the configuration of the autonomous mobile body according to the present embodiment may be similar to the configuration described with reference to FIGS. 1, 2, 3, 4, 5, 6, 7, 8, 9, 10, 11, 12, 13A and FIG. 13B in the first embodiment described above, and thus a detailed description thereof will be omitted here. In the present embodiment, a case where the functional configuration example described with reference to FIG. 32 in the above-described second embodiment is adopted as the functional configuration of the autonomous mobile body. However, the present embodiment is not limited thereto, and for example, the information processing system described with reference to FIG. 14 to FIG. 16 in the above-described first embodiment can also be adopted.

4.1 Configuration Example of Autonomous Mobile Body

Figure 50:
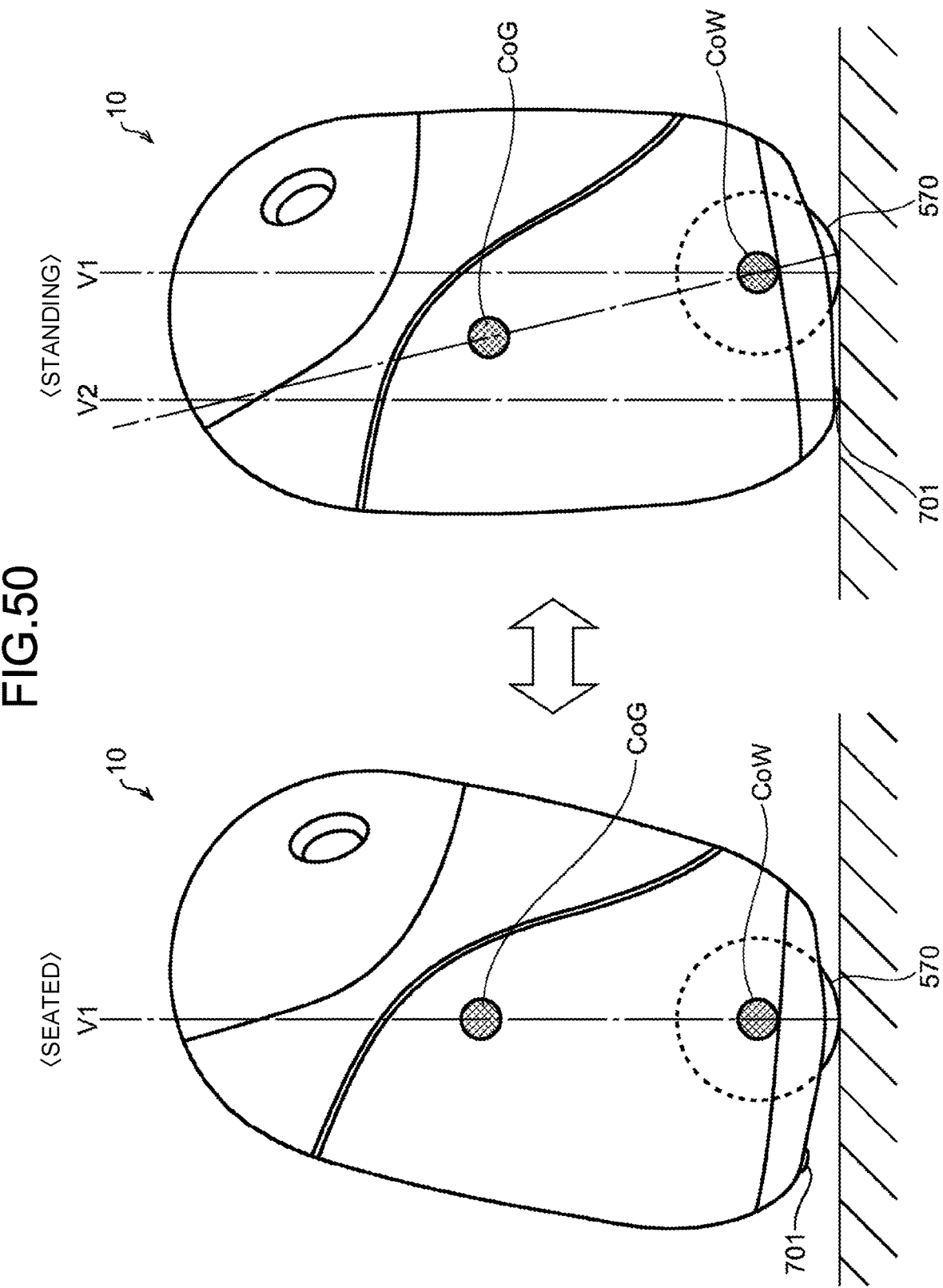
FIG. 50 is a diagram illustrating a schematic configuration example of an autonomous mobile body according to a fourth embodiment.
Figure 51:
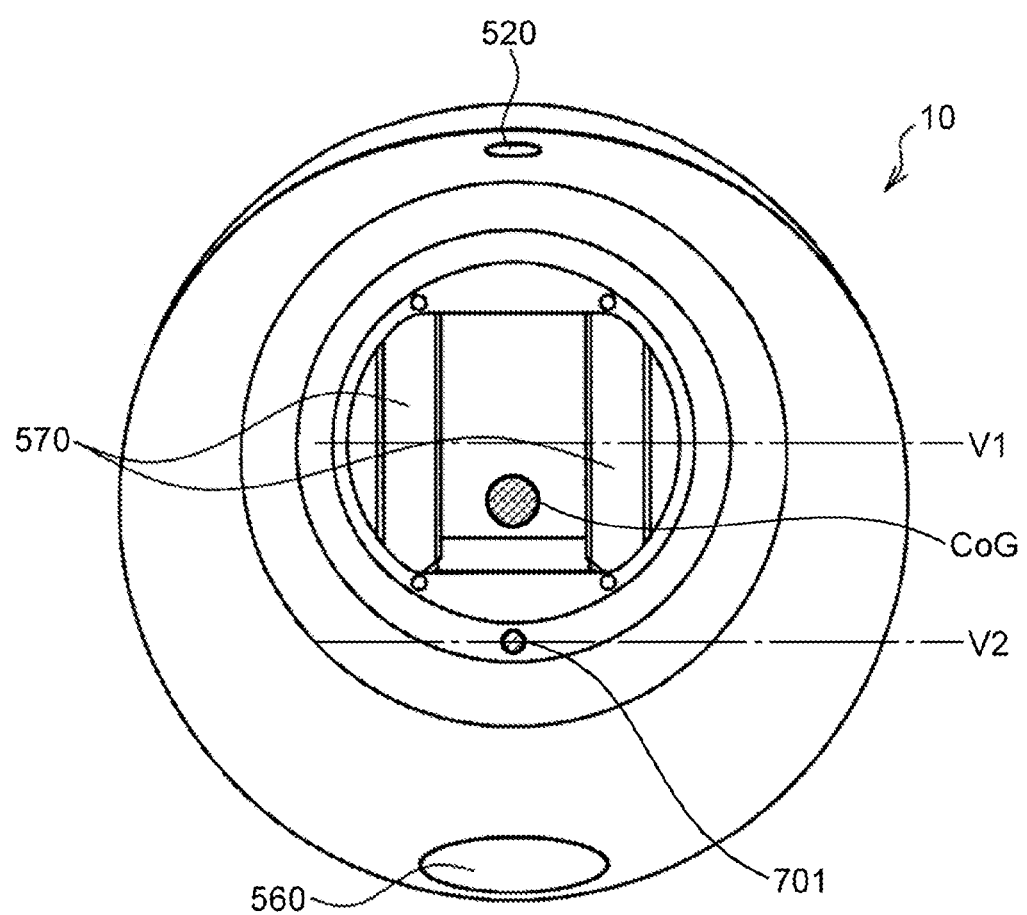
FIG. 51 is a bottom view of the autonomous mobile body according to the fourth embodiment.

FIG. 50 is a diagram illustrating a schematic configuration example of an autonomous mobile body according to the present embodiment. A left diagram in FIG. 50 is a side view illustrating a posture of the autonomous mobile body 10 in the standing state (including when stopped and during traveling), and a right diagram is a side view illustrating the posture of the autonomous mobile body 10 in the seated state. FIG. 51 is a bottom view of the autonomous mobile body according to the present embodiment.

As illustrated in the right diagram in FIG. 50, in the present embodiment, when the autonomous mobile body 10 stops in the seated state, a part of the bottom comes into contact with the floor surface. As a result, at least three points that are the two wheels 570 and the bottom touching the ground come into contact with the floor surface. Since the autonomous mobile body 10 is in a three-point inverted state, the autonomous mobile body 10 can be stably stopped in the seated state. In addition, since the feedback control for stopping the autonomous mobile body 10 in the inverted state is not necessary, it is also possible to reduce power consumption of the autonomous mobile body 10.

A portion to be brought into contact with the floor surface in the seated state may be a portion at the bottom of the autonomous mobile body 10 on a back side of the axle of the wheels 570. As illustrated in FIG. 50 and FIG. 51, a protrusion 701 may be provided on a portion touching the ground. By providing the protrusion 701 on the portion touching the ground, it is possible to prevent a damage to the bottom surface of the autonomous mobile body 10, peeling of coating, and the like.

A shape of the protrusion 701 may be various shapes such as a dome shape and a cylindrical shape. In addition, a height of the protrusion 701 may be, for example, a height sufficient or more for avoiding the other bottom portion of the autonomous mobile body 10 from touching a flat floor surface when the autonomous mobile body 10 is in the seated state.

Figure 52:
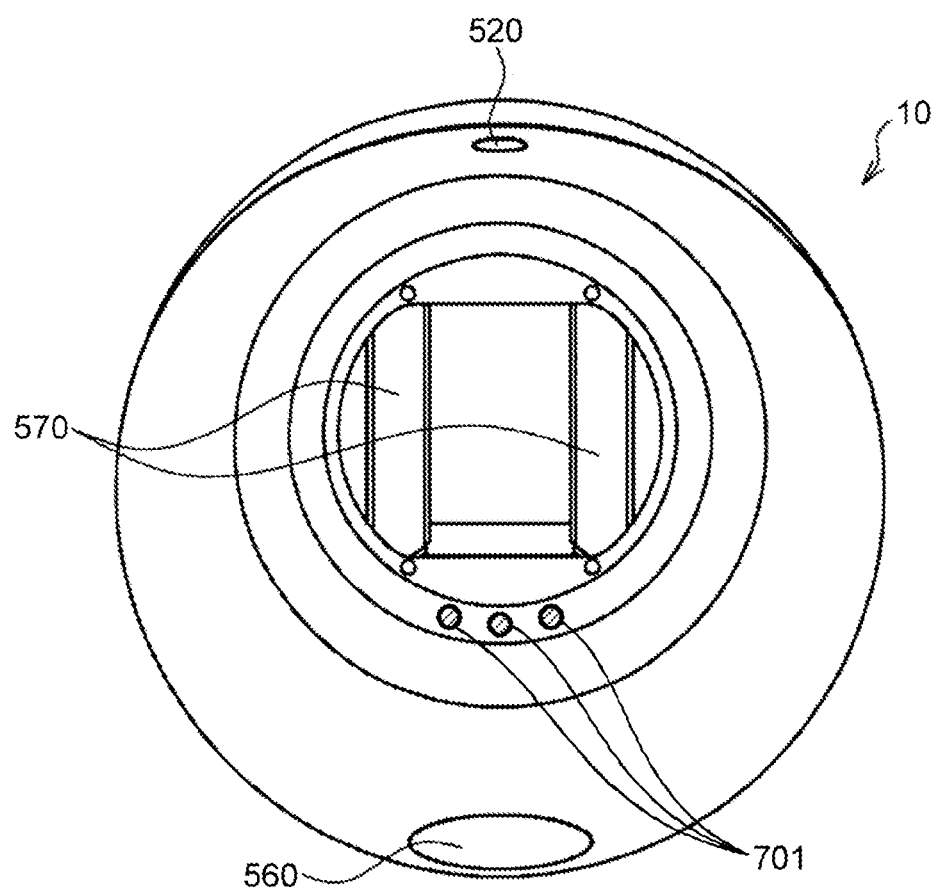
FIG. 52 is a bottom view of an autonomous mobile body according to a modification of the fourth embodiment.

Furthermore, the number of the protrusions 701 is not limited to one, and may be, for example, two or more (three in FIG. 52) as illustrated in FIG. 52.

A material of the protrusion 701 may be various materials such as metal, plastic, and ceramics that can be used in consideration of ease of processing, durability, and the like. A material with a low friction coefficient is preferably selected. By forming the protrusion 701 using a material with a low friction coefficient, it is possible to suppress overturn of the autonomous mobile body 10 due to unintended contact during traveling, overturn of the autonomous mobile body 10 due to contact of the protrusion 701 with the floor surface before the autonomous mobile body 10 completely stops, a flaw on the floor surface, generation of abnormal noise, or the like.

Figure 53:
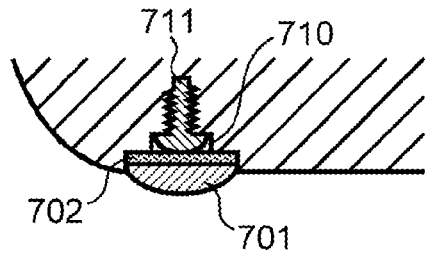
FIG. 53 is a sectional view illustrating an example of a structure near a protrusion according to the fourth embodiment.

In addition, as illustrated in FIG. 53, for example, the protrusion 701 may be provided so as to close a screw hole 710 for fixing a member constituting the bottom of the autonomous mobile body 10 to a frame or the like inside the body with a screw 711. As a result, it is possible to hide the screw hole 710 by the protrusion 701, thereby suppressing a decrease in appearance design of the autonomous mobile body 10. Note that, for example, a double-sided adhesive tape, an adhesive, or the like may be used for fixing the protrusion 701 onto the bottom.

4.2 Posture Control Example

Next, posture control when stopped and during movement of the autonomous mobile body 10 according to the present embodiment will be described.

Similarly to the above-described embodiments, the center of gravity CoG of the autonomous mobile body 10 is located above the axle of the wheels 570 when the autonomous mobile body 10 is in the forward inclination posture (standing state). (See the left diagram in FIG. 50.) As a result, the autonomous mobile body 10 is balanced to maintain the inverted state.

On the other hand, in the seated state, as illustrated in the right diagram in FIG. 50 and FIG. 51, at least three points that are the two wheels 570 and the bottom (protrusion 701) are brought into contact with the floor surface by tilting the autonomous mobile body 10 backward. At this point, the center of gravity CoG of the autonomous mobile body 10 is located between a perpendicular line V1 passing through the axle of the wheels 570 and a perpendicular line V2 passing through a contact portion between the bottom (protrusion 701) and the floor surface.

When the center of gravity CoG of the autonomous mobile body 10 is located between the perpendicular line V1 passing through the axle of the wheels 570 and the perpendicular line V2 passing through the contact portion between the bottom (protrusion 701) and the floor surface in the seated state, the autonomous mobile body 10 in the seated state can be stably stopped.

4.3 Example of Posture Control Flow

Figure 54:
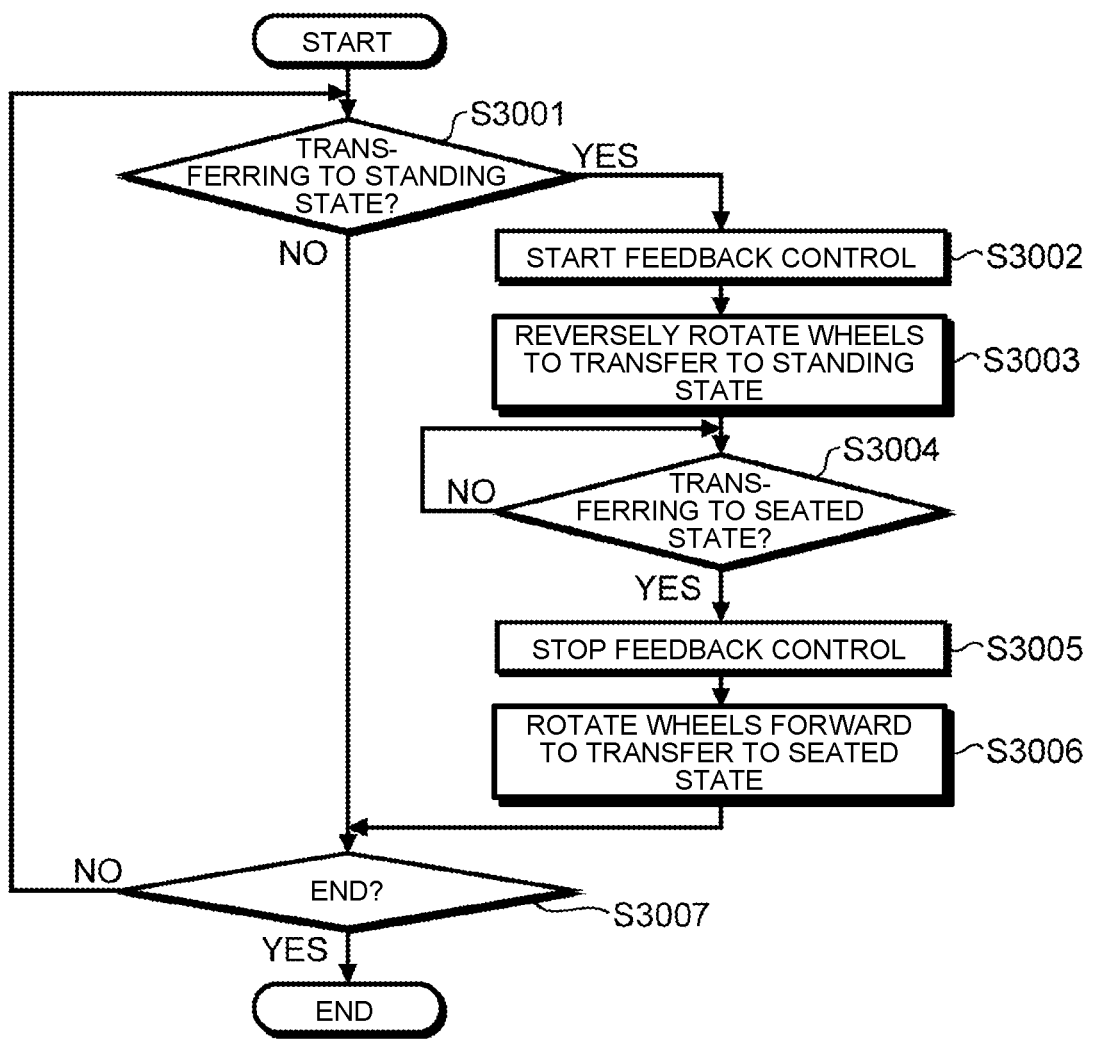
FIG. 54 is a flowchart illustrating an example of a posture control flow at a time of switching between stop and movement according to the fourth embodiment.

Next, the posture control at the time of switching between stop and movement of the autonomous mobile body 10 according to the present embodiment will be described. FIG. 54 is a flowchart illustrating an example of the posture control flow at the time of switching between the stop and movement according to the present embodiment.

As illustrated in FIG. 54, in the present operation, the operation control unit 260 determines whether or not to transfer the autonomous mobile body 10 to the standing state (Step S3001). For example, when switching from the standby mode to the normal operation mode or starting traveling in the seated state, the operation control unit 260 may determine that the autonomous mobile body 10 will be transferred to the standing state.

When not transferring to the standing state (NO in Step S3001), the operation control unit 260 proceeds to Step S3007. On the other hand, when transferring to the standing state (YES in Step S3001), the operation control unit 260 starts the feedback control for maintaining the inverted state (standing state) of the autonomous mobile body 10 (Step S3002). Then, the operation control unit 260 reversely rotates the wheels 570 to transfer from the seated state to the standing state (Step S3003). Note that the reverse rotation may be a rotating direction of the wheels 570 to move the autonomous mobile body 10 backward.

After the autonomous mobile body 10 is set to the standing state in this manner, the operation control unit 260 then determines whether or not to transfer the autonomous mobile body 10 to the seated state (Step S3004), and stops the feedback control (Step S3005) when transferring to the seated state (YES in Step S3004). Then, in order to transfer from the standing state to the seated state, the operation control unit 260 rotates the wheels 570 forward (Step S3006) to cause the bottom (protrusion 701) to touch the floor surface, and proceeds to Step S3007. The forward rotation may be a rotating direction of the wheels 570 to move the autonomous mobile body 10 forward. Furthermore, whether or not to transfer the autonomous mobile body 10 to the seated state may be determined on the basis of, for example, continuation of stoppage for a certain period of time or switching to the standby mode.

In Step S3007, the operation control unit 260 determines whether or not to end the present operation. To end the present operation (YES in Step S3007), the operation control unit 260 completes the present operation. On the other hand, to continue (NO in Step S3007), the operation control unit 260 returns to Step S3001 and executes subsequent operations.

4.4 Summary

As described above, according to the fourth embodiment of the present disclosure, since the autonomous mobile body 10 can be supported by at least three points that are the two wheels 570 and the bottom in the seated state, the autonomous mobile body 10 can be stably stopped in the seated state. In addition, since the feedback control for stopping the autonomous mobile body 10 in the inverted state is not necessary, it is also possible to reduce power consumption of the autonomous mobile body 10.

Furthermore, according to the present embodiment, since it is possible to retain the autonomous mobile body 10 in the seated state without providing a mechanism for housing and projecting the wheels 570 in the body of the autonomous mobile body 10, it is also possible to simplify or downsize the configuration of the autonomous mobile body 10, reduce power consumption, and the like.

Furthermore, according to the present embodiment, since the protrusion 701 is provided on the bottom in contact with the floor surface in the seated state, it is possible to prevent damage to the bottom surface of the autonomous mobile body 10, peeling of coating, or the like. In this case, by forming the protrusion 701 using the material with a low friction coefficient, it is possible to suppress overturn of the autonomous mobile body 10 due to an unintended contact during traveling, overturn of the autonomous mobile body 10 due to contact of the protrusion 701 with the floor surface before the autonomous mobile body 10 completely stops, a flaw on the floor surface, generation of abnormal noise, or the like.

By obtaining the above effects, the autonomous mobile body 10 according to the present embodiment can smoothly move according to the situation. Thus, more natural and effective communication with the user can be realized.

Other configurations, operations, and effects may be similar to those of the above-described embodiment, and thus detailed description thereof is omitted here.

5. Fifth Embodiment

Next, a fifth embodiment of the present disclosure will be described in detail below with reference to the drawings. In the following description, configurations and operations similar to those of the above-described embodiment are cited to omit redundant description thereof.

5.1 Overview

Figure 55:
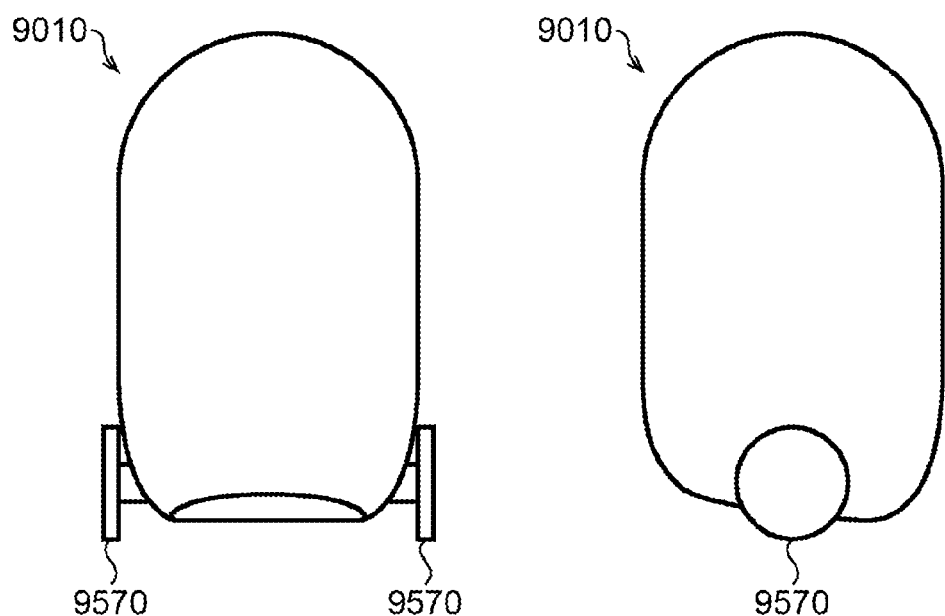
FIG. 55 is a diagram illustrating an example of an inverted pendulum.
Figure 56:
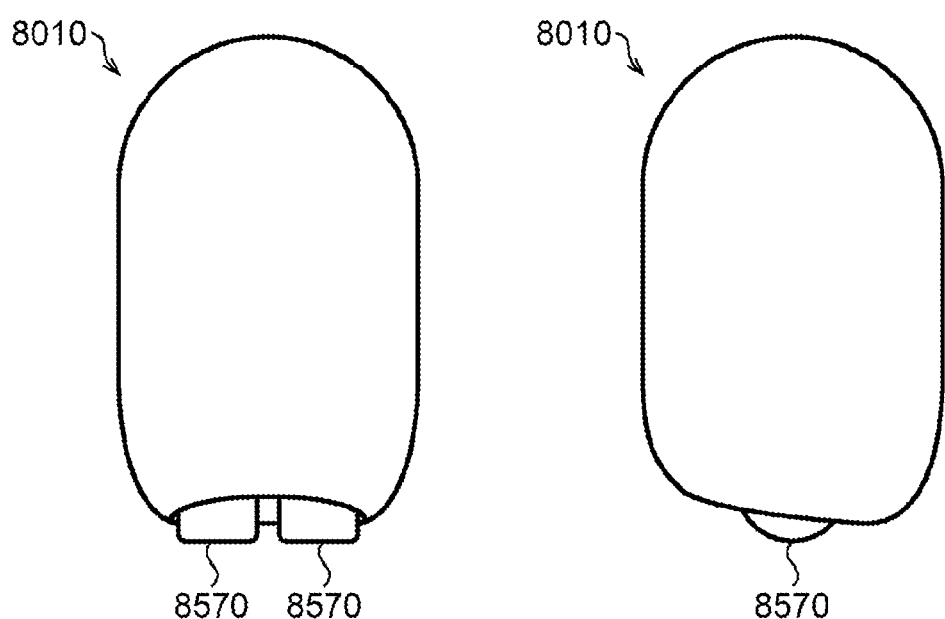
FIG. 56 is a diagram illustrating an example of another inverted pendulum.

FIG. 55 illustrates an example of an inverted pendulum related to the present disclosure, where a left diagram is a front view of the inverted pendulum, and a right diagram is a side view of the inverted pendulum. FIG. 56 illustrates an example of another inverted pendulum related to the present disclosure. A left diagram is a front view of the inverted pendulum, and a right diagram is a side view of the inverted pendulum.

Normally, in a two-wheel inverted pendulum, resistance to overturn to a side surface increases when a distance between two wheels is increased. Therefore, as illustrated in an inverted pendulum 9010 in FIG. 55, it is preferable to arrange two wheels 9570 outside the main body.

However, when the distance between the two wheels 9570 is increased, dragging of the wheels 9570 occur due to a difference in turning radius between the outer and inner wheels 9570 at the time of turning. When such dragging of the wheels 9570 occurs, controllability and stability at the time of turning change depending on a friction between the wheels 9570 and a columnar surface. Therefore, in consideration of the controllability and stability at the time of turning, it is preferable to decrease the distance between the two wheels 9570 to reduce the dragging.

In addition, when the two wheels 9570 are arranged outside the main body, the wheels 9570 stand out more than necessary. This greatly limits design of the inverted pendulum 9010.

Further, in an autonomous mobile body such as a mobile robot using the inverted pendulum 9010, stability of oblique movement on a step or a slope can be improved by installing a mechanism for controlling a height of the wheels 9570. However, in a case where the distance between the wheels 9570 is wide, an inclination amount of the main body with respect to a height difference between left and right wheels 9570 is small, and thus an angle of the slope that the autonomous mobile body can travel will be limited.

Such problems can be suppressed by narrowing the distance between the two wheels 8570 and accommodating most of the two wheels 8570 in the main body as in an inverted pendulum 8010 illustrated in FIG. 56.

On the other hand, when the inverted pendulum turns, the rotation angle of the wheel changes depending on the turning radius with respect to the turning center. Therefore, in the width direction in the same wheel, there is a portion where a moving amount due to the rotation angle of the wheel does not match an actual moving distance. For example, the rotation angle of the wheel is the same between the inner side and the outer side of the wheel, but a difference occurs in the actual moving distance.

Such difference increases as the width of one wheel increases. In general, however, it is considered that the difference can be offset by sliding a part or the whole of the wheel with respect to the floor surface during turning.

However, sliding between the floor surface and the wheel changes depending on a friction coefficient between the floor surface and the wheel, a floor surface condition, and the like. When the sliding condition changes during turning of the inverted pendulum, the stability of the inverted state decreases or the turning radius changes. Thus, stable turning with a constant radius cannot be achieved.

Therefore, the present embodiment provides the autonomous mobile body capable of improving controllability and stability at turning while suppressing deterioration in appearance design.

Note that the configuration of the autonomous mobile body according to the present embodiment may be similar to the configuration described with reference to FIGS. 1, 2, 3, 4, 5, 6, 7, 8, 9, 10, 11, 12, 13A and FIG. 13B in the first embodiment described above, and thus a detailed description thereof will be omitted here. In the present embodiment, a case where the functional configuration example described with reference to FIG. 32 in the above-described second embodiment is adopted as the functional configuration of the autonomous mobile body. However, the present embodiment is not limited thereto, and for example, the information processing system described with reference to FIG. 14 to FIG. 16 in the above-described first embodiment can also be adopted.

5.2 Configuration Example of Autonomous Mobile Body (Underbody)

Next, a schematic configuration focusing on an underbody including the wheels of the autonomous mobile body 10 according to the present embodiment will be described with some examples.

5.2.1 First Example

Figure 57:
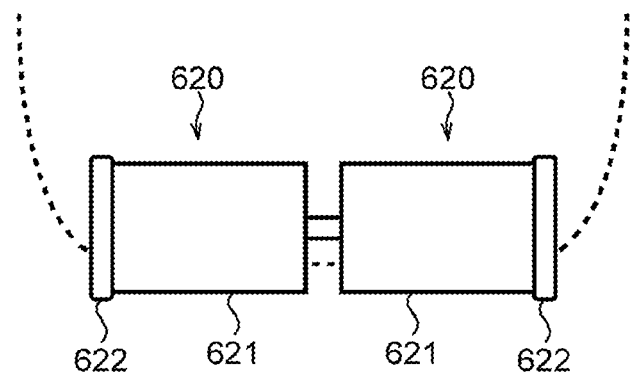
FIG. 57 is a schematic diagram illustrating a schematic configuration example of a wheel in an autonomous mobile body according to a first example in a fifth embodiment.

FIG. 57 is a schematic diagram illustrating a schematic configuration example of the wheels in the autonomous mobile body according to a first example of the present embodiment. As illustrated in FIG. 57, the wheels 620 according to the first example have a structure provided with an annular protruding ring portion 622 around a columnar surface 621.

As described above, with the structure in which the protruding ring portion 622 is provided on a part of the columnar surface 621, it is possible to limit a contact area between the floor surface and the wheel 620 to a top surface portion of the protruding ring portion 622. Therefore, it is possible to reduce the difference in the moving distance at turning in the width direction of the wheel 620, thereby reducing sliding of the wheel 620. As a result, it is possible to reduce a change in a sliding load during the turning due to a change in the floor surface condition. Thus, it is possible to improve the controllability and stability of the autonomous mobile body 10 during turning.

Figure 58:
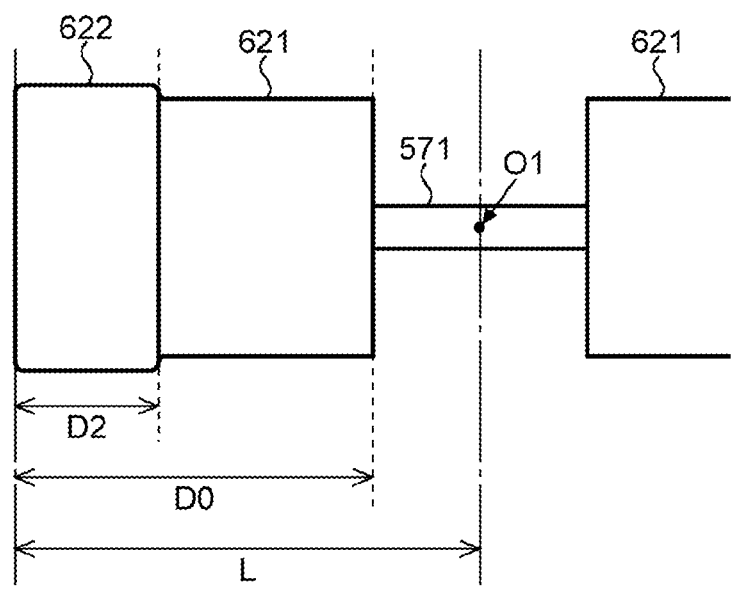
FIG. 58 is a diagram illustrating a dimensional example of a wheel in the autonomous mobile body according to the first example in the fifth embodiment.

As illustrated in FIG. 58, by making a width D2 of the top surface of the protruding ring portion 622 narrower than a width D0 of the wheel 620, it is possible to gain an effect of improving the controllability and stability at turning as described above. In this case, for example, when the width D0 of one wheel 620 is set to a width of ¼ or more of a total width 2L of the two wheels 620, it is possible to more reliably gain the effect of improving the controllability and stability at turning by setting the width D2 of the top surface of the protruding ring portion 622 to 60% or less of the width D0 of the wheel 620. Alternatively, by setting the width D2 of the top surface of the protruding ring portion 622 with respect to a distance L from a center O1 of an axle 571 to outside of the wheel 620 to 40% or less, it is possible to more reliably gain the effect of improving the controllability and stability at turning.

Figure 59:
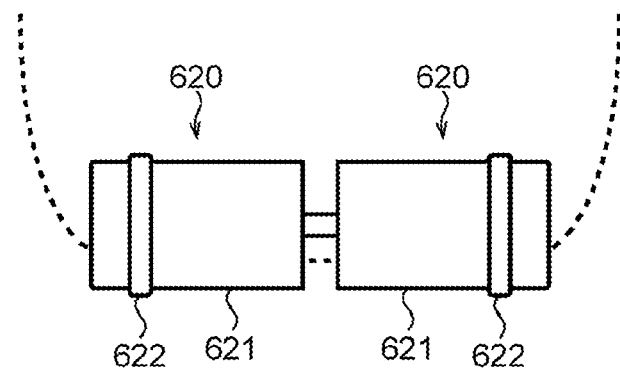
FIG. 59 is a schematic diagram illustrating another schematic configuration example of the wheel in the autonomous mobile body according to the first example in the fifth embodiment.

In addition, as illustrated in FIG. 57, by setting a position of the protruding ring portion 622 to an outermost position of the wheel 620 in the width direction of the wheel 620, an entire width of the contact area that supports the autonomous mobile body 10 can be broadened, so that the stability of the autonomous mobile body 10 in the left-right direction can be improved. However, the position of the protruding ring portion 622 is not limited to the outermost position of the wheel 620, and may be at a position in a middle in the width direction of the wheel 620 as illustrated in FIG. 59.

Figure 60:
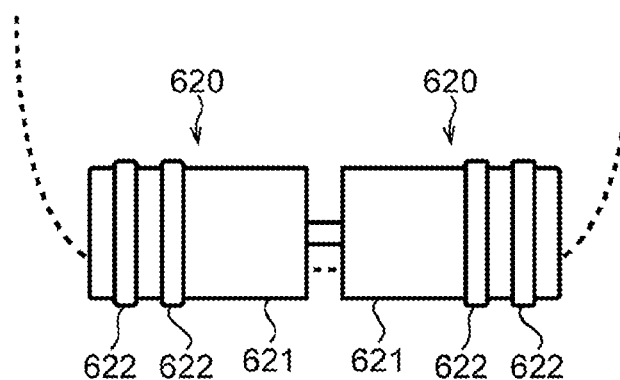
FIG. 60 is a schematic diagram illustrating still another schematic configuration example of the wheel in the autonomous mobile body according to the first example in the fifth embodiment.

Furthermore, as illustrated in FIG. 60, the number of protruding ring portions 622 provided on one wheel 620 is not limited to one, and may be two or more.

5.2.2 Second Example

Figure 61:
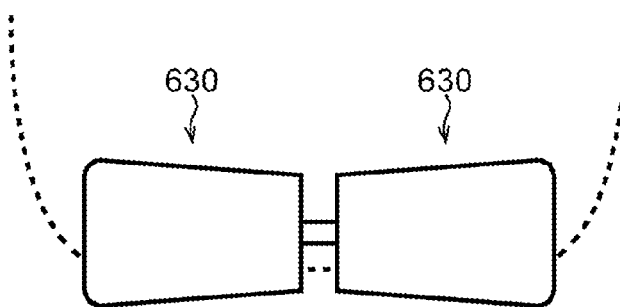
FIG. 61 is a schematic diagram illustrating a schematic configuration example of a wheel in an autonomous mobile body according to a second example in the fifth embodiment.

FIG. 61 is a schematic diagram illustrating a schematic configuration example of the wheels in the autonomous mobile body according to a second example of the present embodiment. As illustrated in FIG. 61, a wheel 630 according to the second example may have a tapered shape whose diameter increases from the inside to the outside.

In this way, by making an outer diameter on the outer side larger than an outer diameter on the inner side of a wide wheel 630 to incline the columnar surface of the wheel 630, the contact area with the floor surface can be limited to a partial area in the width direction of the wheel 630. Thus, similarly to the first example, the controllability and stability at turning of the autonomous mobile body 10 can be improved.

5.2.3 Third Example

Figure 62:
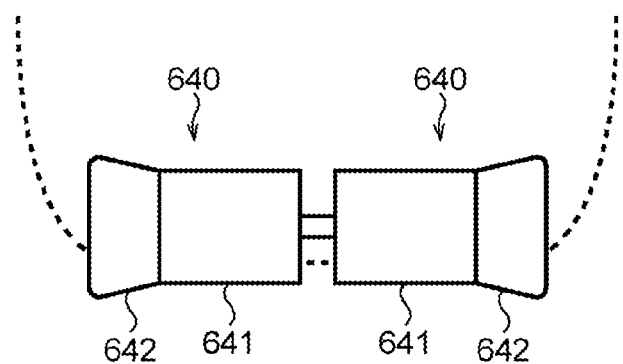
FIG. 62 is a schematic diagram illustrating a schematic configuration example of a wheel in an autonomous mobile body according to a third example in the fifth embodiment.

FIG. 62 is a schematic diagram illustrating a schematic configuration example of a wheel in an autonomous mobile body according to a third example of the present embodiment. As illustrated in FIG. 62, a wheel 640 according to the third example is provided with a tapered shape whose diameter increases from the inside to the outside in an outer portion 642 of a columnar surface 641.

As described above, by tapering the outer portion 642 of the wide wheel 640, similarly to the second example, the contact area with the floor surface can be limited to a partial area in the width direction of the wheel 630, so that the controllability and stability at turning of the autonomous mobile body 10 can be improved.

5.2.4 Fourth Example

Figure 63:
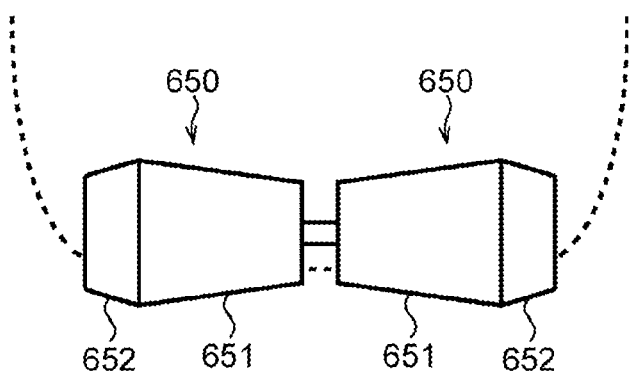
FIG. 63 is a schematic diagram illustrating a schematic configuration example of a wheel in an autonomous mobile body according to a fourth example in the fifth embodiment.

FIG. 63 is a schematic diagram illustrating a schematic configuration example of a wheel in an autonomous mobile body according to a fourth example of the present embodiment. As illustrated in FIG. 63, a wheel 650 according to the fourth example, similarly to the second example, has the tapered shape in which an outer diameter on the outer side is larger than an outer diameter on the inner side of the wide wheel 650, and an outer portion 652 of a columnar surface 651 is reversely tapered whose diameter decreases from the inner side to the outer side.

As described above, by forming the outer portion 652 of the tapered wheel 650 into the reverse tapered shape, the contact area of the outer wheel 650 to which a large load is applied at turning can be increased by using deformation of the wheel 570 due to the load. Thus, the stability of the autonomous mobile body 10 at turning can be further improved.

5.2.5 Fifth Example

Figure 64:
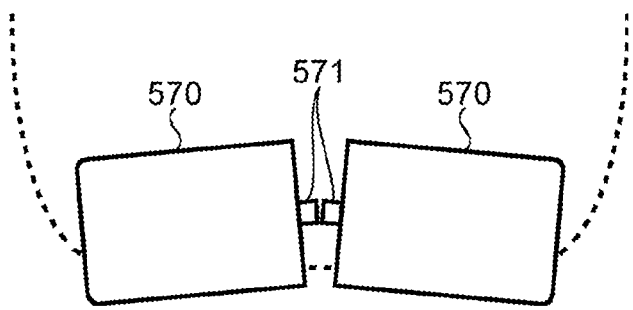
FIG. 64 is a schematic diagram illustrating a schematic configuration example of a wheel and an axle in an autonomous mobile body according to a fifth example in the fifth embodiment.

FIG. 64 is a schematic diagram illustrating a schematic configuration example of a wheel and an axle in the autonomous mobile body according to a fifth example of the present embodiment. As illustrated in FIG. 64, in the fifth example, the contact area between the wheel 570 and the floor surface is limited by inclining the axle 571 of the wheels 570 having a cylindrical columnar surface.

For example, the axle 571 of a right wheel 570 is inclined such that an outer side is closer to the floor surface than an inner side. As a result, the contact area of the right wheel 570 with the floor surface can be limited to an outer area of the wheel 570. Similarly, for example, the axle 571 of a left wheel 570 is inclined such that the outer side is closer to the floor surface than the inner side. As a result, the contact area of the left wheel 570 with the floor surface can be limited to the outer area of the wheel 570.

As described above, by inclining the axle 571 of the cylindrical wheel 570, it is possible to limit the contact area with the floor surface to a part as in the second example or the third example. Thus, it is possible to improve the controllability and stability at turning of the autonomous mobile body 10.

The wheel to be used is not limited to the cylindrical wheel 570, and can be variously modified, including the wheels 620, 630, 640, or 650 described in the first to fourth examples.

5.2.6 Sixth Example

FIG. 65 is a schematic diagram illustrating a schematic configuration example of a wheel and an axle in the autonomous mobile body according to a sixth example of the present embodiment. As illustrated in FIG. 65, in the sixth example, a control mechanism that controls inclination of the axle 571 of the left and right wheels 570 is provided. As the control mechanism, for example, a mechanism for housing the wheels 570 into the main body, illustrated in the second embodiment, can be used. Note that this control mechanism may be controlled by, for example, the operation control unit 260.

As described above, when the control mechanism for controlling the inclination of the axle 571 of the wheel 570 is used, for example, the vehicle can stably travel with increased grip force of the wheel 570 by making the axle 571 parallel to the floor surface during a straight travel to increase the contact area between the wheel 570 and the floor surface. When the autonomous mobile body 10 turns, the axle 571 is inclined with respect to the floor surface to reduce the contact area between the wheel 570 and the floor surface. Thus, it is possible to control to improve the controllability and stability at turning, similarly to the fifth example.

In addition, by configuring to independently control the inclination of the axle 571 for the right and left wheels 570, it is also possible to drive so as to provide a difference in the height of the wheels 570 according to the slope of the floor surface as illustrated in FIG. 66. As a result, even when the autonomous mobile body 10 travels on the floor surface sloped to the left and right with respect to the traveling direction, the posture of the autonomous mobile body 10 can be maintained substantially perpendicular (standing state) with respect to the gravity direction. Thus, more stable traveling on a slope can be realized.

In addition, in a case where a height difference is provided between the two wheels 570 using the configuration in which the axle 571 for each of the left and right wheels 570 can be independently driven, the higher wheel 570 (left wheel 570 in the drawing) comes into contact with the floor surface on the outer side of the wheel 570, and the lower wheel 570 (right wheel 570 in the drawing) comes into contact with the floor surface on the inner side of the wheel 570. Thus, the entire width of the contact area formed by the two wheels 570 is narrowed. As a result, the autonomous mobile body 10 can be greatly inclined with a small height difference between the two wheels 570, so that it is possible to greatly relax the restriction on an angle of the slope at which the autonomous mobile body 10 can travel.

Figure 67:
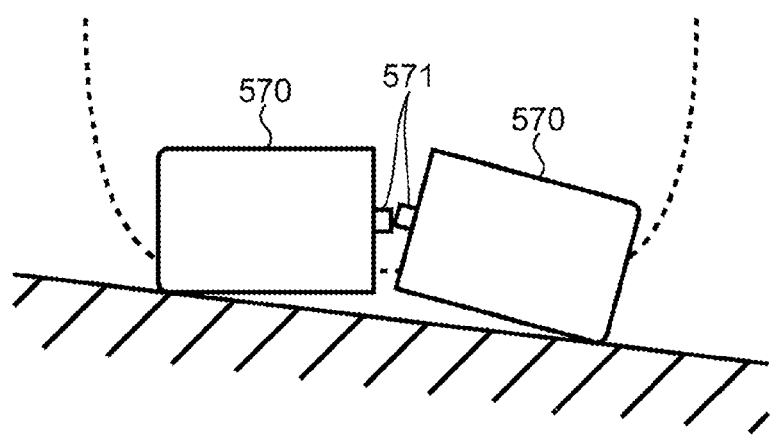
FIG. 67 is a schematic diagram illustrating still another schematic configuration example of the wheel and the axle in the autonomous mobile body according to the sixth example in the fifth embodiment.

The driving of the axle 571 at the time of traveling on a slope is not limited to the shift in the vertical direction while maintaining the two axles 571 in parallel. As illustrated in FIG. 67, the axles 571 of the wheels 570 may be inclined such that the outer side of the wheel 570 located on the lower side of the slope comes into contact with the slope. As a result, the entire width of the contact area formed by the two wheels 570 can be broadened, so that the stability at the time of traveling on a slope can be further improved.

Figure 68:
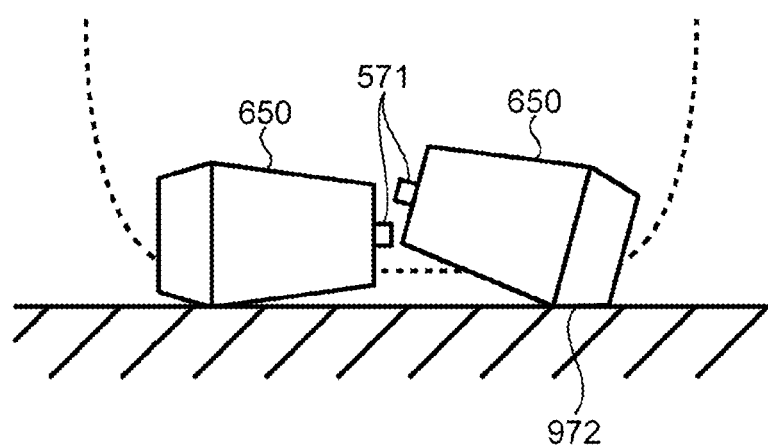
FIG. 68 is a schematic diagram illustrating still another schematic configuration example of the wheel and the axle in the autonomous mobile body according to the sixth example in the fifth embodiment.

In addition, by applying such a configuration to the fourth example described with reference to FIG. 63, the contact area of the outer wheel 650 at turning can be increased, as illustrated in FIG. 68, so that the stability of the autonomous mobile body 10 at turning can be further improved.

5.3 Summary

As described above, according to the fifth embodiment of the present disclosure, in the configuration in which the distance between the two wheels 570, 620, 630, 640, or 650 is narrower than the width of the main body and most of the two wheels are housed inside the main body, the contact area between the wheels 570, 620, 630, 640, or 650 and the floor surface can be reduced. Thus, it is possible to improve the controllability and stability at turning while suppressing deterioration in appearance design.

In addition, as in the sixth example of the present embodiment, by configuring the axles of the two wheels 570 to be independently driven, it is possible to control the contact area of each wheel 570 according to the shape of the floor surface and the traveling condition. Thus, it is possible to further improve the stability at traveling on a slope or turning.

By obtaining the above effects, the autonomous mobile body 10 according to the present embodiment can smoothly move according to the situation. Thus, more natural and effective communication with the user can be realized.

Other configurations, operations, and effects may be similar to those of the above-described embodiments, and thus detailed description thereof is omitted here.

6. Sixth Embodiment

Next, a sixth embodiment of the present disclosure will be described in detail below with reference to the drawings. In the following description, configurations and operations similar to those of the above-described embodiment are cited to omit redundant description thereof.

Figure 69:
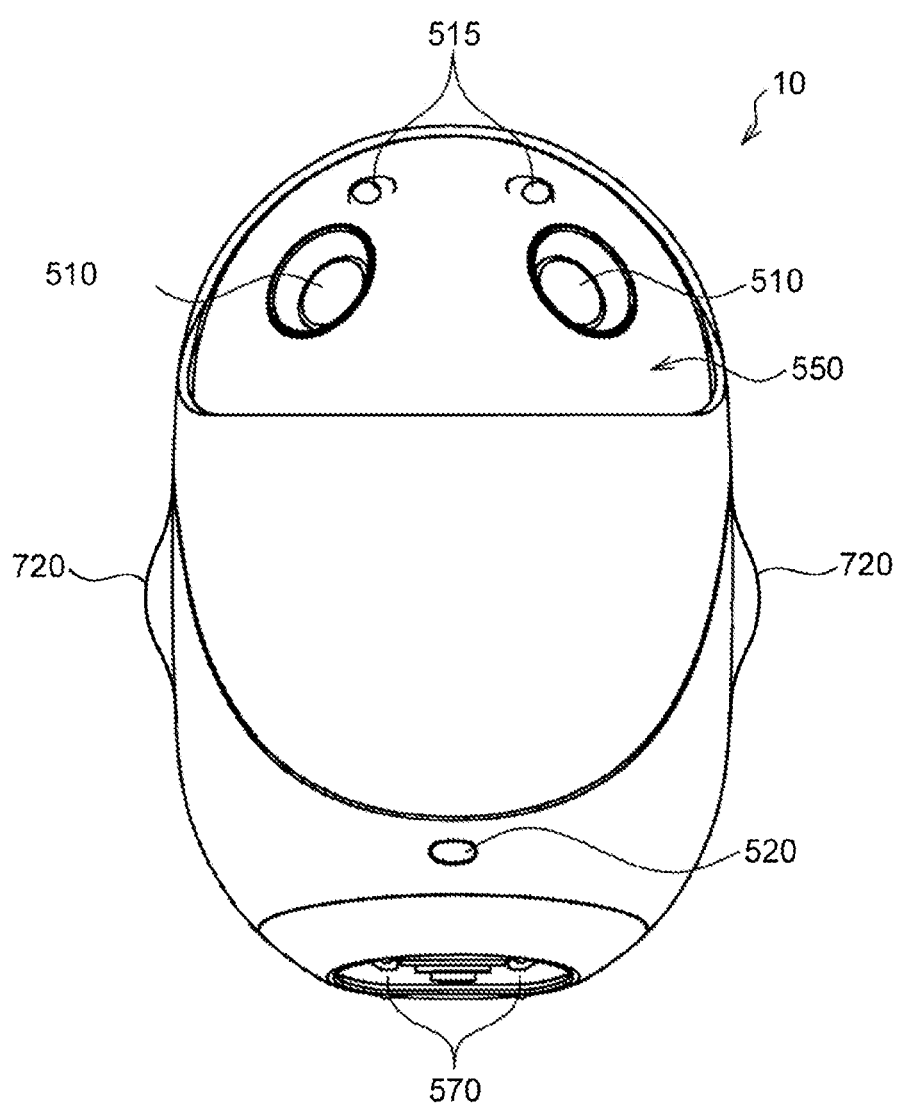
FIG. 69 is a front view of an autonomous mobile body according to a sixth embodiment.
Figure 70:
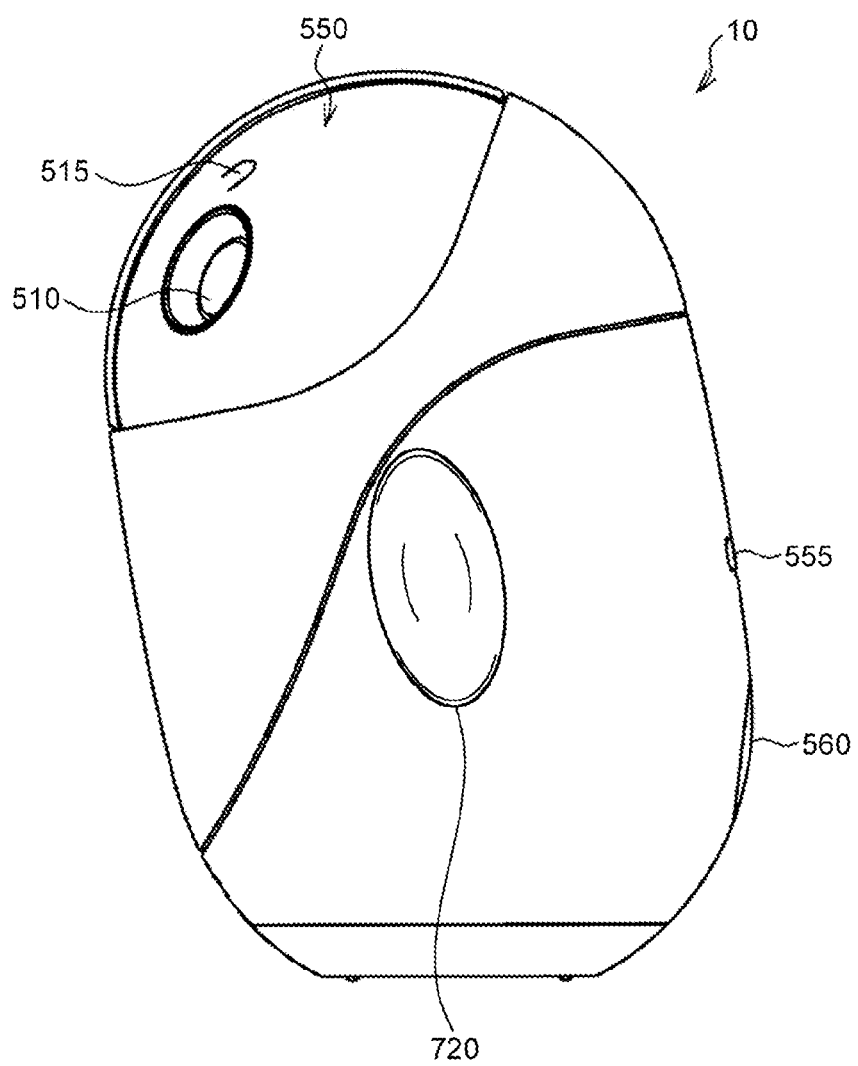
FIG. 70 is a side view of the autonomous mobile body according to the sixth embodiment.

FIG. 69 is a front view of an autonomous mobile body 10 according to the sixth embodiment of the present disclosure, and FIG. 70 is a side view of the autonomous mobile body 10 according to the sixth embodiment of the present disclosure.

In the above-described embodiment, the case where the main body (body) of the autonomous mobile body 10 is a long-elliptic shape has been exemplified. Therefore, for example, when the autonomous mobile body 10 overturns on a sloped surface or the like, there is a possibility that the autonomous mobile body 10 continues to roll along the sloped surface, and falls from a table or the like or collides against a wall or the like.

Therefore, in the present embodiment, as illustrated in FIG. 69 and FIG. 70, a protrusion 720 is provided on a part of the side surface of the autonomous mobile body 10. As a result, even when the autonomous mobile body 10 overturns on the sloped surface or the like, it is possible to suppress the rolling of the autonomous mobile body 10 to prevent the autonomous mobile body 10 from falling from the table or the like or from colliding with the wall or the like.

Other configurations, operations, and effects may be similar to those of the above-described embodiment, and thus detailed description thereof is omitted here.

Although the embodiments of the present disclosure have been described above, the technical scope of the present disclosure is not limited to the above-described embodiments as it is, and various modifications can be made without departing from the gist of the present disclosure. In addition, components of different embodiments and modifications may be appropriately combined.

Note that the effects described in the present specification are merely examples and not limited thereto, and other effects may be provided.

The present technology can also have the following configurations.

(1)
An information processing apparatus comprising:
an autonomous mobile body that travels while maintaining an inverted state; and
an operation control unit that controls an operation of the autonomous mobile body,
wherein
the autonomous mobile body includes:
a main body,
two wheels mounted on the main body, and
a drive mechanism that drives the two wheels,
the operation control unit controls the drive mechanism to maintain the inverted state of the autonomous mobile body by the two wheels, and
when the autonomous mobile body is placed on a surface that is flat, a part of a columnar surface of each of the two wheels comes into contact with the surface.

(2)
The information processing apparatus according to (1), wherein
the each of the two wheels includes at least one protrusion around the columnar surface, and
when the autonomous mobile body is placed on the surface, a top surface of the protrusion comes into contact with the surface.

(3)
The information processing apparatus according to (2), wherein when a width of the each of the two wheels is ¼ or more of a total width of the two wheels, a width of the protrusion in a width direction of the two wheels is not greater than 60% of the width of the each of the two wheels.

(4)
The information processing apparatus according to (1), wherein the each of the two wheels has a diameter that increases from an inner side to an outer side of the each of the two wheels.

(5)
The information processing apparatus according to (1), wherein the each of the two wheels has an outer portion, and a diameter of the outer portion increases from an inner side to an outer side of the each of the two wheels.

(6)
The information processing apparatus according to (1), wherein the each of the two wheels has a diameter that increases from an innermost side to a middle part, and decreases from the middle part to an outermost side of the each of the two wheels.

(7)
The information processing apparatus according to (1), wherein the two wheels are supported by respective axles that are mutually inclined.

(8)
The information processing apparatus according to (1), further comprising a control mechanism that controls an inclination of axles supporting the two wheels.

(9)
The information processing apparatus according to (8), wherein
the operation control unit controls the control mechanism to hold the axles of the two wheels in parallel with each other when the autonomous mobile body travels straight, and to make the axles of the two wheels mutually inclined when the autonomous mobile body turns.

(10)
A method for controlling an autonomous mobile body, wherein
the autonomous mobile body includes a main body, two wheels mounted on the main body, and a drive mechanism that drives the two wheels,
the method includes controlling the drive mechanism to maintain an inverted state of the autonomous mobile body by the two wheels, and
when the autonomous mobile body is placed on a surface that is flat, a part of a columnar surface of each of the two wheels comes into contact with the surface.

(11)
A program causing a processor of an autonomous mobile body to function, wherein
the autonomous mobile body includes a main body, two wheels mounted on the main body, and a drive mechanism that drives the two wheels,
the processor controls the drive mechanism to maintain an inverted state of the autonomous mobile body by the two wheels, and
when the autonomous mobile body is placed on a surface that is flat, a part of a columnar surface of each of the two wheels comes into contact with the surface.

REFERENCE SIGNS LIST

10 AUTONOMOUS MOBILE BODY
20 INFORMATION PROCESSING SERVER
30 CONTROLLED DEVICE
110 SENSOR UNIT
120 INPUT UNIT
130 LIGHT SOURCE
140 VOICE OUTPUT UNIT
150 DRIVE UNIT
160 CONTROL UNIT
170 COMMUNICATION UNIT
210 RECOGNITION UNIT
220 ACTION PLANNING UNIT
230, 260 OPERATION CONTROL UNIT
240 COMMUNICATION UNIT
570, 620, 630, 640, 650 WHEEL
571 AXLE
701, 720 PROTRUSION
610 FLYWHEEL
621, 641, 651 COLUMNAR SURFACE
622 PROTRUDING RING PORTION
642, 652 OUTER PORTION
1101 FIRST OBSTACLE SENSOR
1102, 1103 SECOND OBSTACLE SENSOR
1111 to 1114 FIRST TO FOURTH FLOOR SURFACE SENSORS
1121 PROXIMITY SENSOR
1122 TORQUE SENSOR

The invention claimed is:
1. An information processing apparatus, comprising:
an autonomous mobile body configured to move in an inverted state; and an operation control unit configured to control an operation of the autonomous mobile body, wherein
the autonomous mobile body includes:
a main body;
two wheels on the main body, wherein
each wheel of the two wheels includes a columnar surface, and
each wheel of the two wheels includes at least one protrusion around the columnar surface; and
a drive mechanism configured to drive the two wheels,
the operation control unit is further configured to control the drive mechanism to maintain the inverted state of the autonomous mobile body by the two wheels,
a top surface of the protrusion comes into contact with a flat surface based on placement of the autonomous mobile body on the flat surface,
a width of a first wheel of the two wheels is ¼ or more of a total width of the two wheels, and
a width of the protrusion of the first wheel in a width direction of the two wheels is one of equal to or less than 60% of the width of the first wheel.

2. The information processing apparatus according to claim 1, wherein each wheel of the two wheels has a diameter that increases from an inner side of the each wheel to an outer side of the each wheel.

3. The information processing apparatus according to claim 1, wherein
each wheel of the two wheels has an outer portion, and
a diameter of the outer portion increases from an inner side of the each wheel to an outer side of the each wheel.

4. The information processing apparatus according to claim 1, wherein each wheel of the two wheels has a diameter that increases from an innermost side of the each wheel to a middle part of the each wheel, and decreases from the middle part of the each wheel to an outermost side of the each wheel.

5. The information processing apparatus according to claim 1, further comprising a plurality of axles configured to support the two wheels, wherein
each wheel of the two wheels is supported by a respective axle of the plurality of axles, and
axles of the plurality of axles are mutually inclined.

6. The information processing apparatus according to claim 1, further comprising:
a plurality of axles configured to support the two wheels; and
a control mechanism configured to control an inclination of the plurality of axles that supports the two wheels.

7. The information processing apparatus according to claim 6, wherein
the plurality of axles includes a first axle and a second axle,
the autonomous mobile body is further configured to one of move straight or turn, and
the operation control unit is further configured to control the control mechanism to:
hold the first in parallel with the second axle in a case where the autonomous mobile body moves straight; and
make the first axle and the second axle mutually inclined in a case where the autonomous mobile body turns.

8. The information processing apparatus according to claim 1, wherein
the autonomous mobile body is further configured to move on a floor surface that has a slope, and
the operation control unit is further configured to control, based on the movement of the autonomous mobile body on the floor surface that has the slope, the drive mechanism to control:
the first wheel of the two wheels at a first height from the floor surface that has the slope, and
a second wheel of the two wheels at a second height from the floor surface that has the slope.

9. A method, comprising:
in an autonomous mobile body that includes a main body, two wheels on the main body, and a drive mechanism;
controlling the drive mechanism to maintain an inverted state of the autonomous mobile body by the two wheels, wherein
each wheel of the two wheels includes a columnar surface,
each wheel of the two wheels includes at least one protrusion around the columnar surface,
a top surface of the protrusion comes into contact with a flat surface based on placement of the autonomous mobile body on the flat surface,
a width of a wheel of the two wheels is ¼ or more of a total width of the two wheels, and
a width of the protrusion of the wheel in a width direction of the two wheels is one of equal to or less than 60% of the width of the wheel.

10. A non-transitory computer-readable medium having stored thereon computer-executable instructions that, when executed by a processor of an autonomous mobile body, cause the processor to execute operations, the operations comprising:
controlling a drive mechanism of the autonomous mobile body to maintain an inverted state of the autonomous mobile body by two wheels of the autonomous mobile body, wherein
the autonomous mobile body includes a main body, the two wheels on the main body, and the drive mechanism,
each wheel of the two wheels includes a columnar surface,
each wheel of the two wheels includes at least one protrusion around the columnar surface,
a top surface of the protrusion comes into contact with a flat surface based on placement of the autonomous mobile body on the flat surface,
a width of a wheel of the two wheels is ¼ or more of a total width of the two wheels, and
a width of the protrusion of the wheel in a width direction of the two wheels is one of equal to or less than 60% of the width of the wheel.

* * * * *